United States Patent
Nishimura et al.

(10) Patent No.: US 10,871,846 B2
(45) Date of Patent: Dec. 22, 2020

(54) SENSOR PANEL, INPUT UNIT, AND DISPLAY UNIT

(71) Applicant: SONY CORPORATION, Tokyo (JP)

(72) Inventors: Taizo Nishimura, Kanagawa (JP); Hiroto Kawaguchi, Kanagawa (JP); Hiroshi Mizuno, Kanagawa (JP); Shogo Shinkai, Kanagawa (JP); Fumihiko Iida, Kanagawa (JP); Akira Ebisui, Kanagawa (JP); Kei Tsukamoto, Kanagawa (JP); Tomoko Katsuhara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 128 days.

(21) Appl. No.: 15/317,992

(22) PCT Filed: Apr. 15, 2015

(86) PCT No.: PCT/JP2015/061582
§ 371 (c)(1),
(2) Date: Dec. 12, 2016

(87) PCT Pub. No.: WO2015/194241
PCT Pub. Date: Dec. 23, 2015

(65) Prior Publication Data
US 2017/0115792 A1 Apr. 27, 2017

(30) Foreign Application Priority Data
Jun. 20, 2014 (JP) .................. 2014-127424

(51) Int. Cl.
*G06F 3/041* (2006.01)
*G06F 3/044* (2006.01)
*G06F 3/046* (2006.01)
*G06F 3/0354* (2013.01)

(52) U.S. Cl.
CPC ........ *G06F 3/0414* (2013.01); *G06F 3/03545* (2013.01); *G06F 3/044* (2013.01); *G06F 3/046* (2013.01); *G06F 3/0416* (2013.01); *G06F 2203/04104* (2013.01);
(Continued)

(58) Field of Classification Search
None
See application file for complete search history.

(56) References Cited

U.S. PATENT DOCUMENTS

2010/0265214 A1* 10/2010 Green ................. G06F 3/038
345/174
2013/0009907 A1* 1/2013 Rosenberg ............ G06F 3/046
345/174

(Continued)

FOREIGN PATENT DOCUMENTS

JP 2004-185552 A 7/2004
JP 2010-003048 A 1/2010

(Continued)

*Primary Examiner* — Stephen T. Reed
(74) *Attorney, Agent, or Firm* — Chip Law Group

(57) ABSTRACT

A sensor panel includes a sensor section that detects magnetic force of a contacting surface or a region in the vicinity of the contacting surface on a basis of a change in capacitance and is allowed to output a signal depending on the change in capacitance along with information on a position where the change in capacitance has occurred.

25 Claims, 50 Drawing Sheets

(52) U.S. Cl.
CPC .............. *G06F 2203/04105* (2013.01); *G06F 2203/04106* (2013.01); *G06F 2203/04112* (2013.01)

(56) References Cited

U.S. PATENT DOCUMENTS

| | | | | |
|---|---|---|---|---|
| 2013/0076687 A1* | 3/2013 | Giddings | .............. | G06F 3/0412 345/174 |
| 2014/0043283 A1* | 2/2014 | Kim | ...................... | G06F 3/0416 345/174 |

FOREIGN PATENT DOCUMENTS

| | | |
|---|---|---|
| JP | 2011-170659 A | 9/2011 |
| JP | 2012-118671 A | 6/2012 |

\* cited by examiner

[FIG. 1]
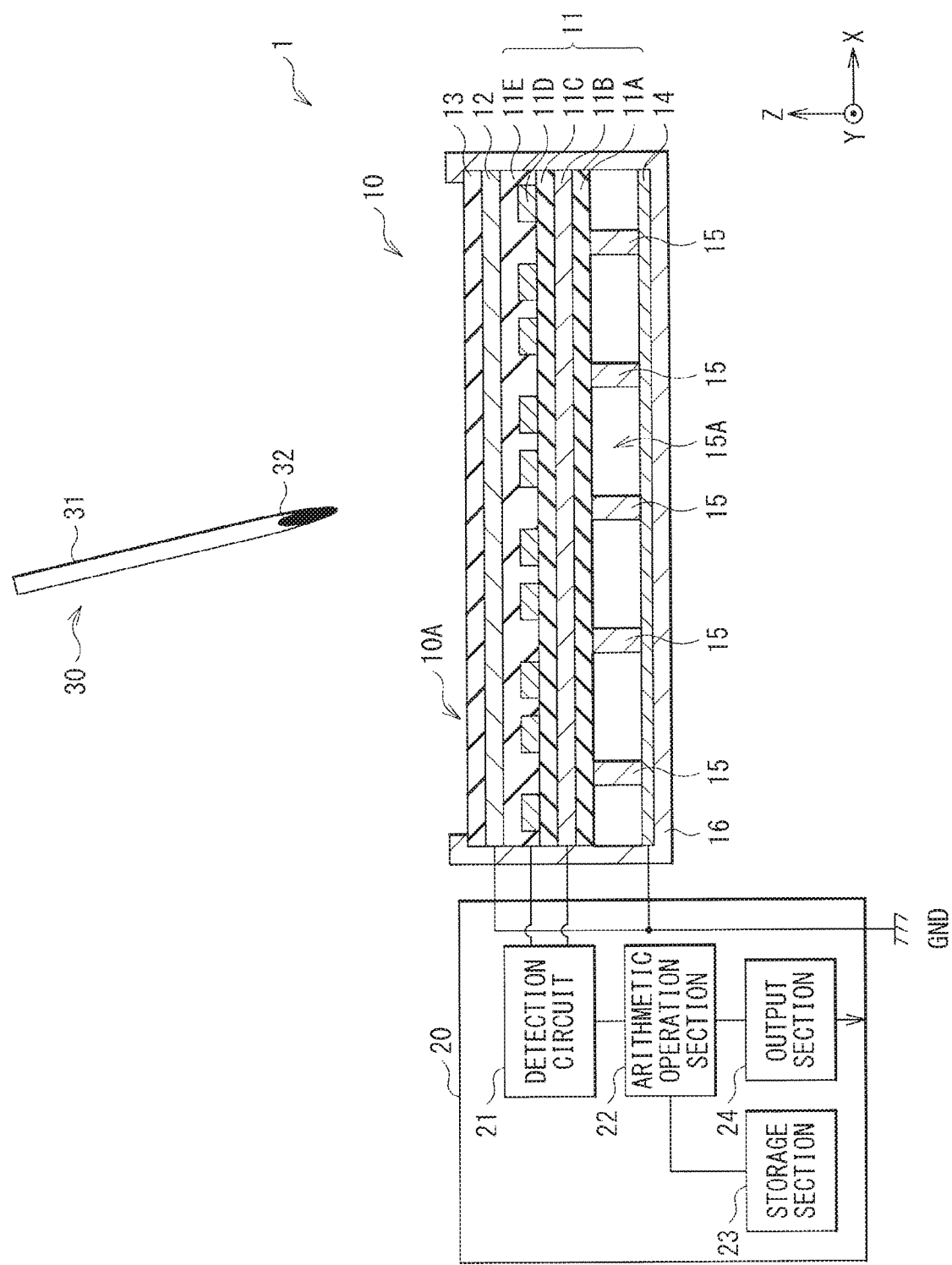

[FIG. 2]
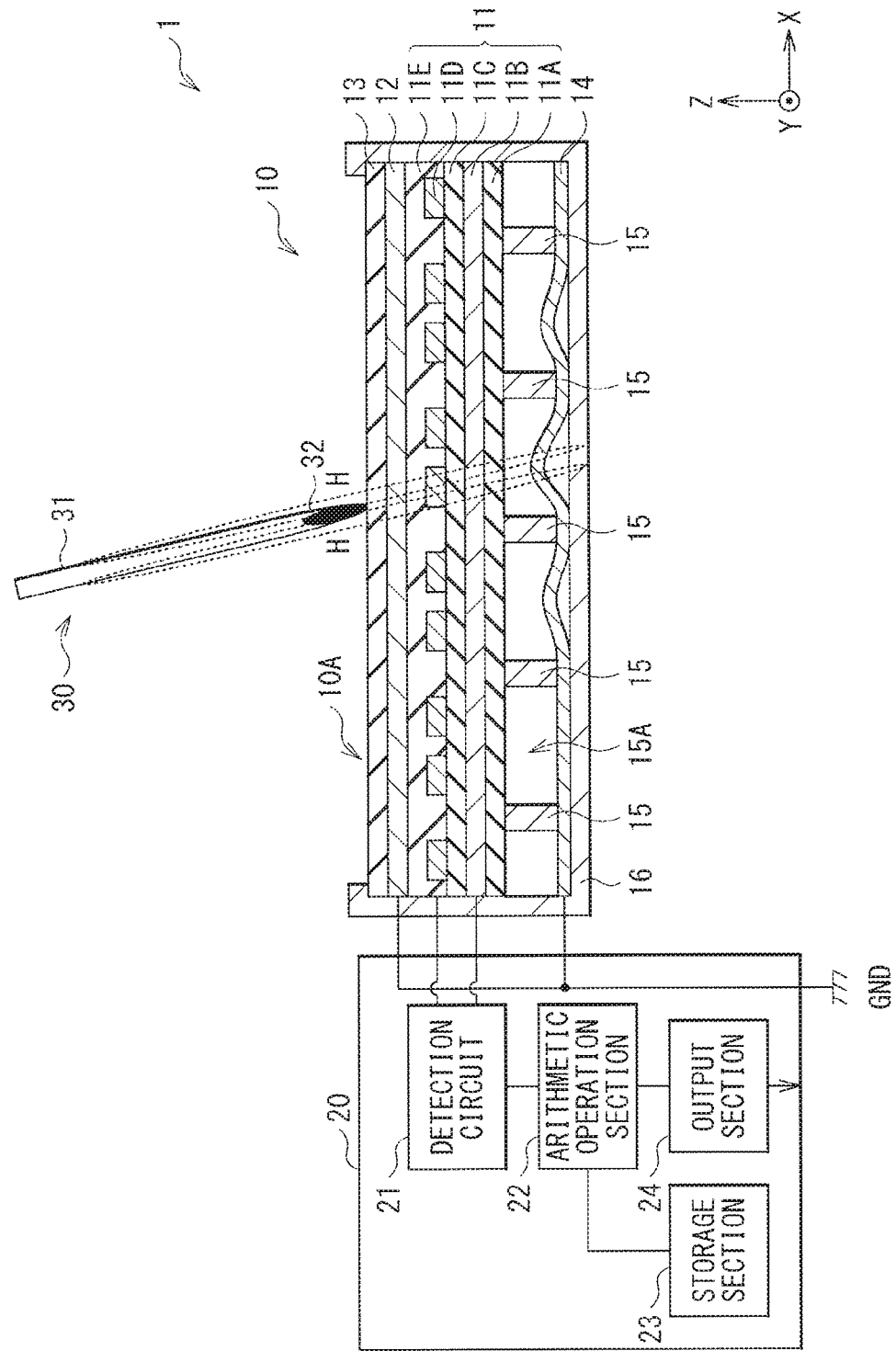

[ FIG. 3 ]
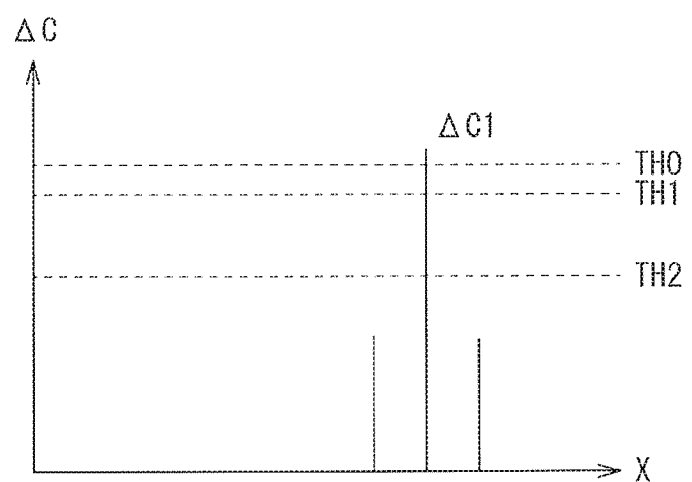

[FIG. 4]
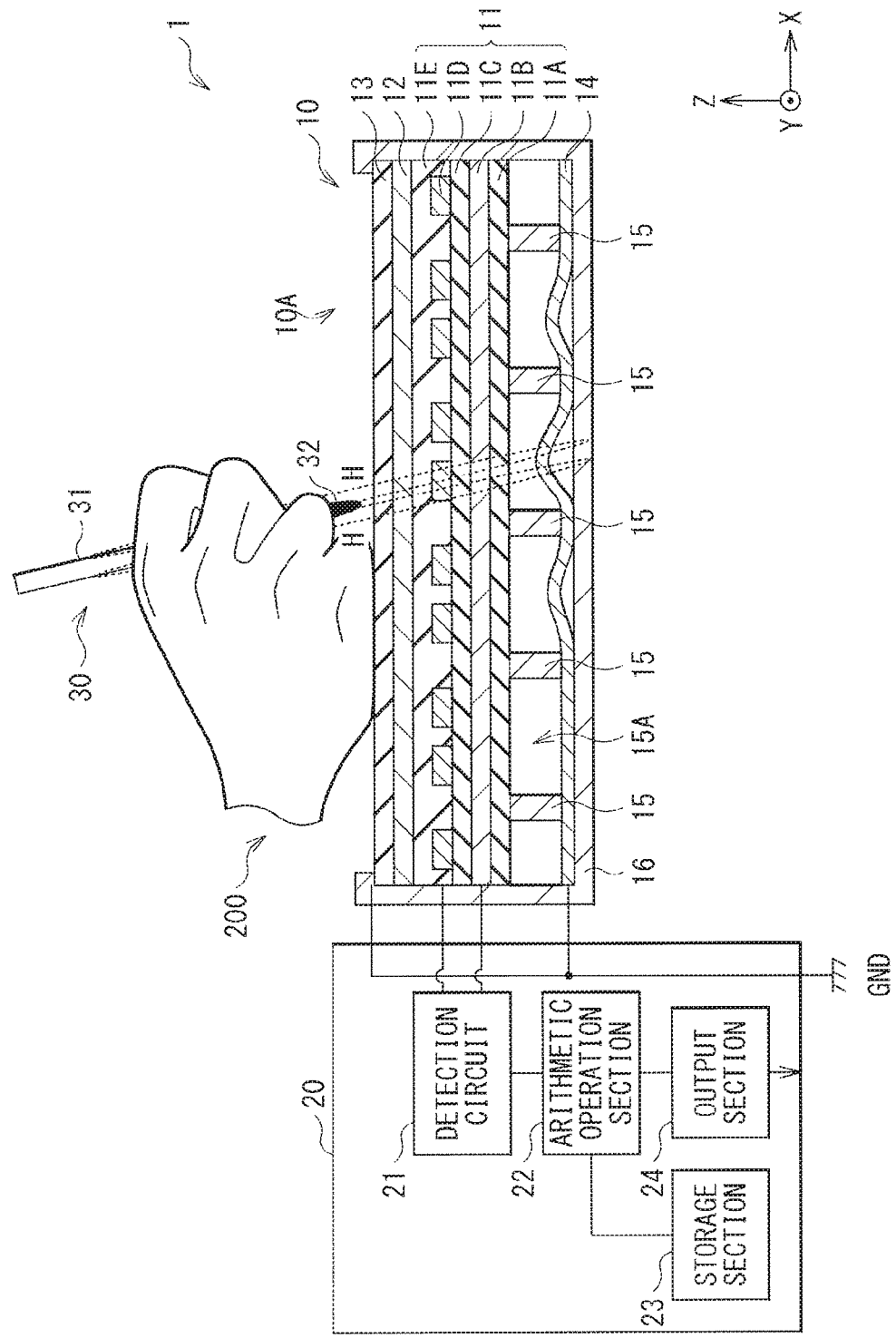

[ FIG. 5 ]
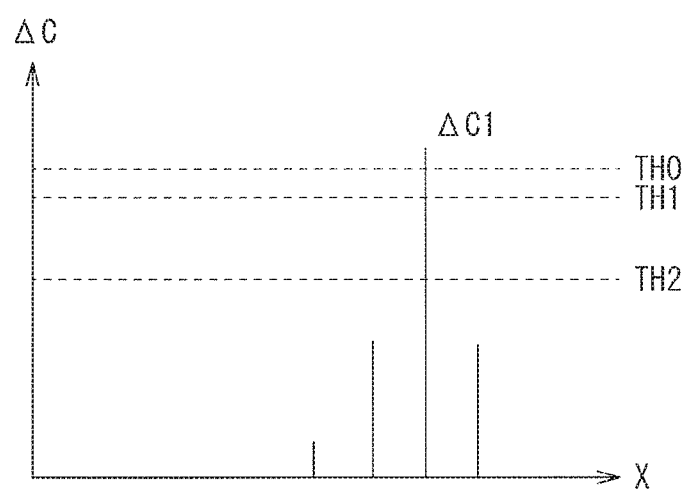

[FIG.6]
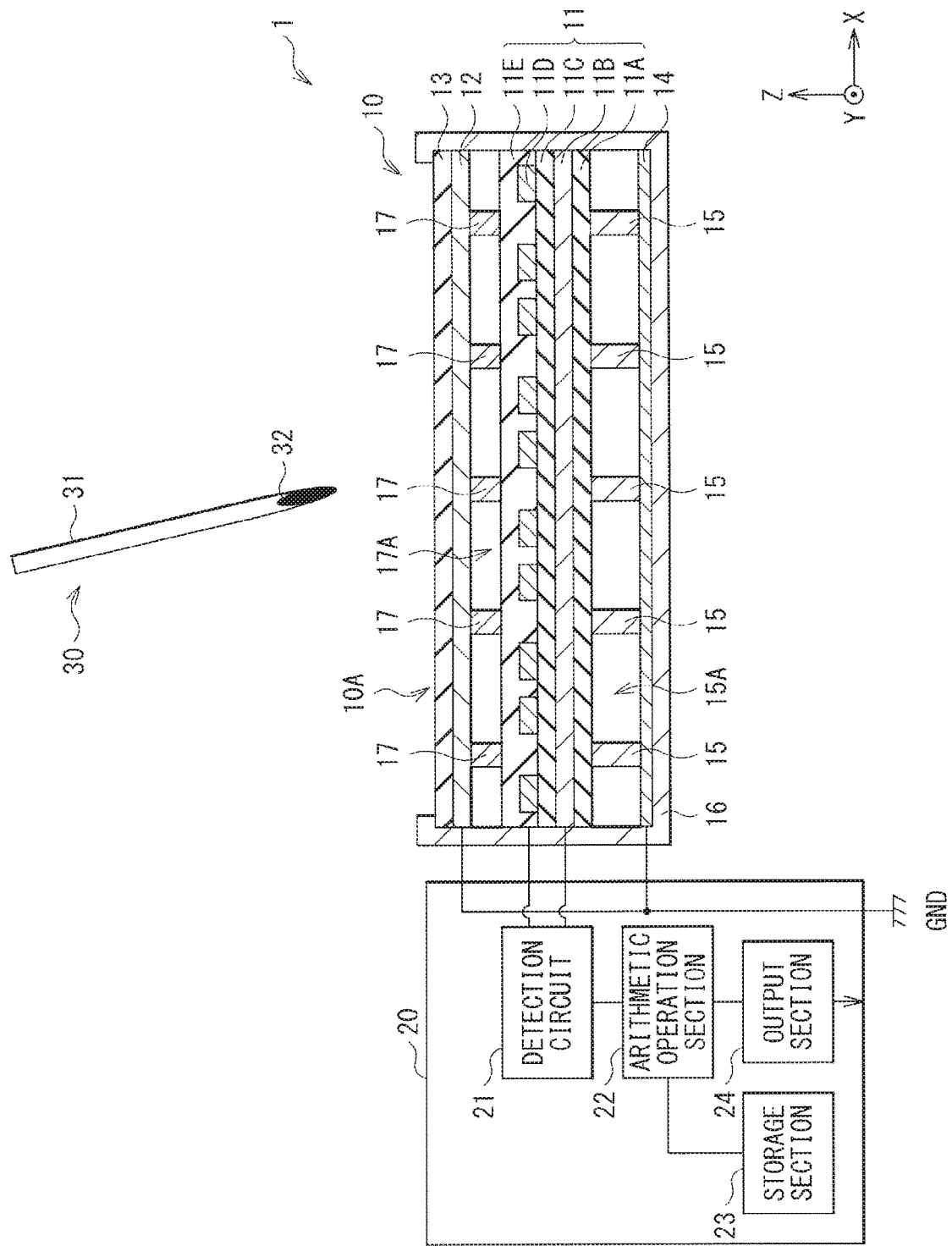

[FIG.7]
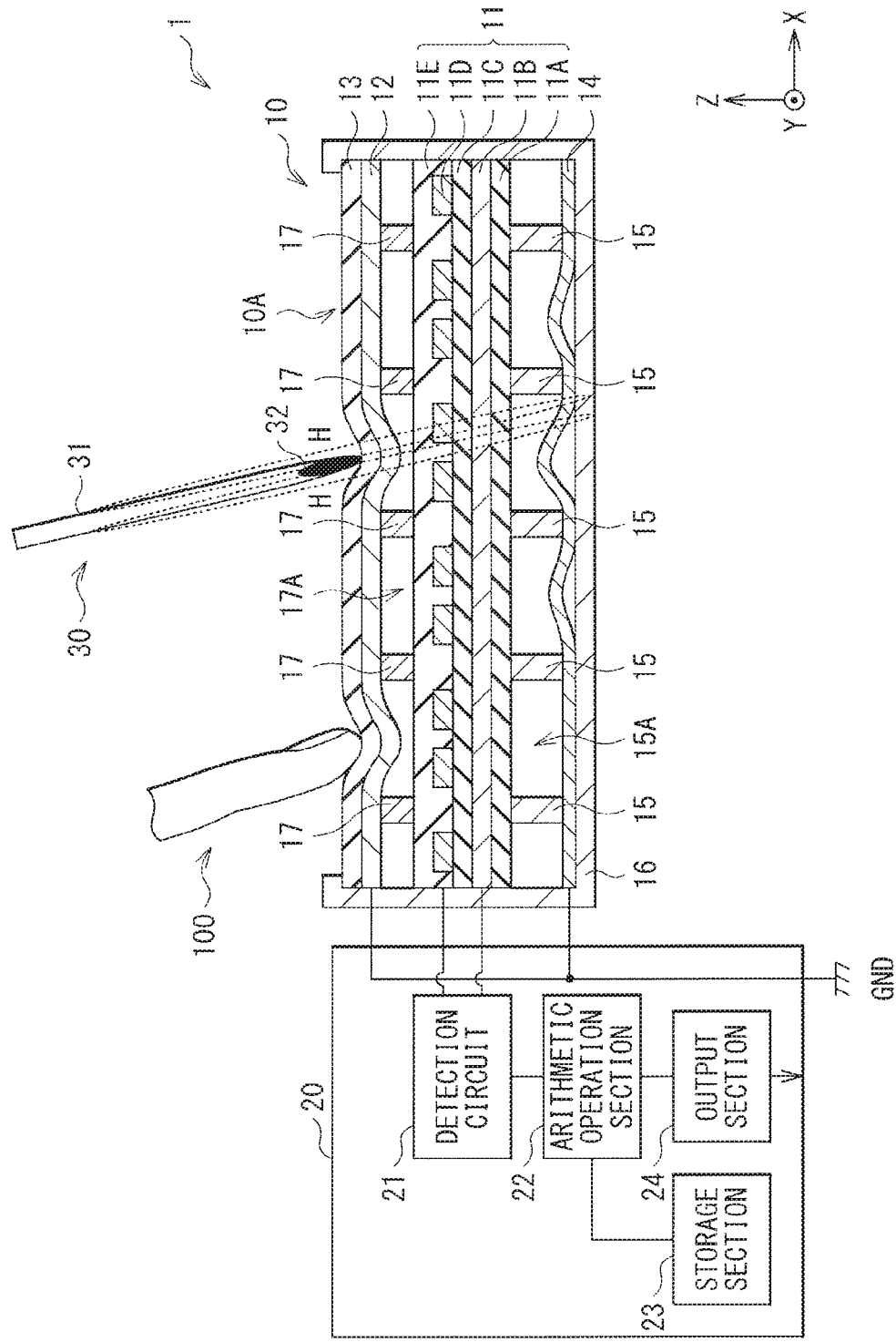

[ FIG. 8 ]
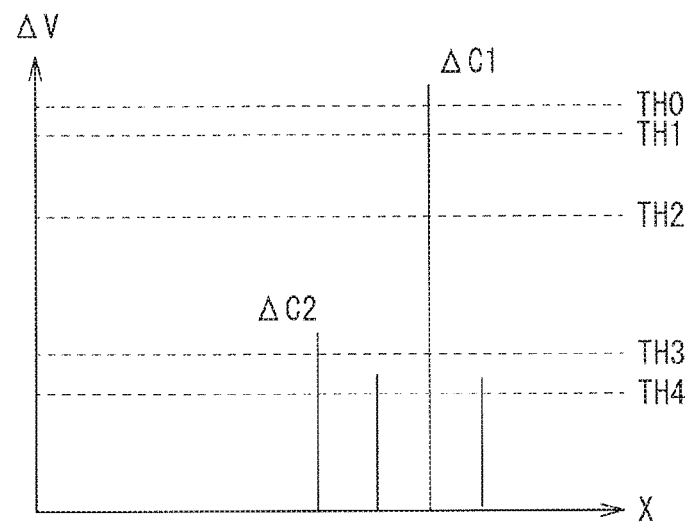

[FIG. 9]
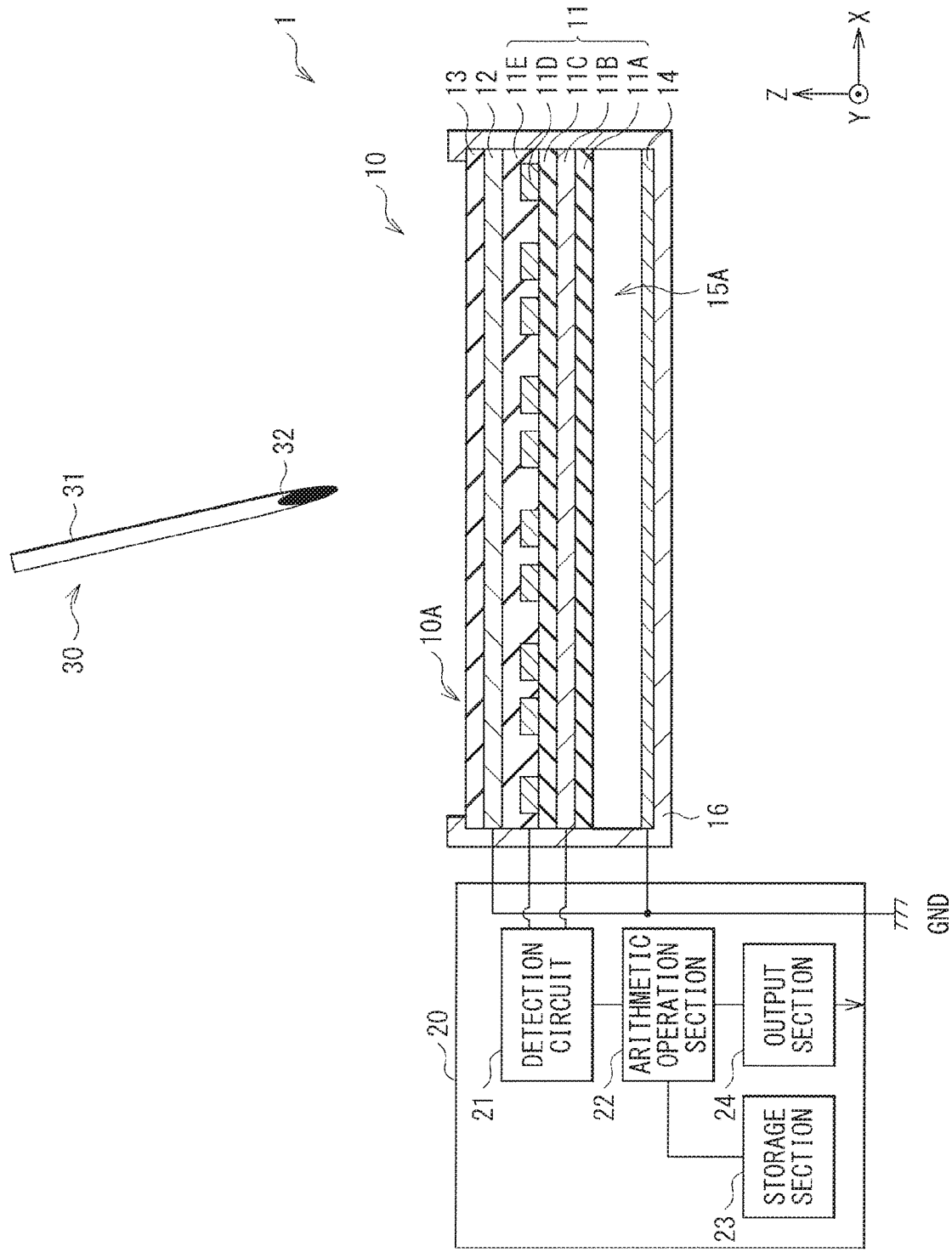

[ FIG. 10 ]
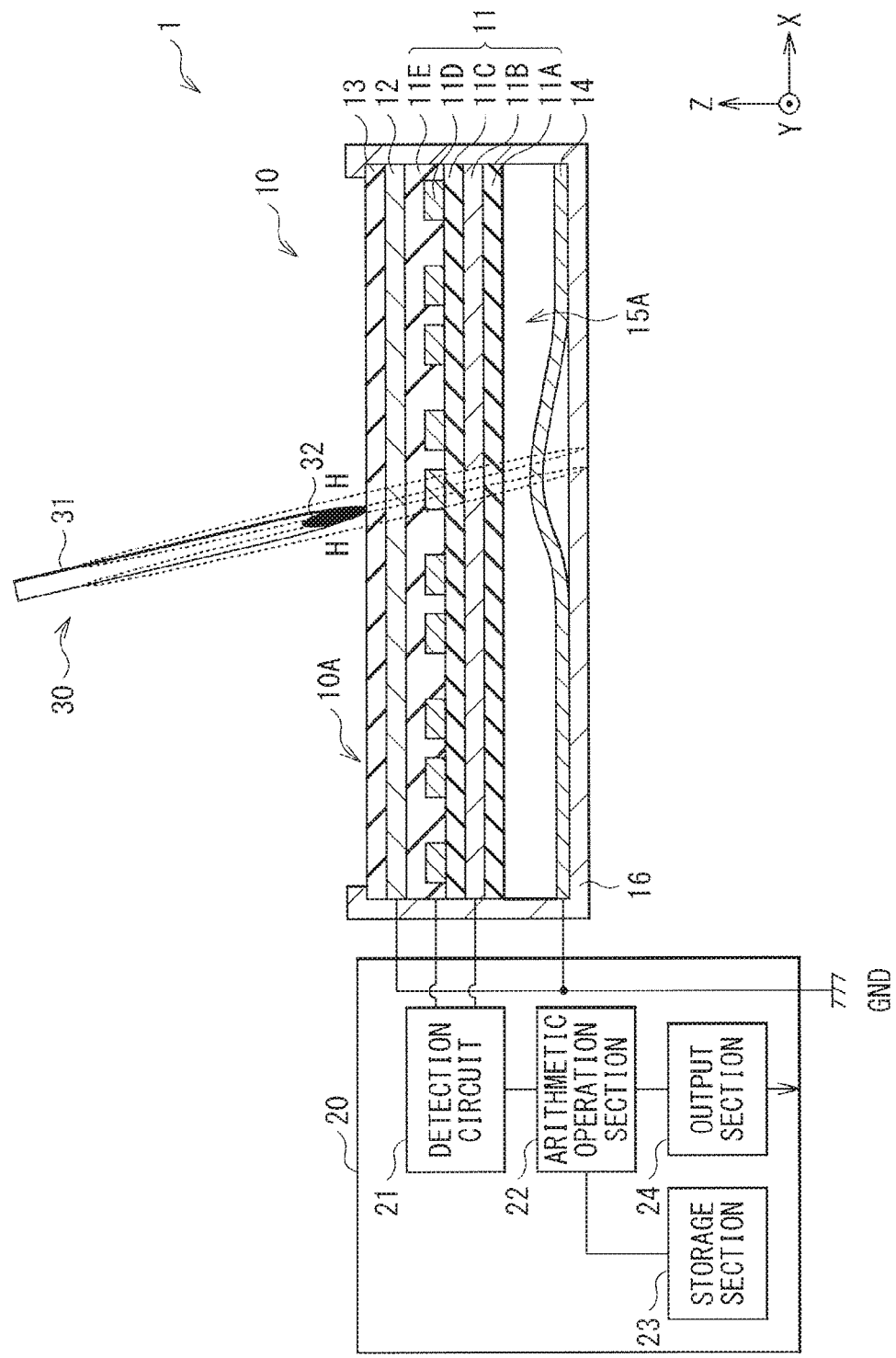

[FIG. 11]
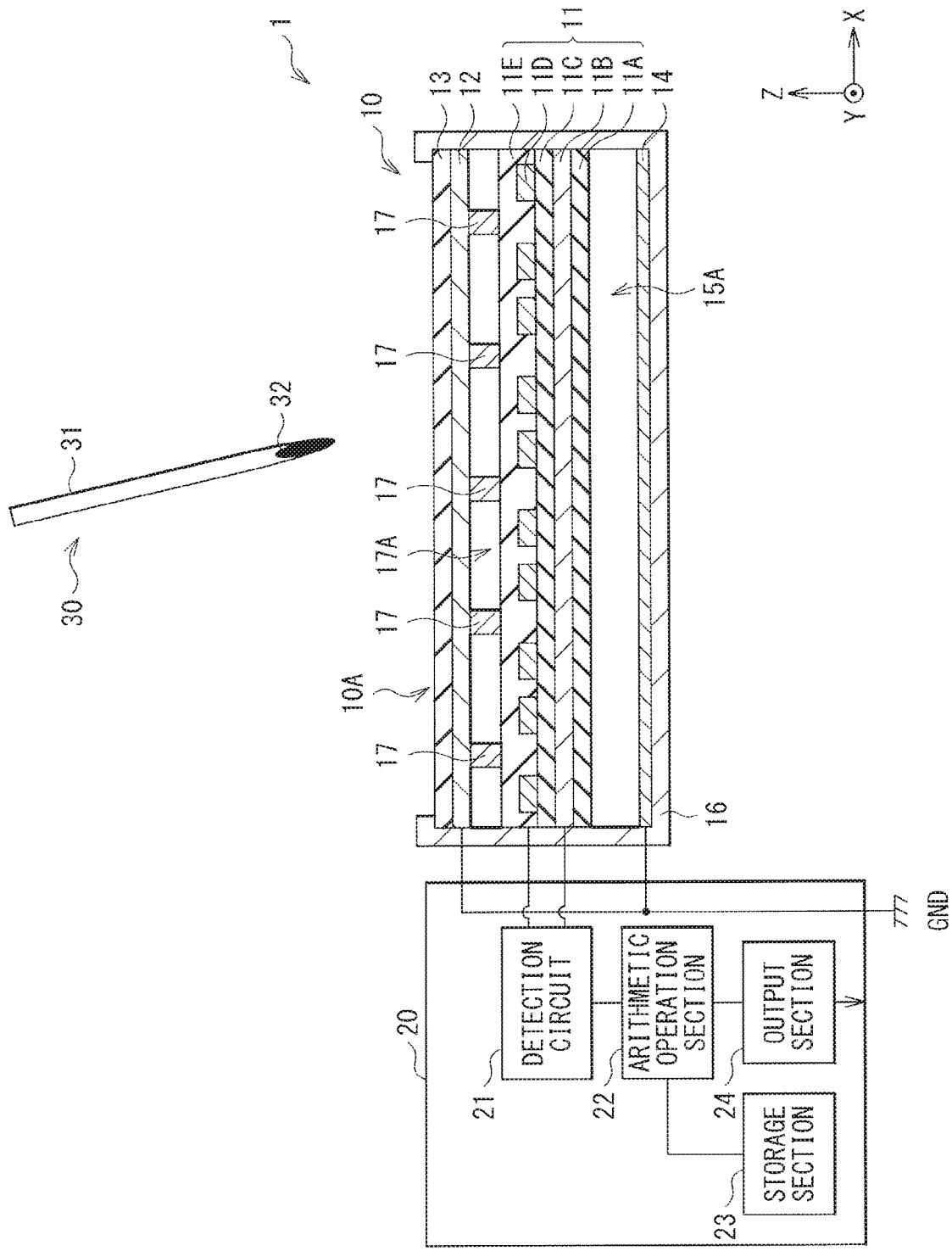

[FIG. 12]
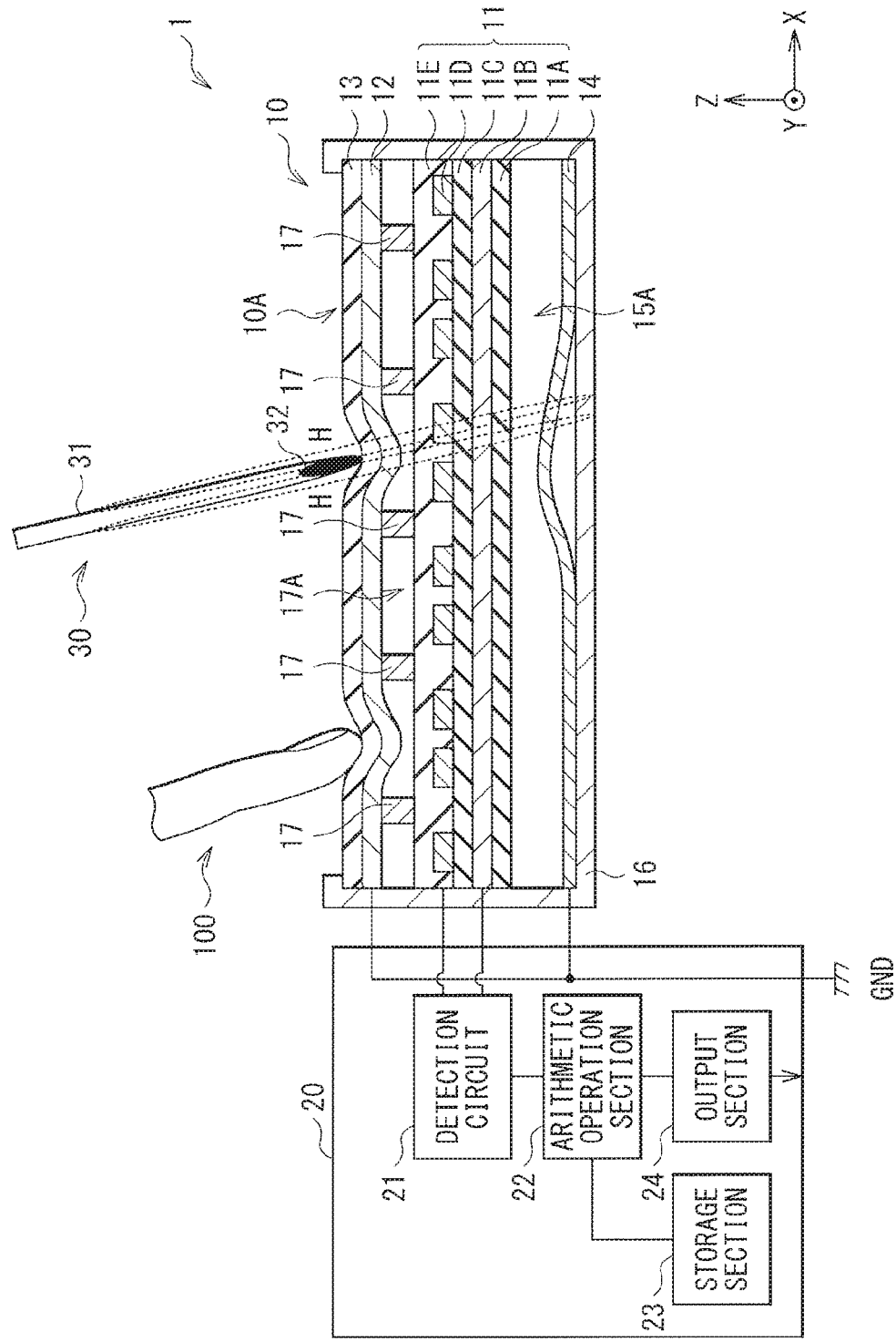

[FIG. 13]
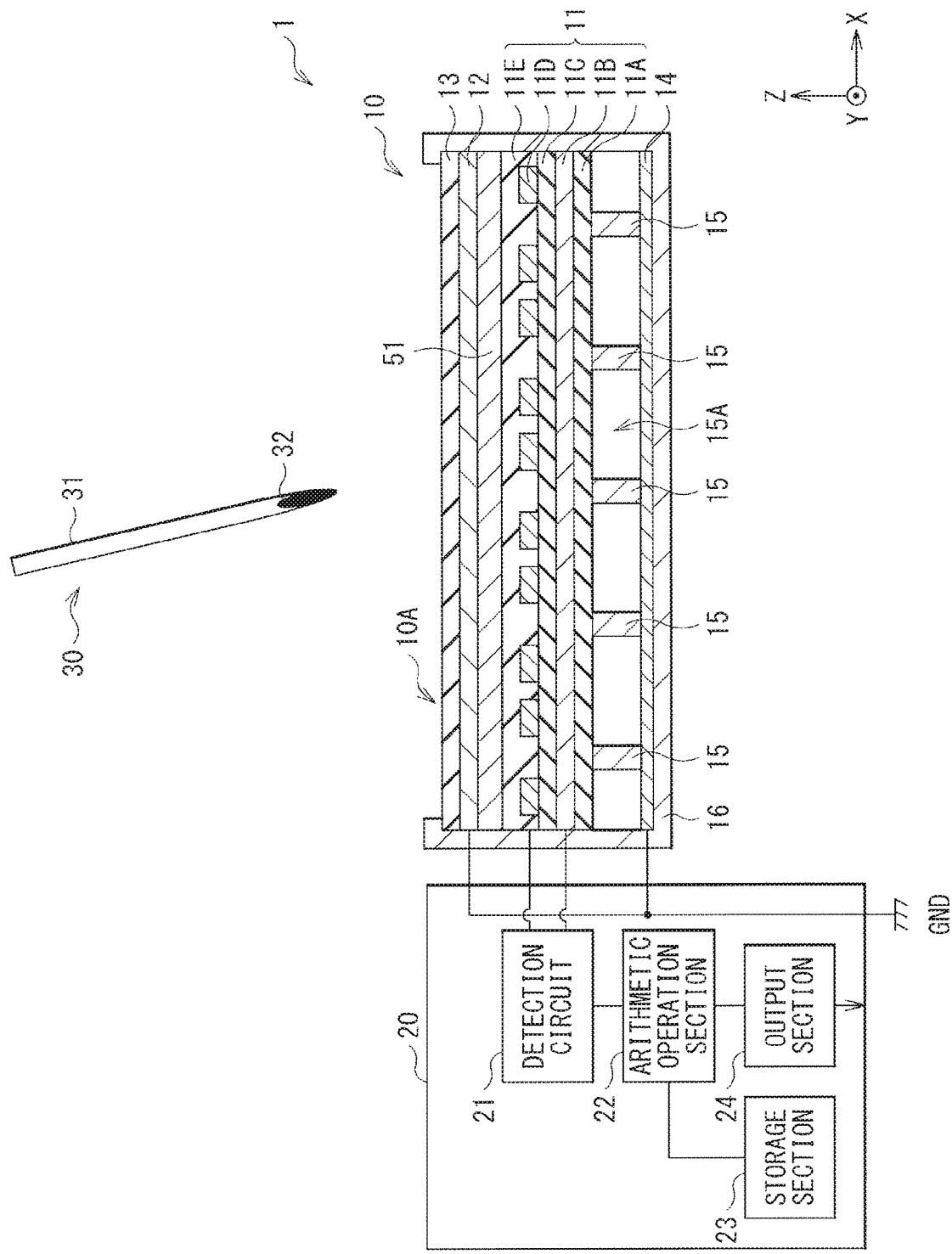

[FIG. 14]
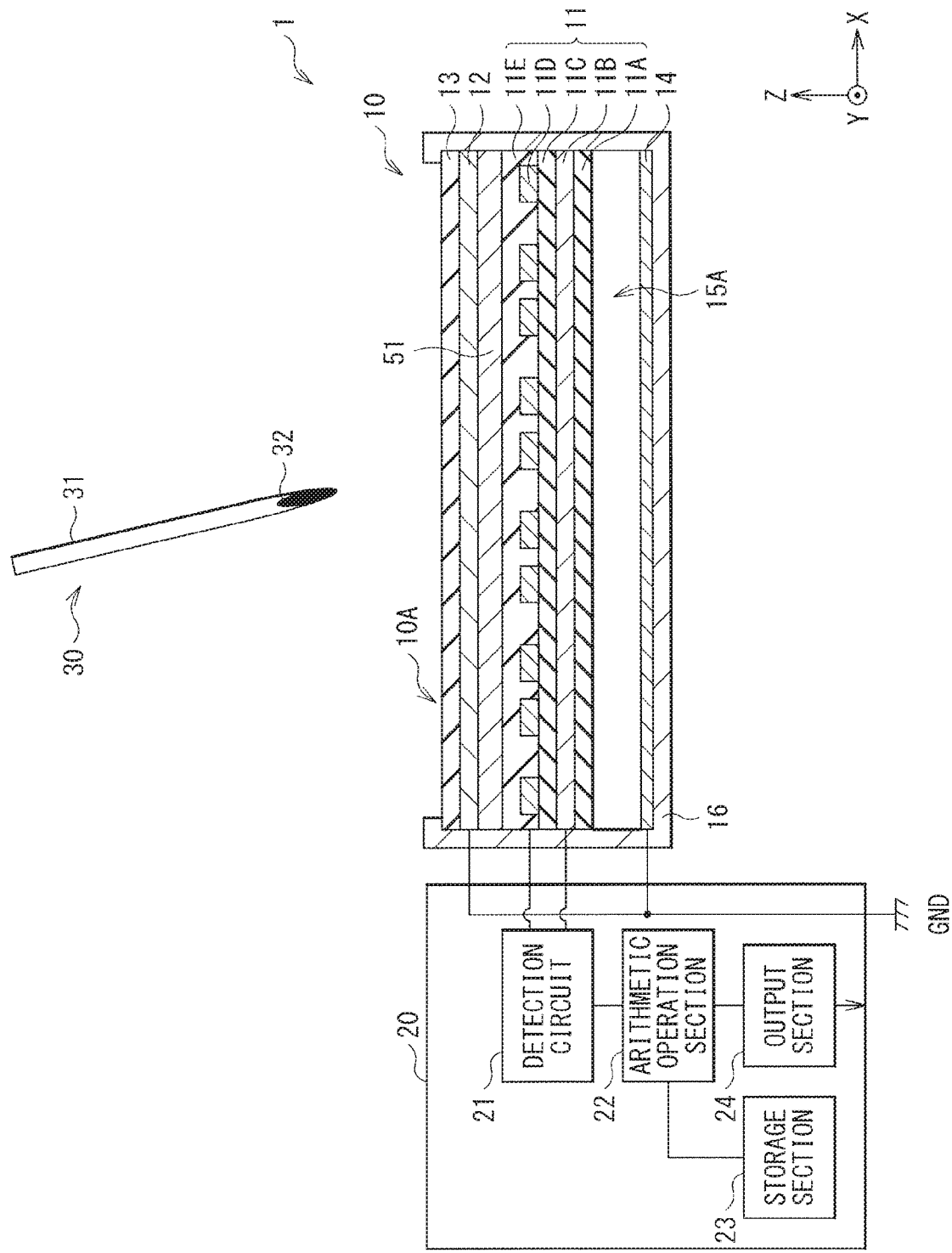

[FIG. 15]
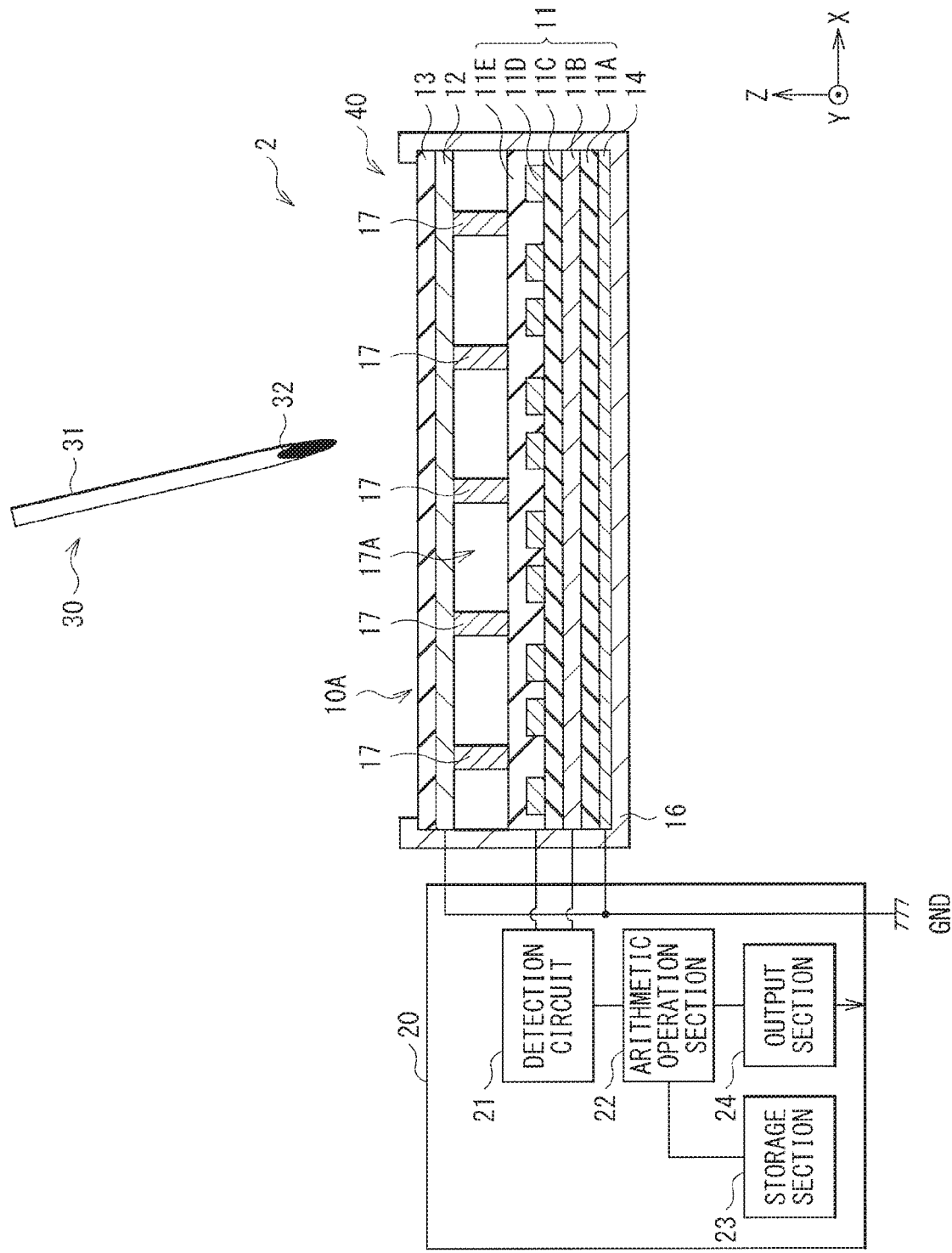

[ FIG. 16 ]
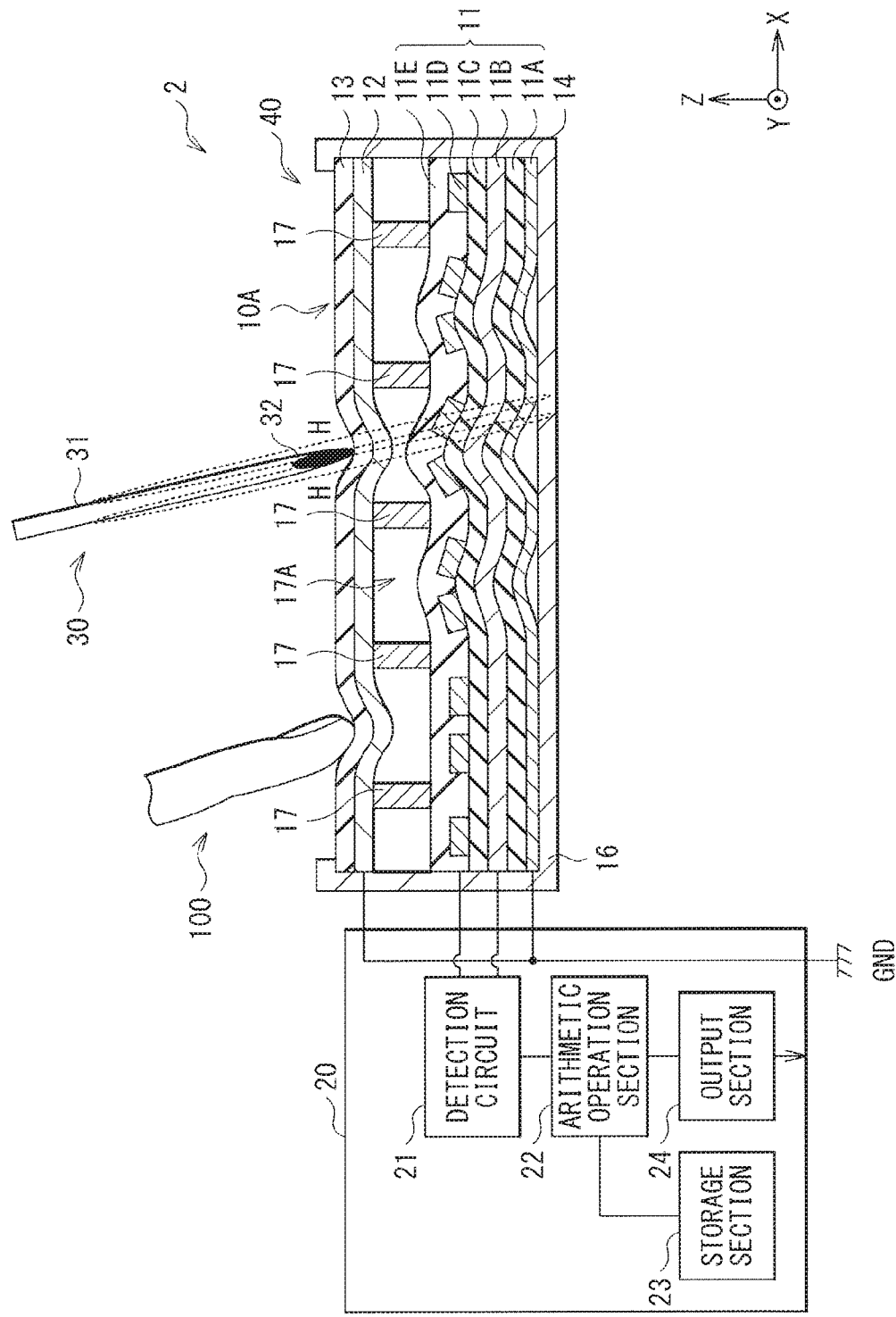

[FIG. 17]
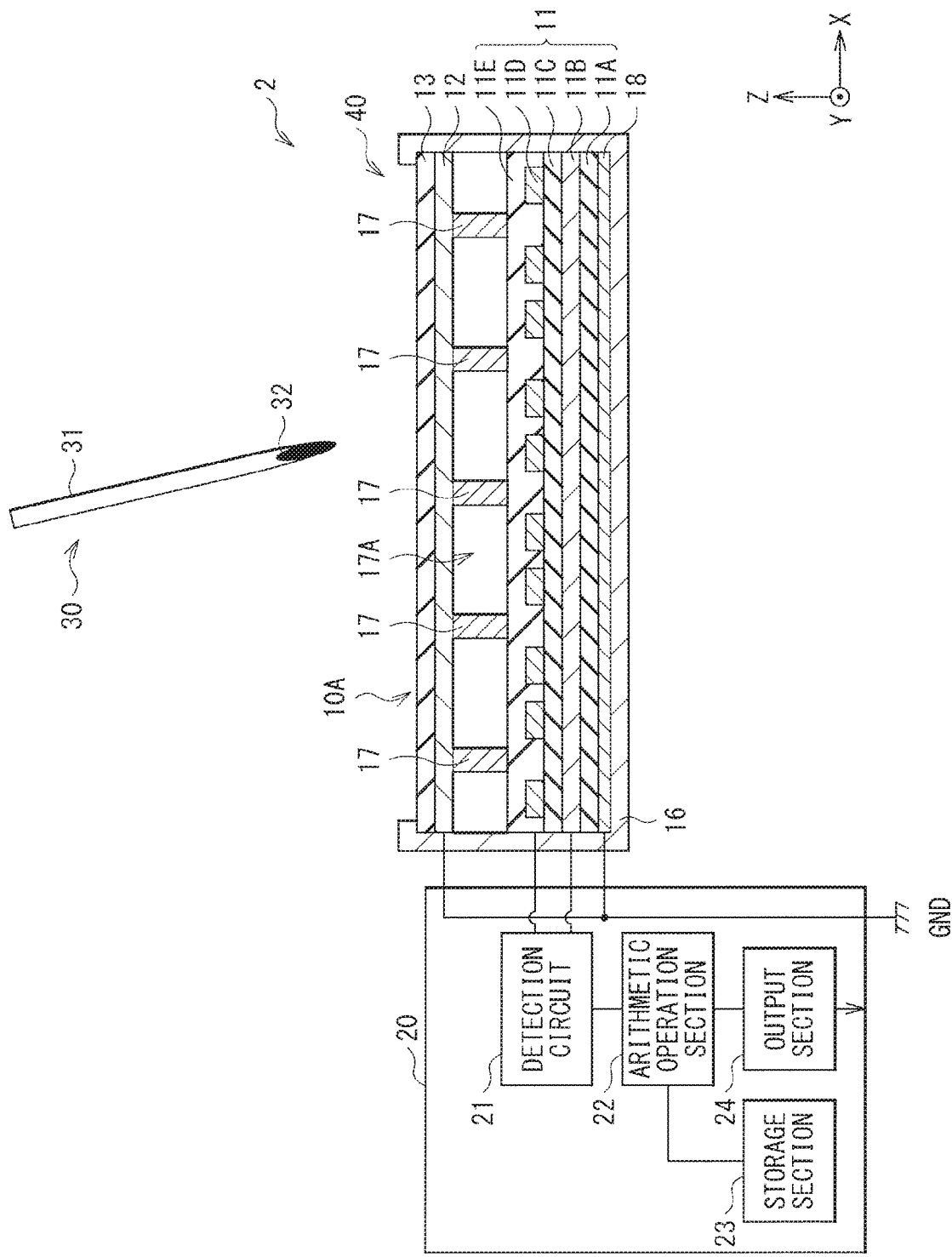

[FIG. 18]
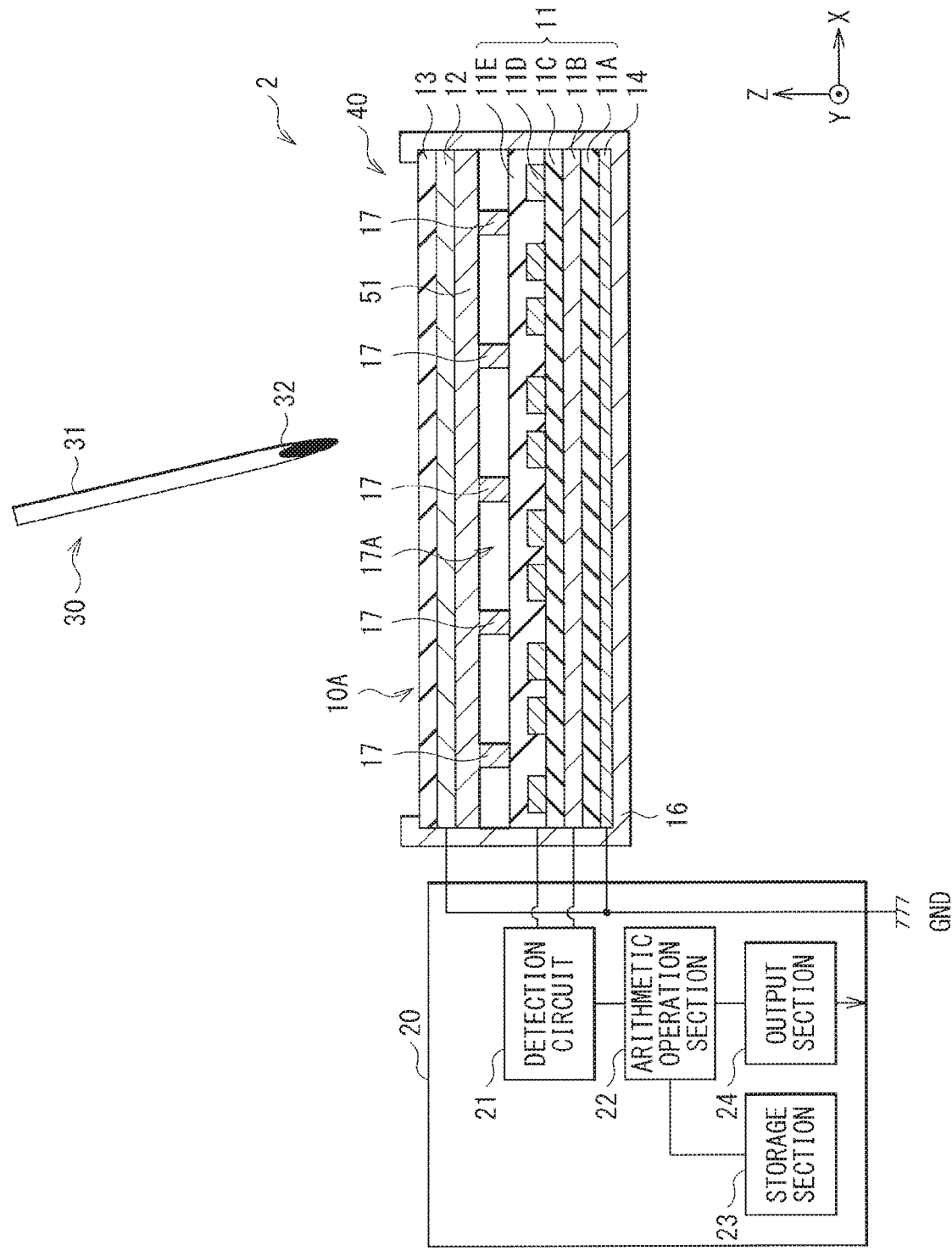

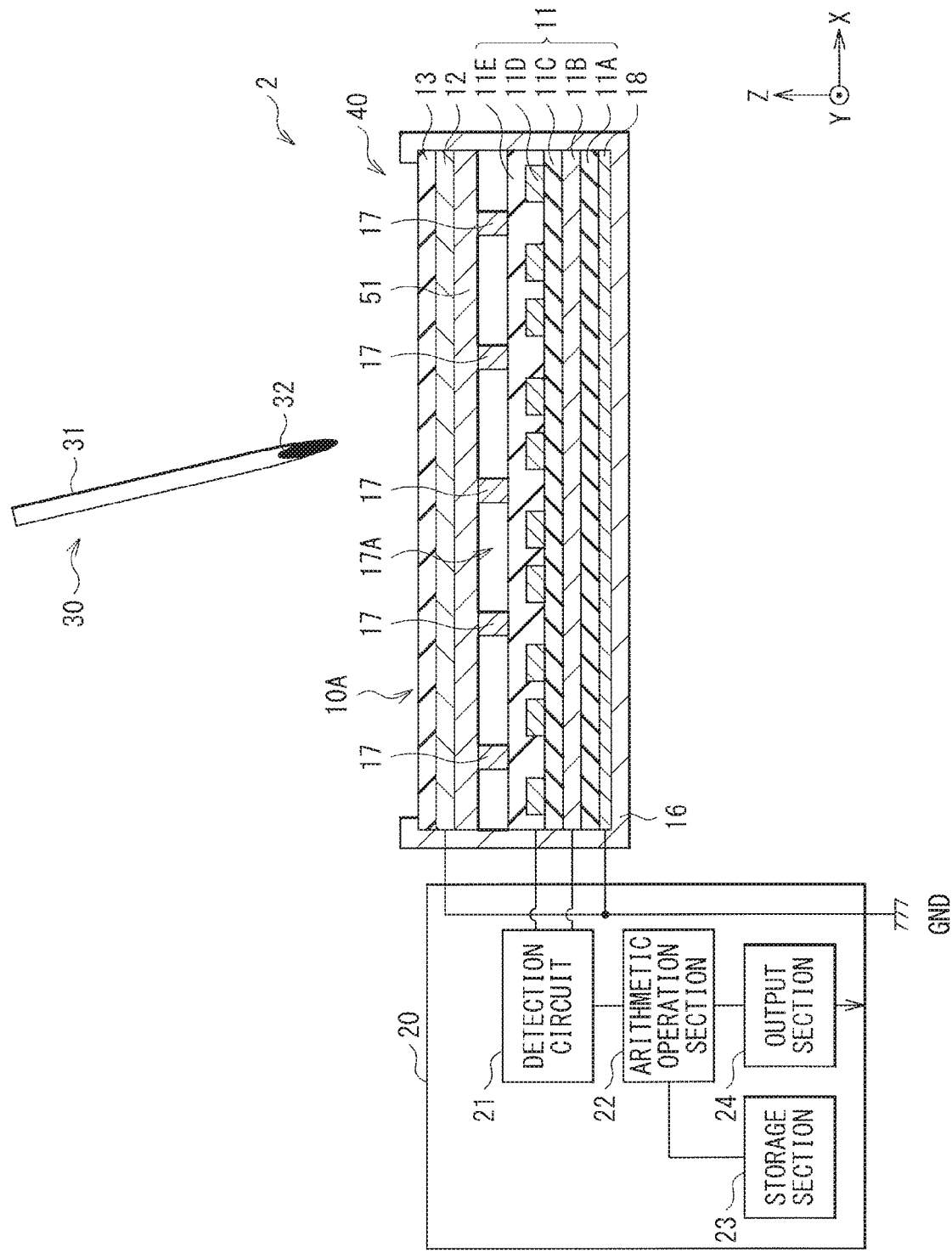
[FIG. 19]

[FIG. 20]
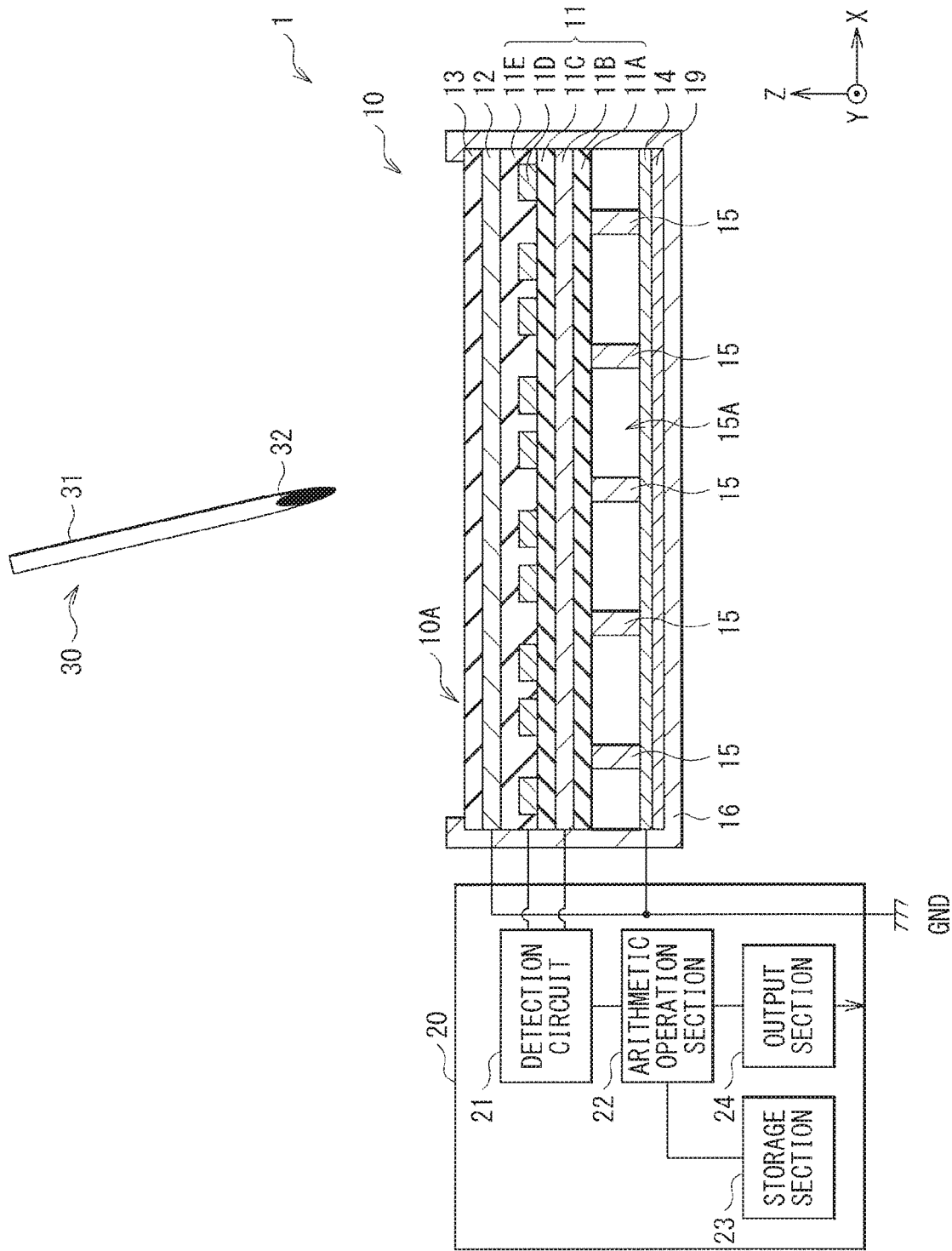

[FIG. 21]
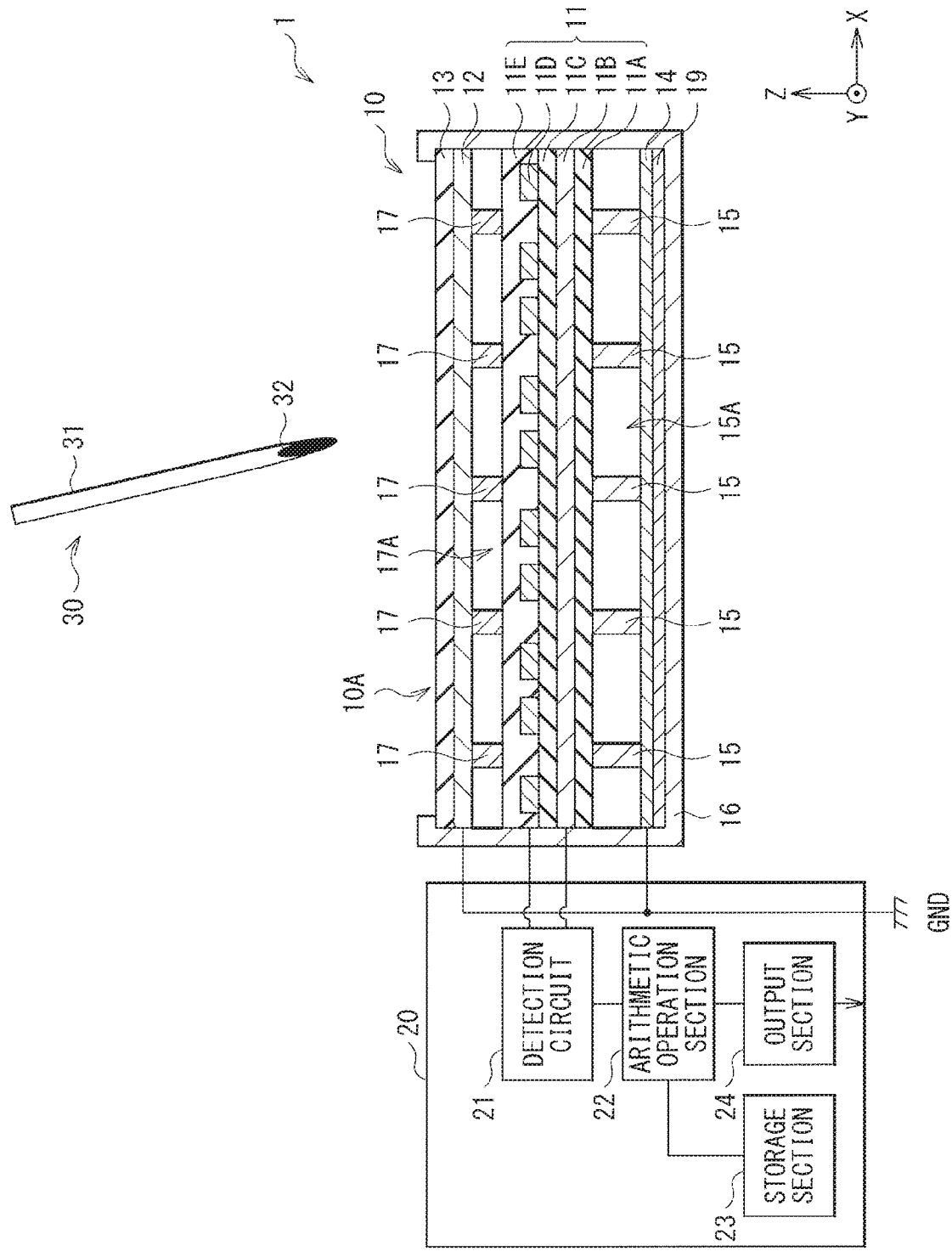

[FIG. 22]
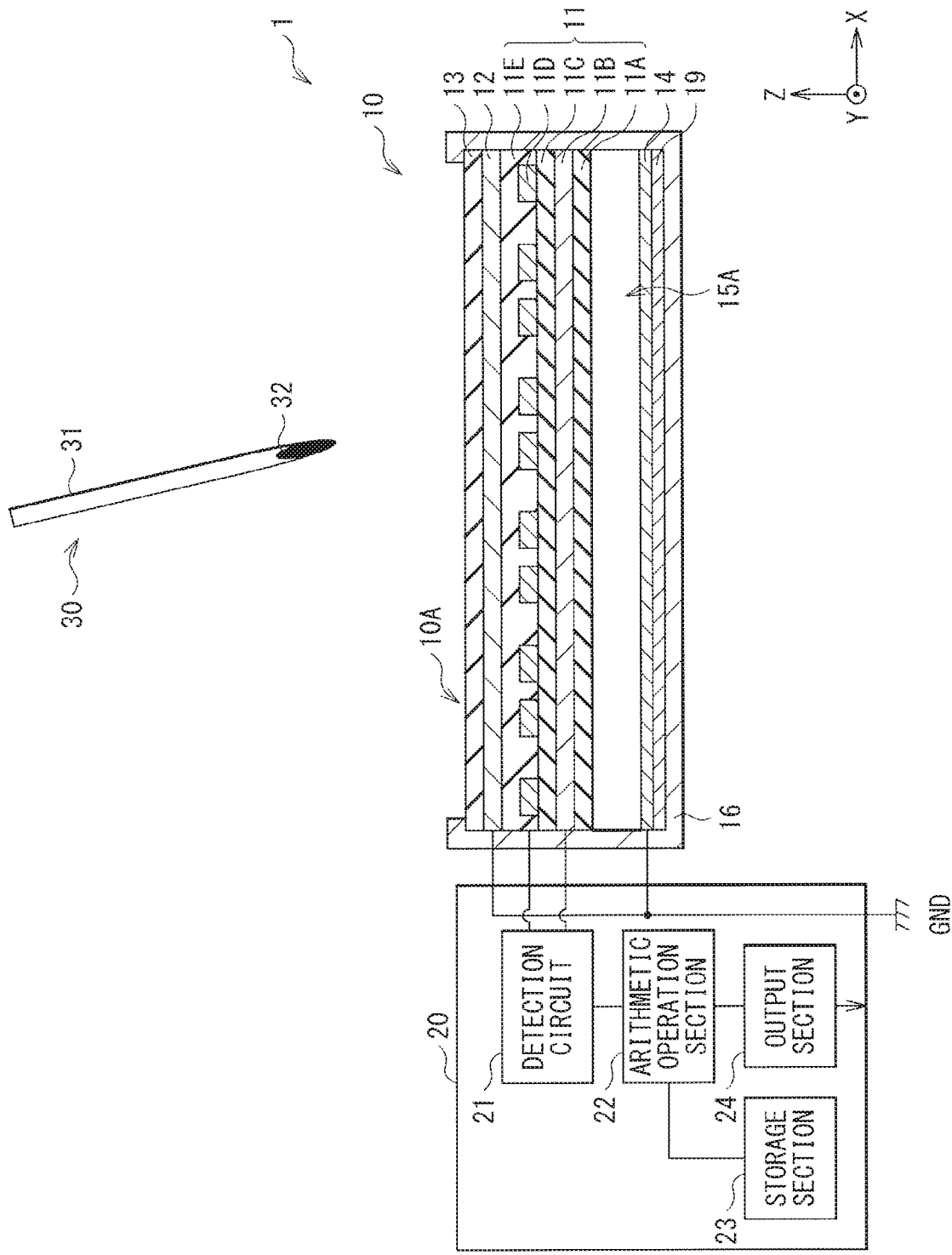

[FIG. 23]
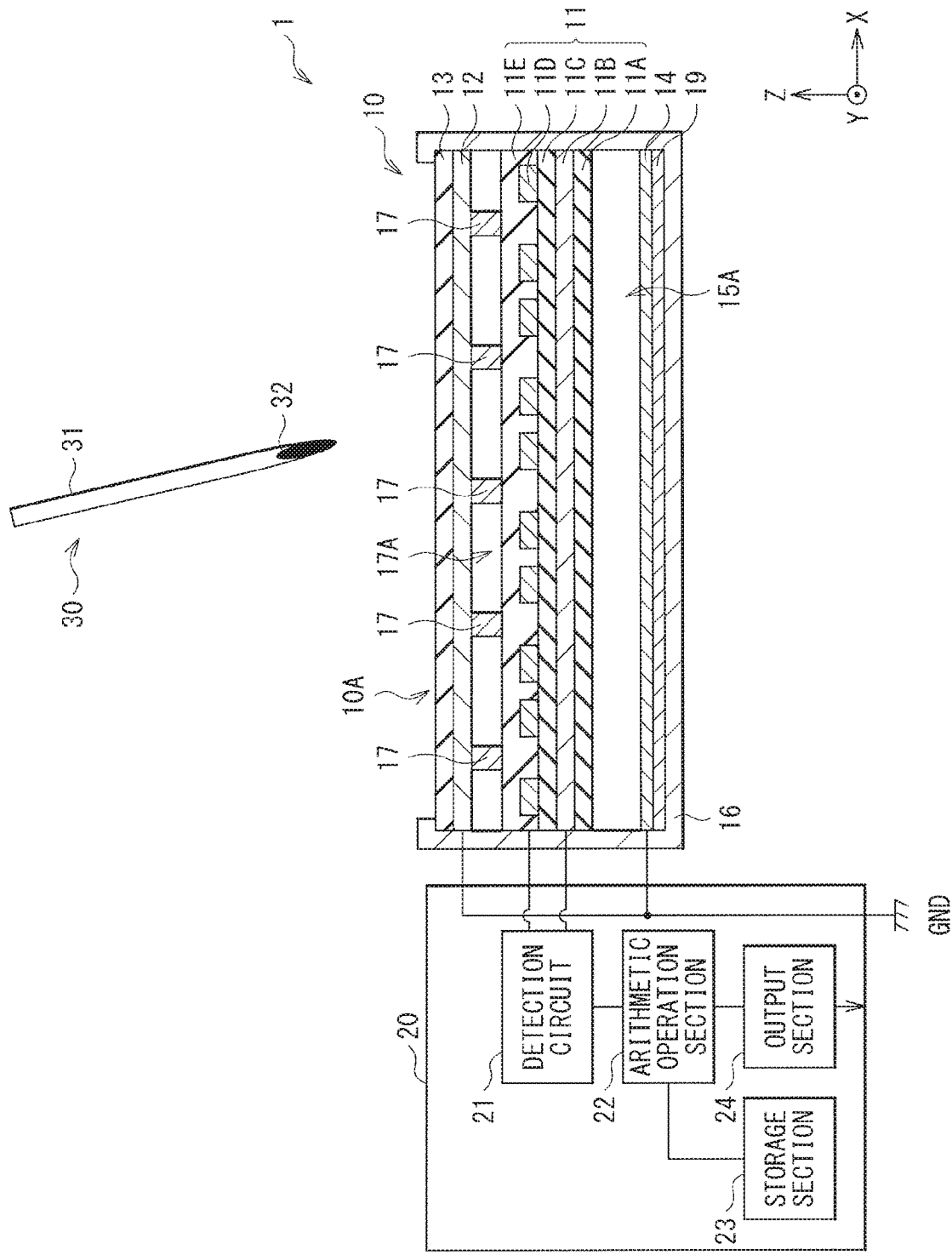

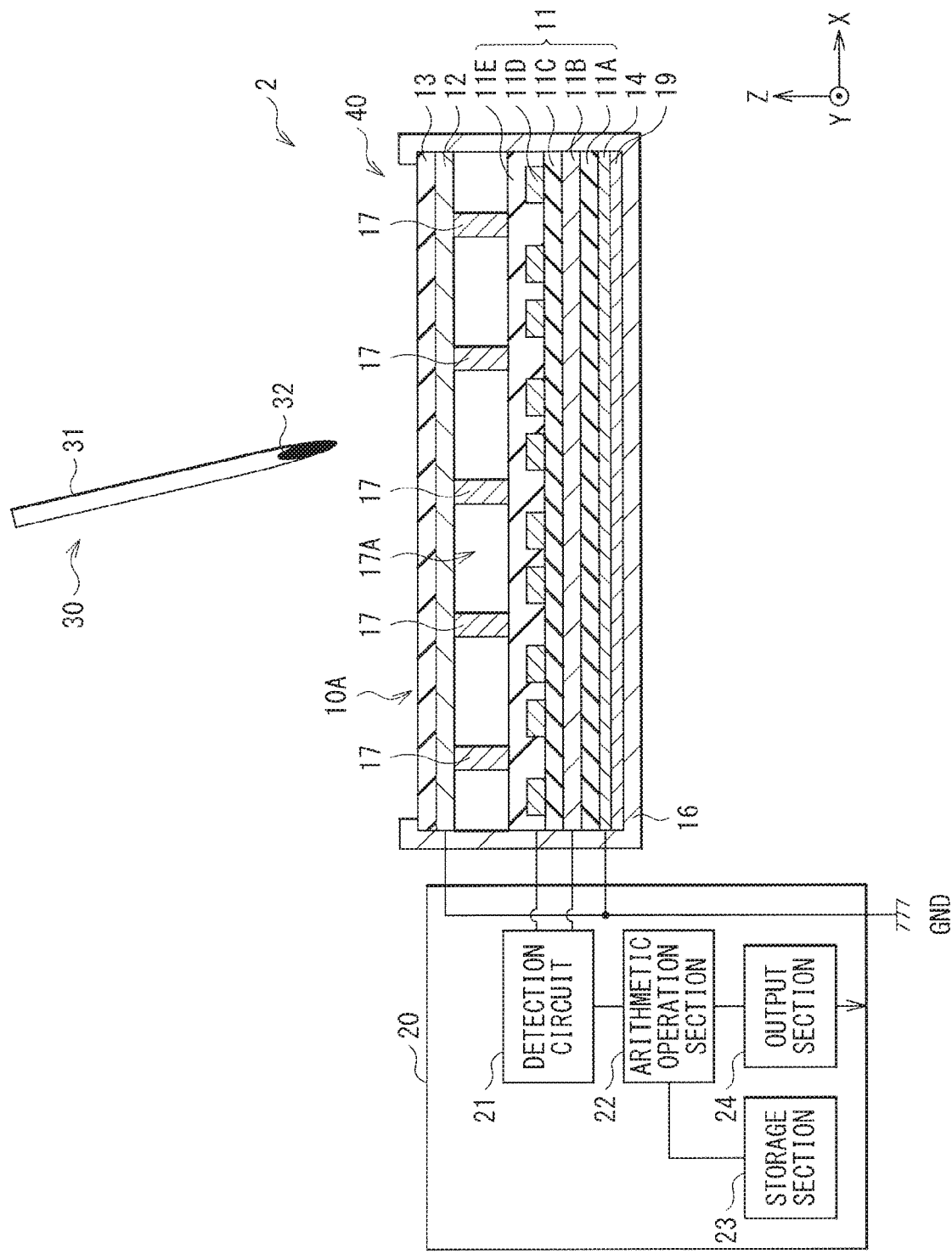
[FIG. 24]

[FIG. 25]
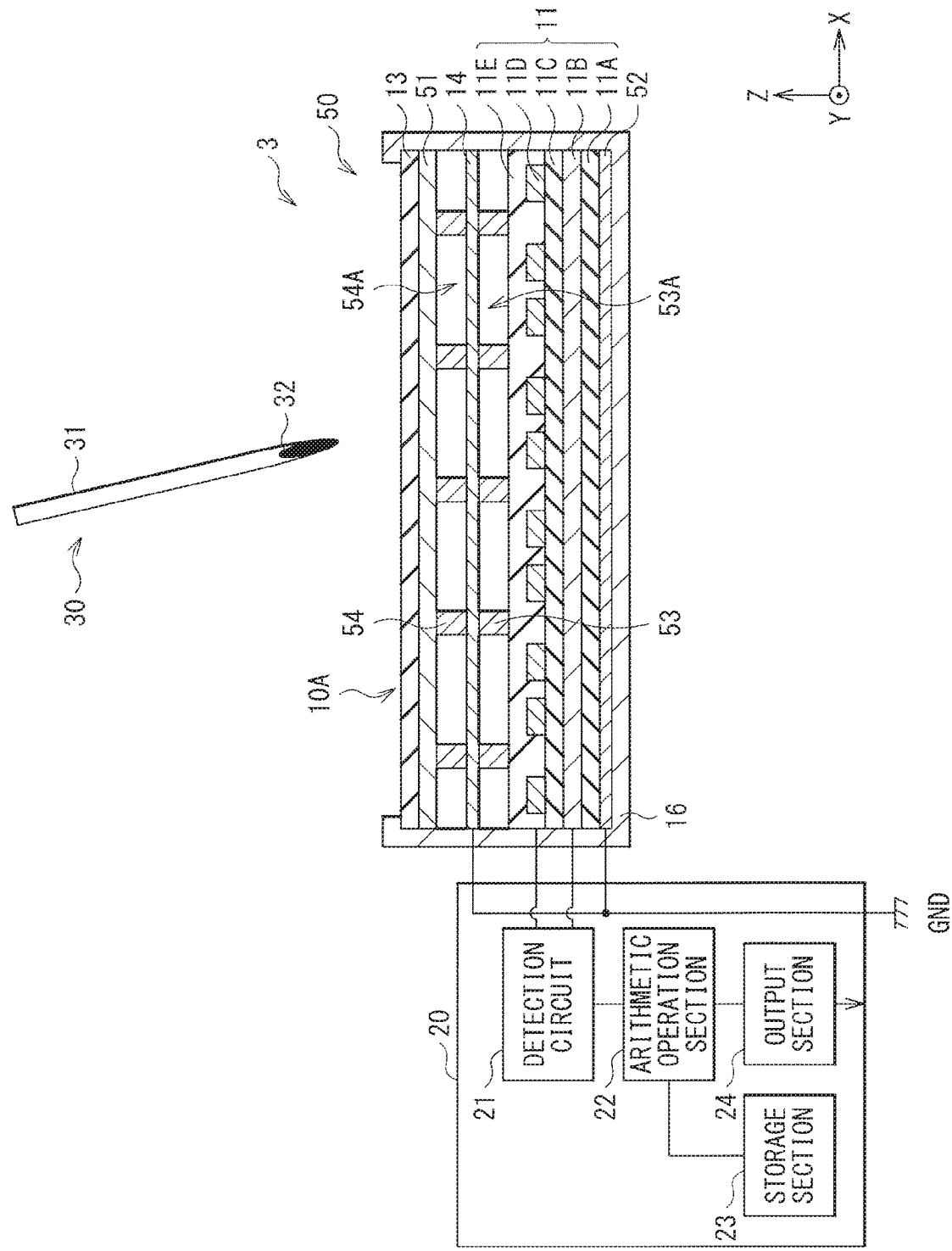

[FIG. 26]
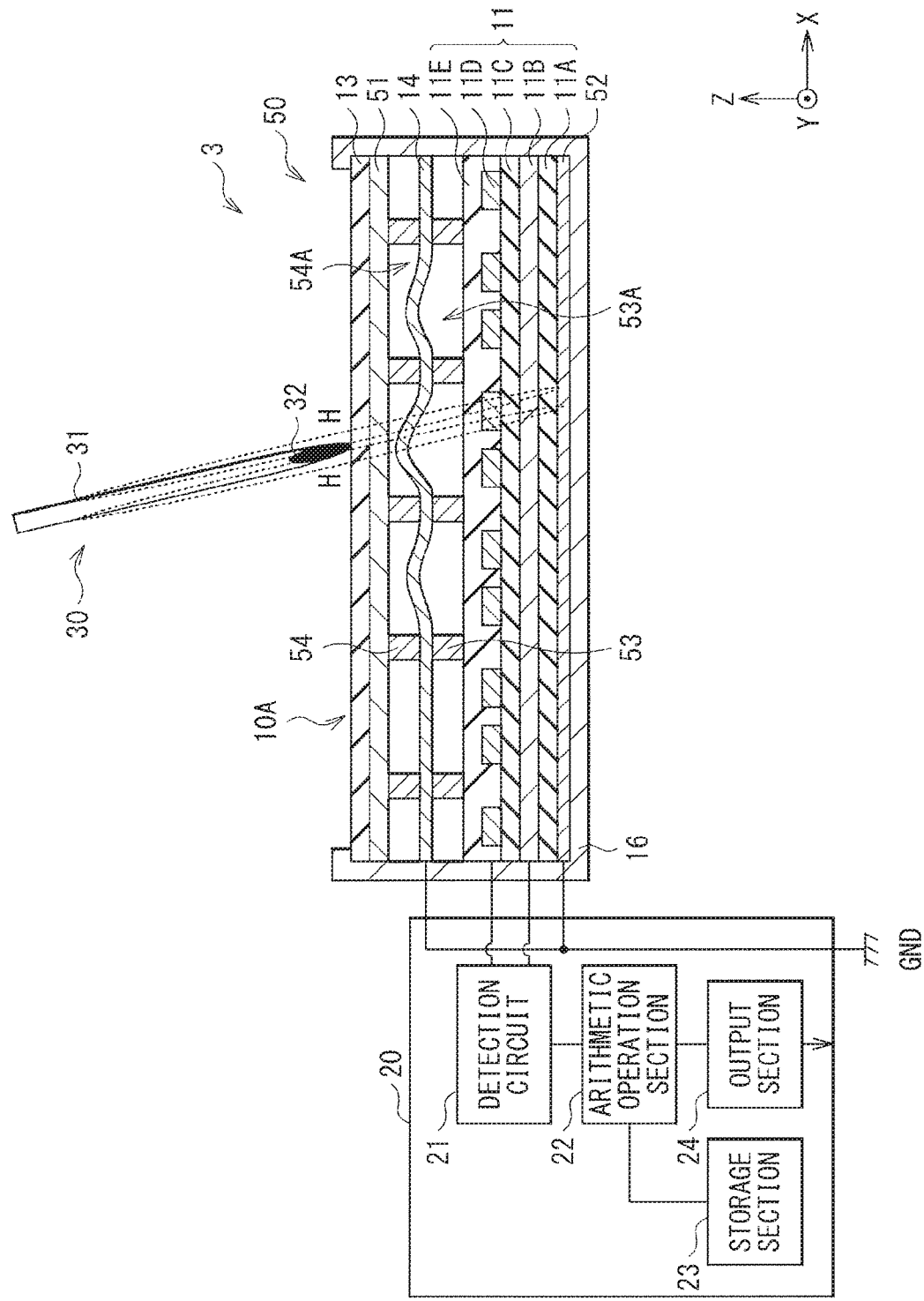

[ FIG. 27 ]
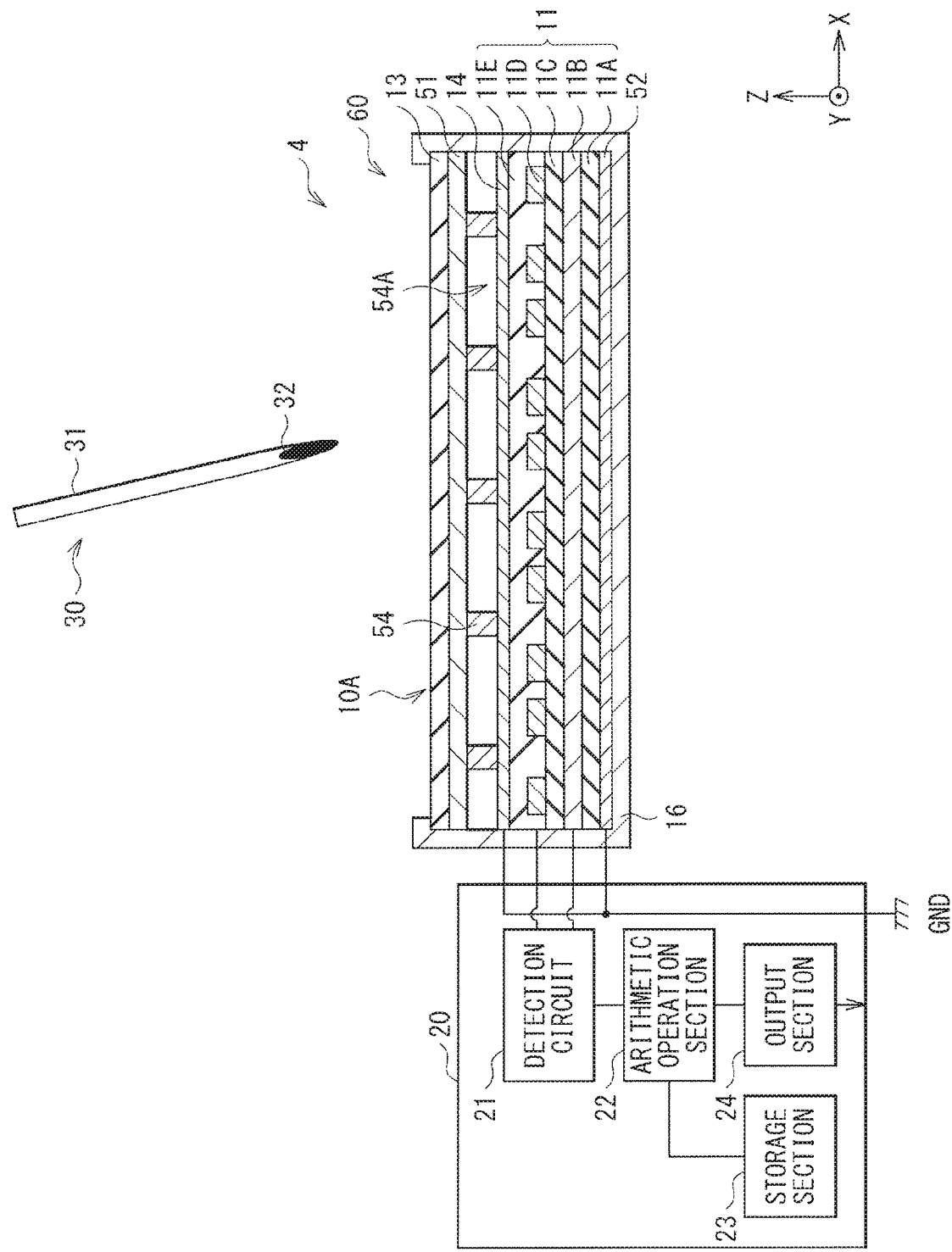

[ FIG. 28 ]
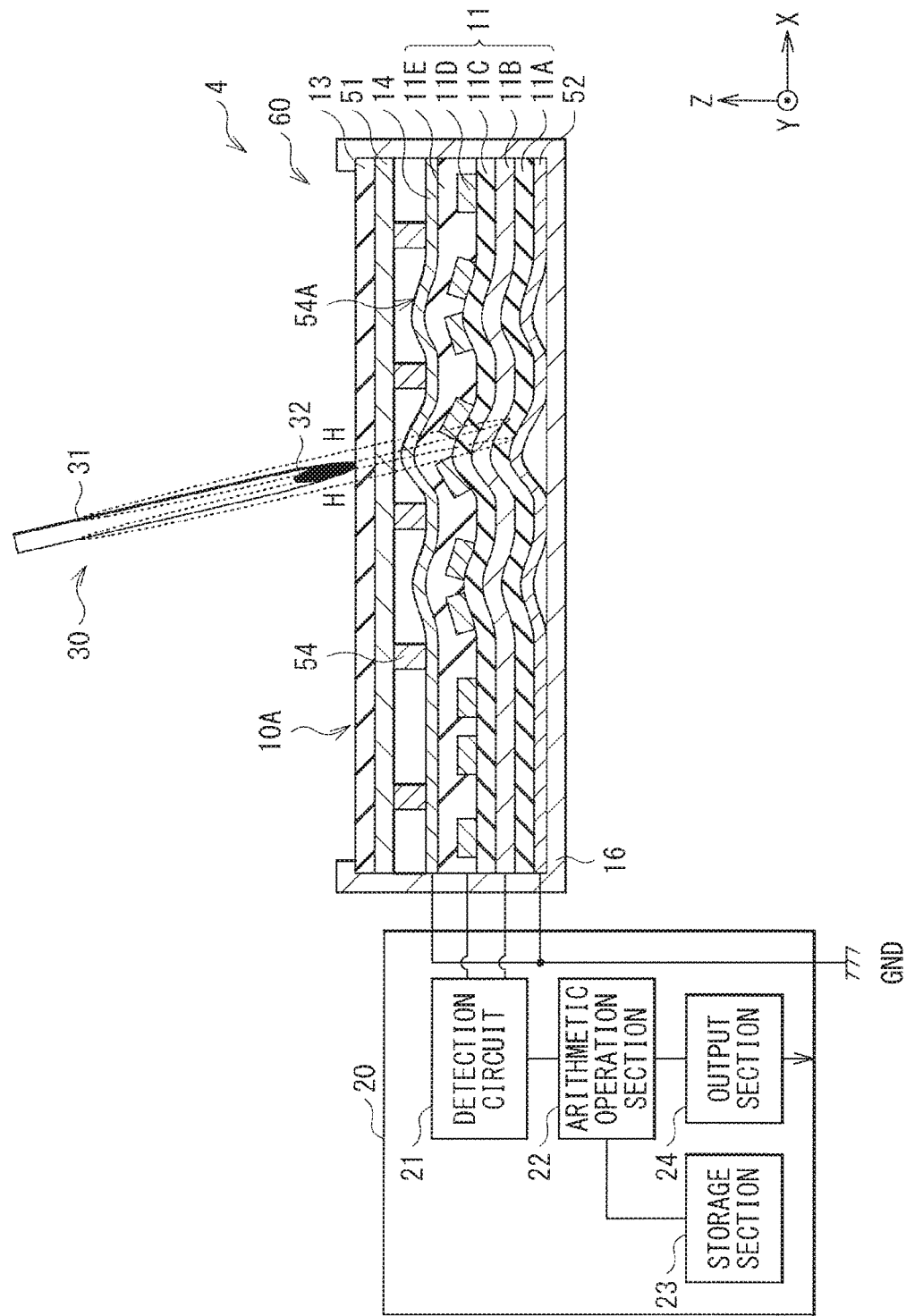

[ FIG. 29 ]
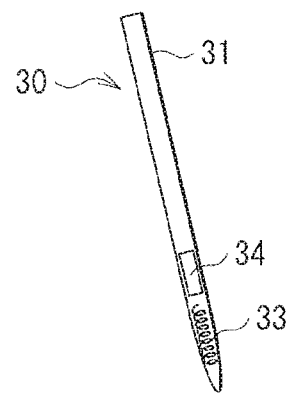
[ FIG. 30 ]
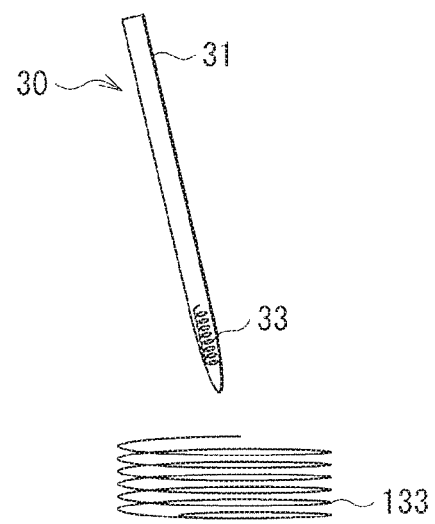

[ FIG. 31 ]
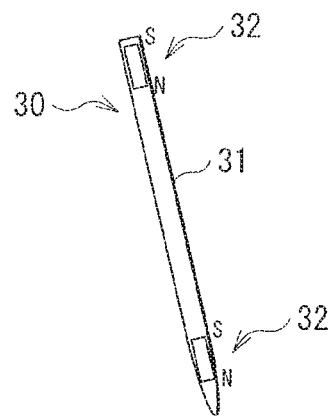
[ FIG. 32 ]
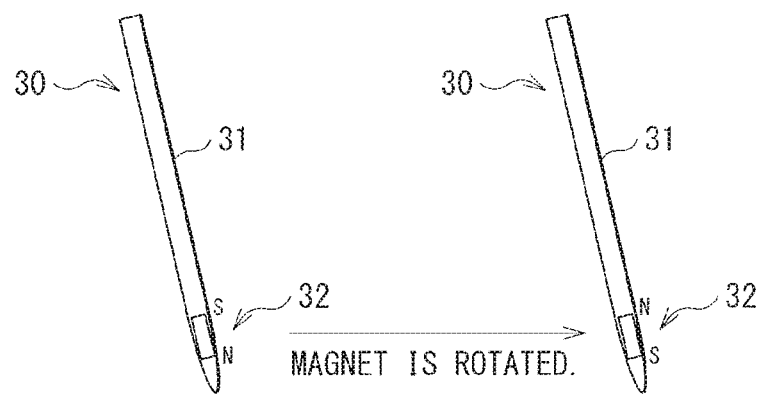

[ FIG. 33 ]
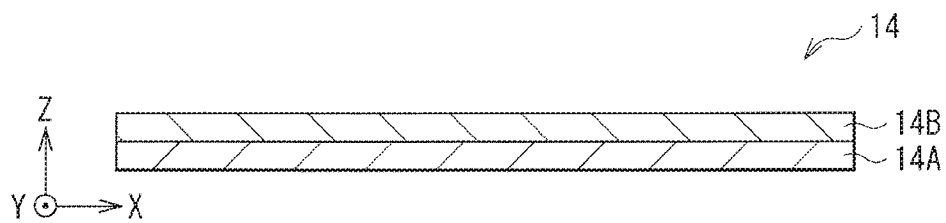
[ FIG. 34 ]
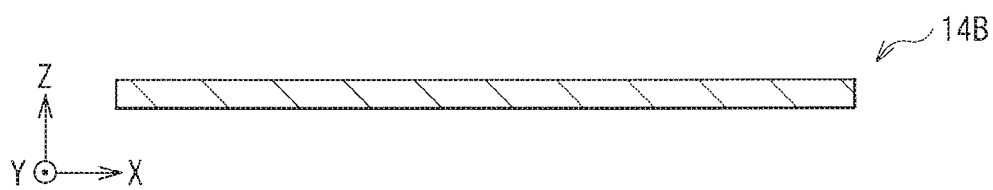
[ FIG. 35A ]
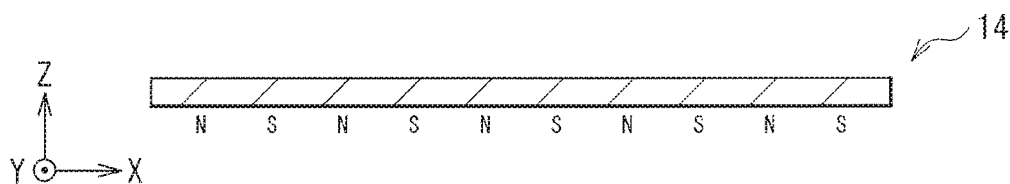
[ FIG. 35B ]
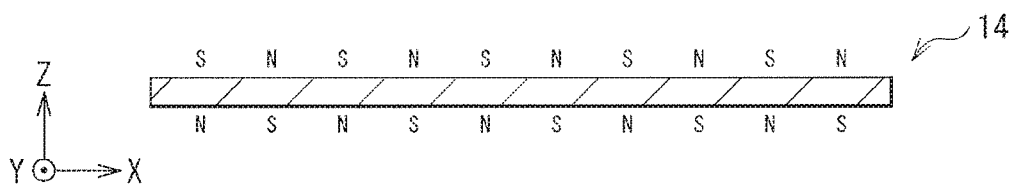
[ FIG. 35C ]
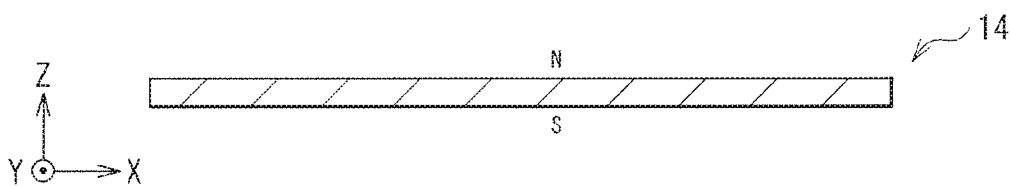

[ FIG. 36 ]
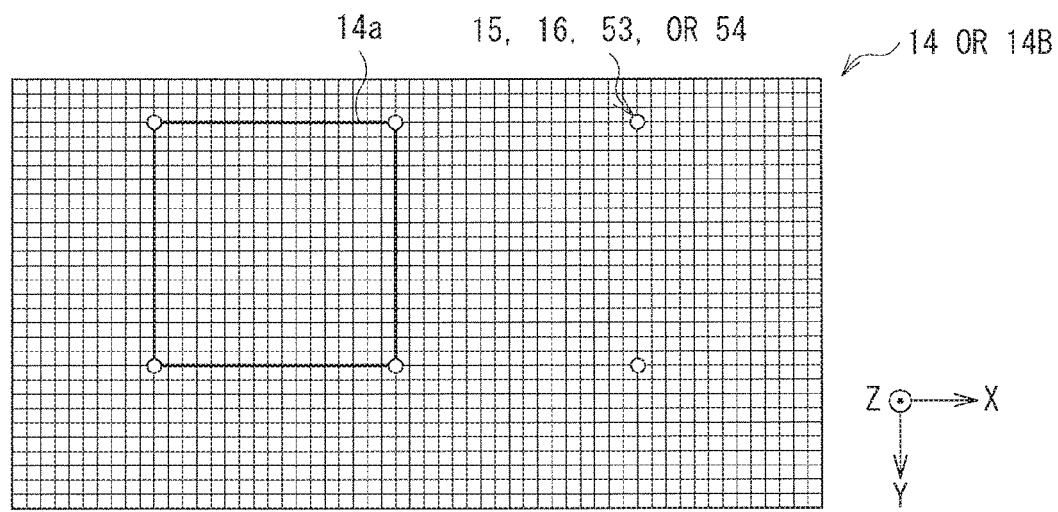
[ FIG. 37 ]
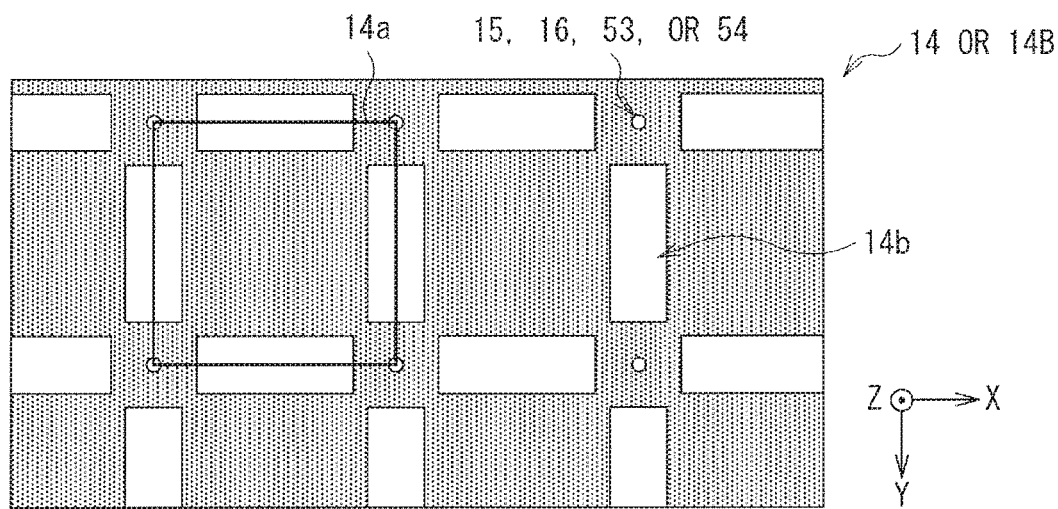

[ FIG. 38 ]
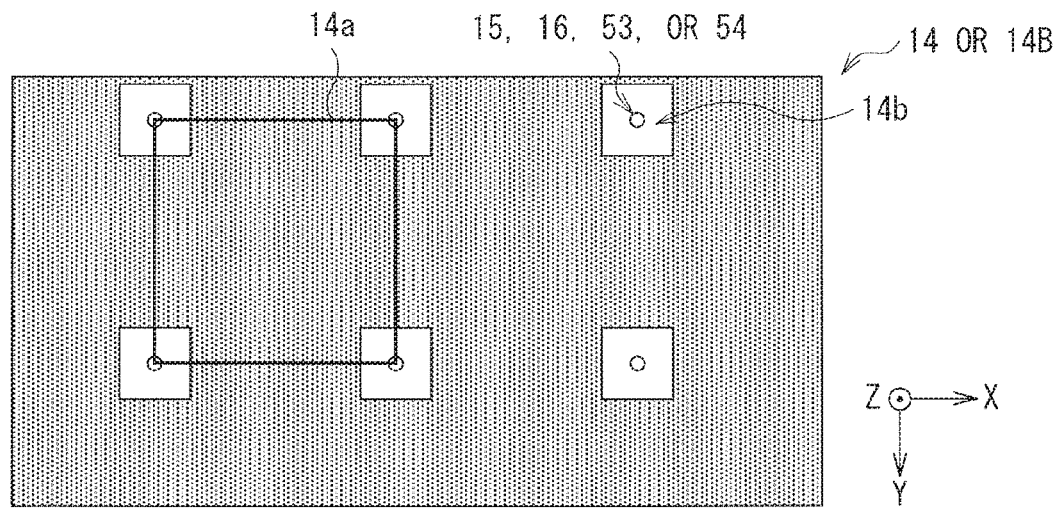
[ FIG. 39 ]
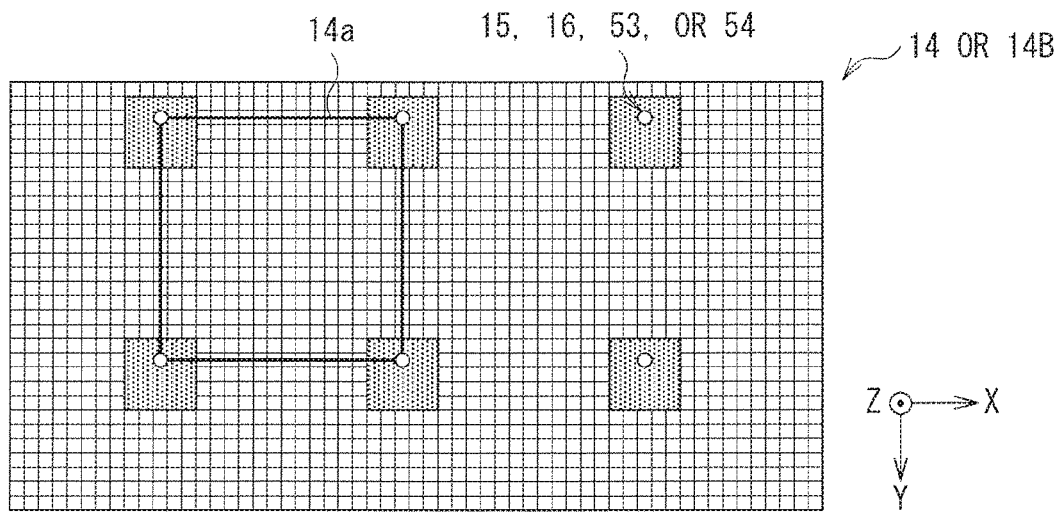

[ FIG. 40 ]
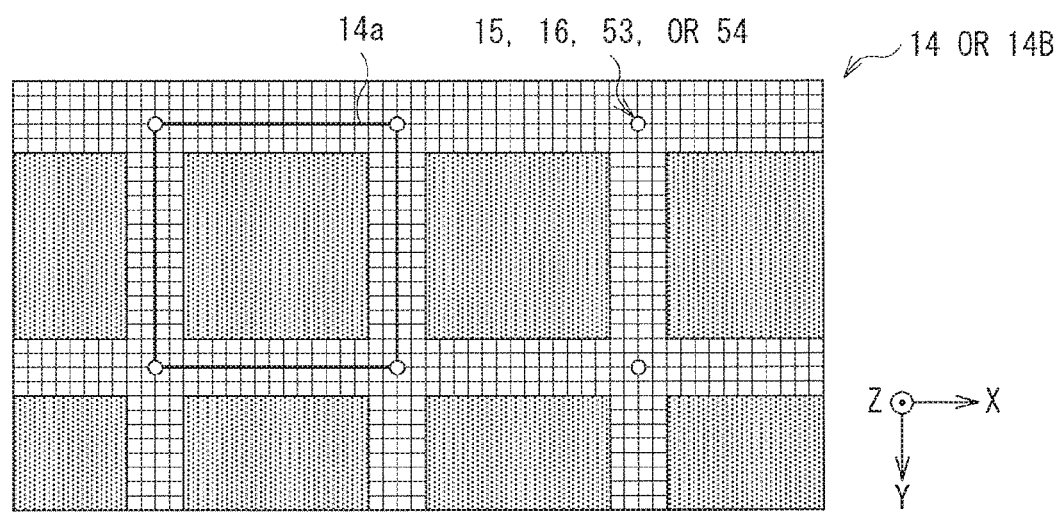

[FIG. 41]
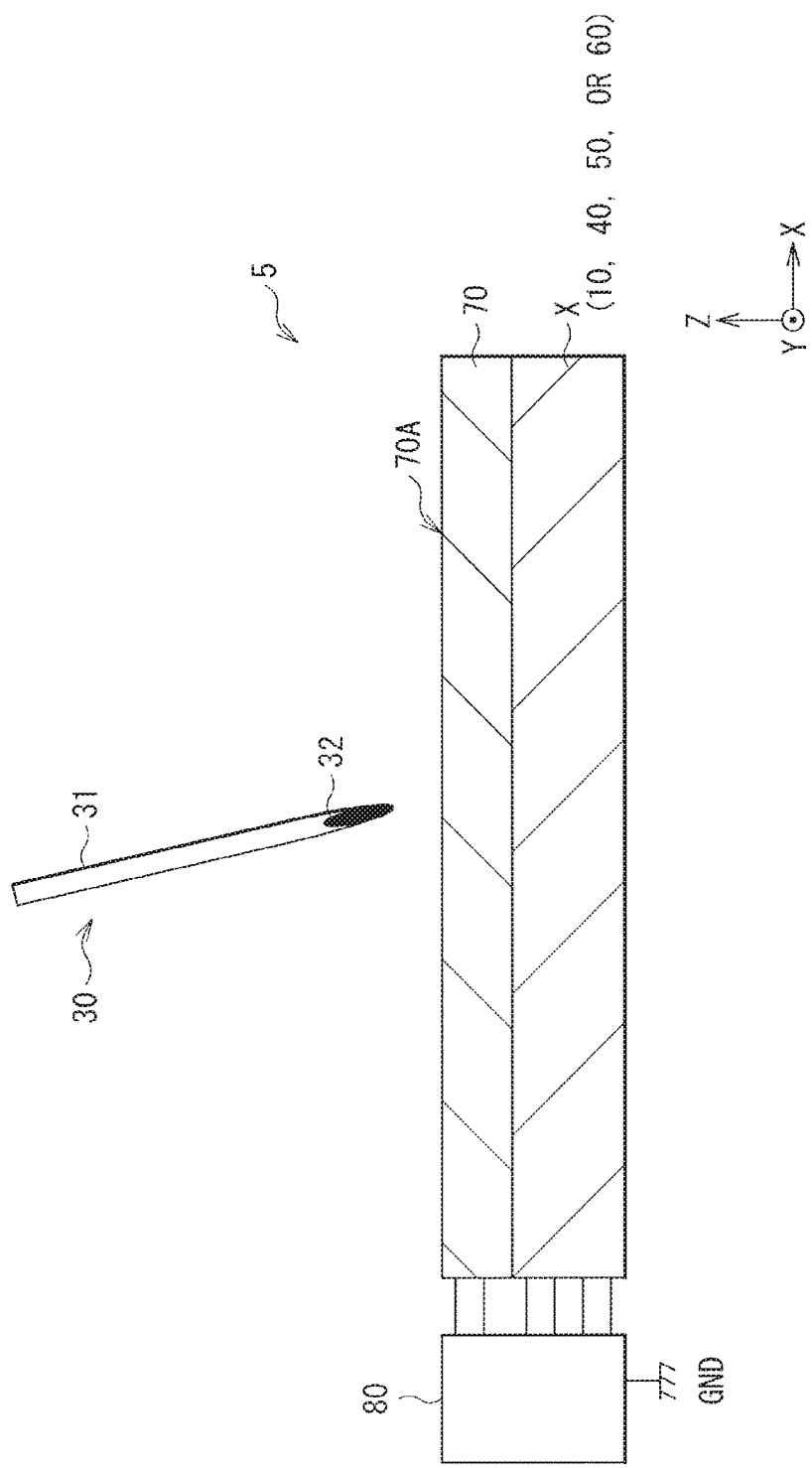

[ FIG. 42 ]
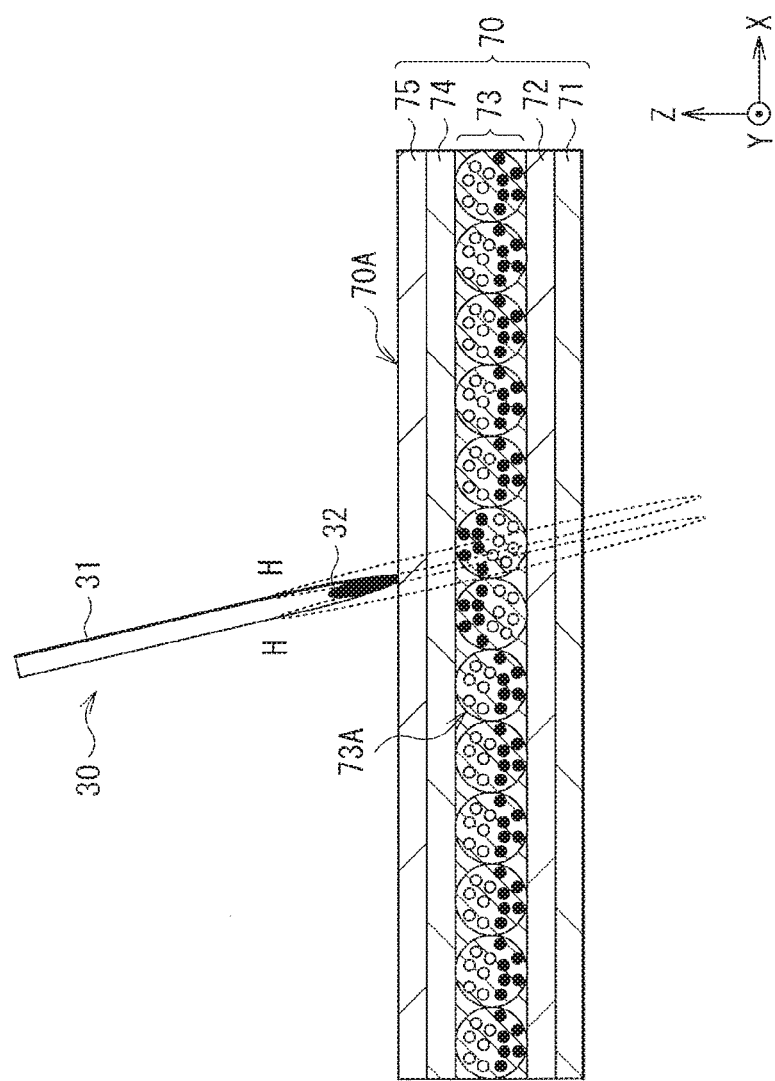

[FIG. 43]
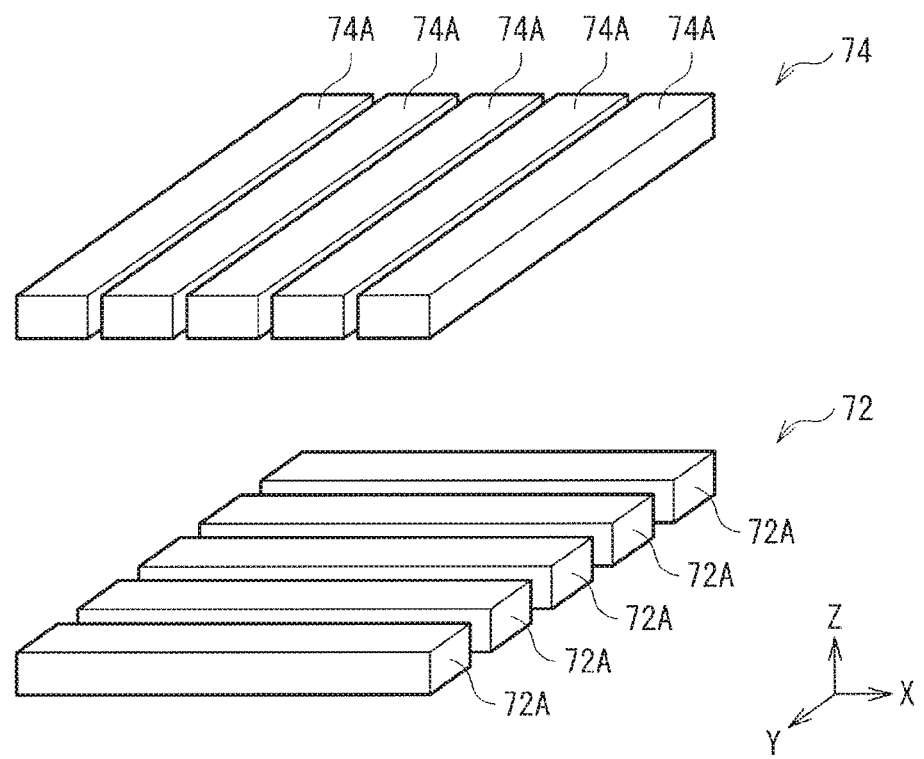

[ FIG. 44 ]
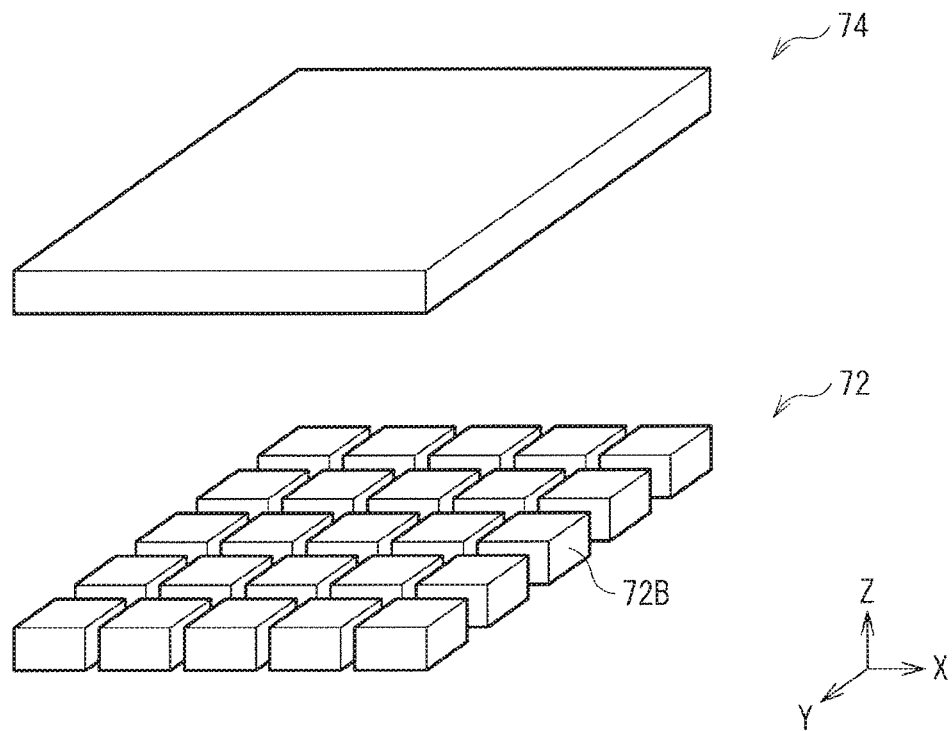
[ FIG. 45 ]
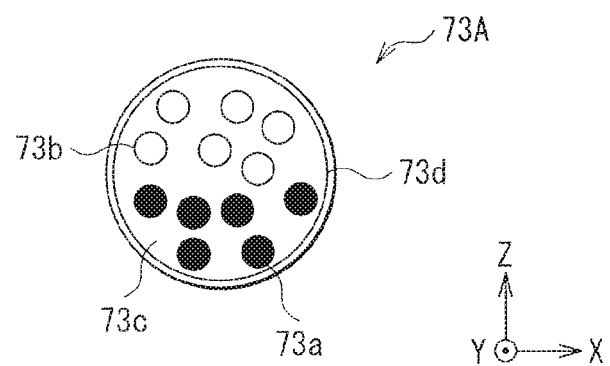

[FIG. 46]
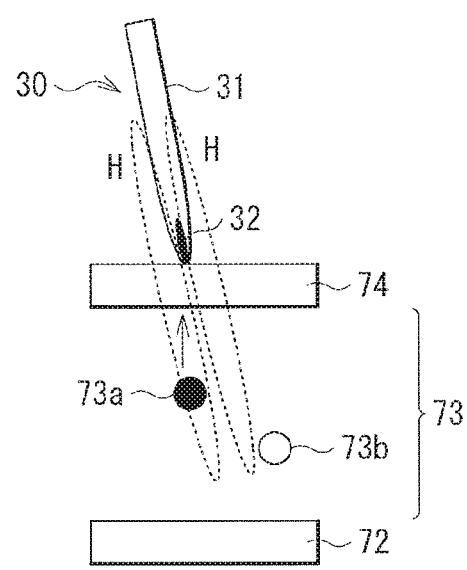

[ FIG. 47A ]
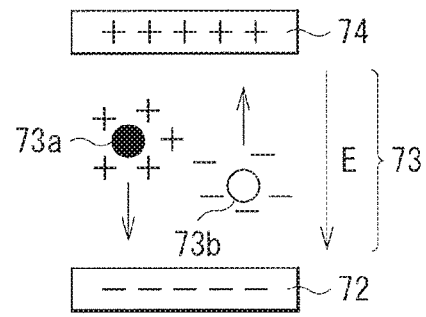
[ FIG. 47B ]
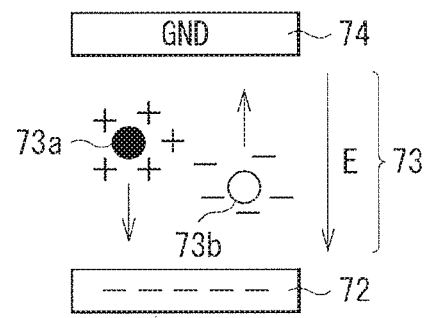
[ FIG. 47C ]
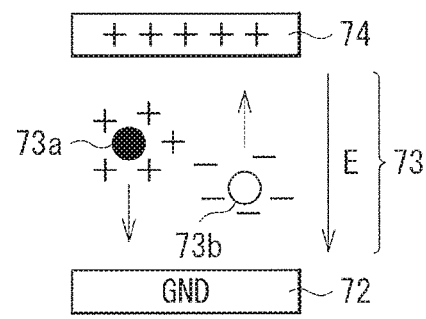

[ FIG. 47D ]
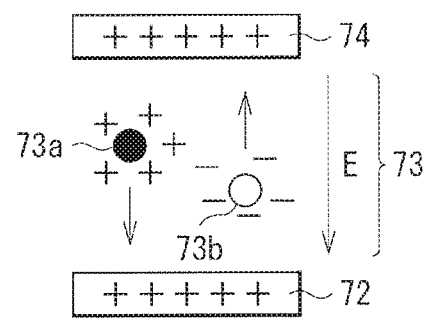
[ FIG. 47E ]
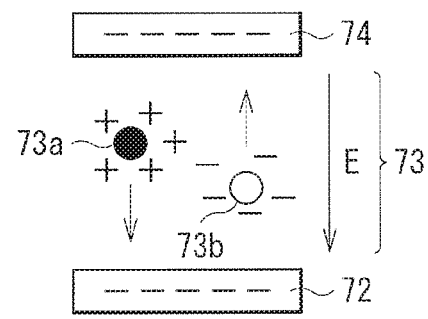

[ FIG. 48A ]
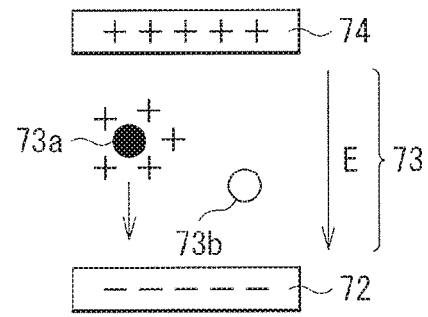
[ FIG. 48B ]
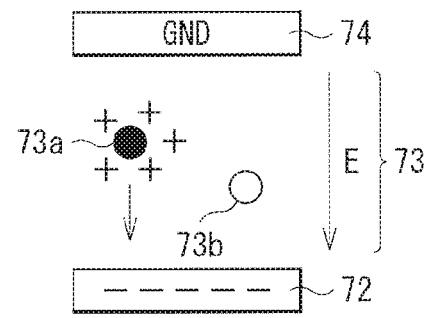
[ FIG. 48C ]
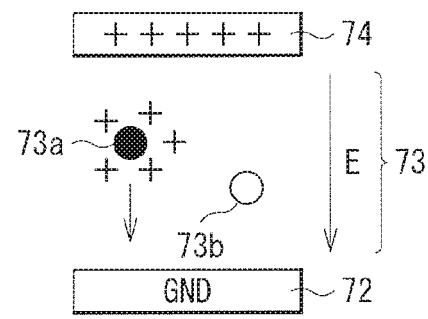

[ FIG. 48D ]
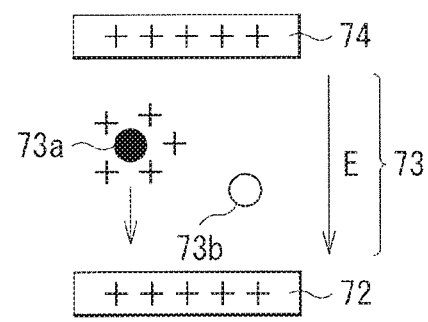
[ FIG. 48E ]
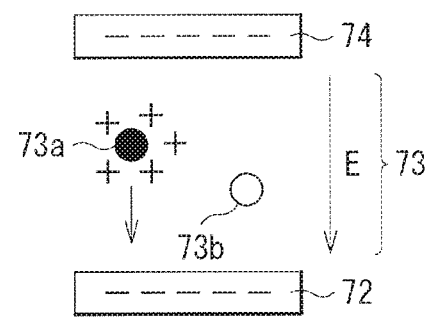

[ FIG. 49A ]
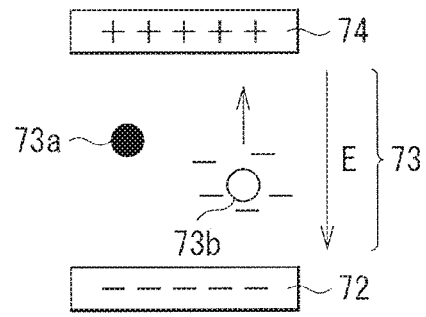
[ FIG. 49B ]
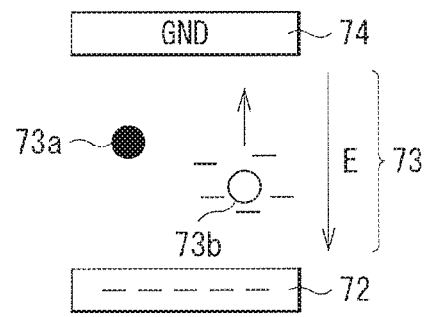
[ FIG. 49C ]
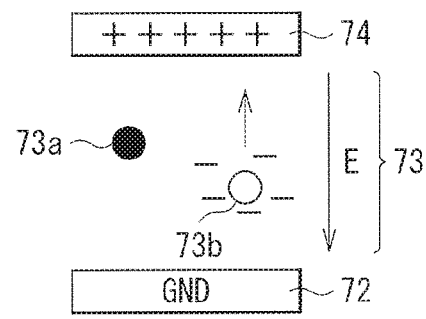

[ FIG. 49D ]
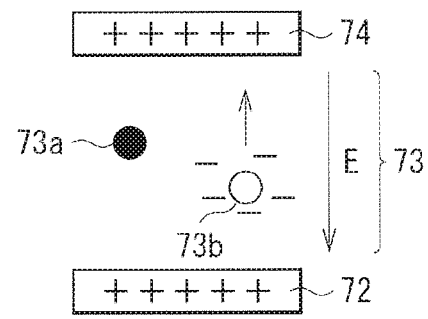
[ FIG. 49E ]
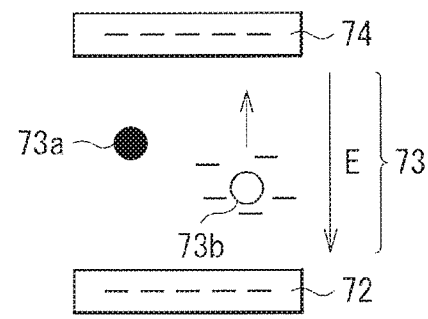

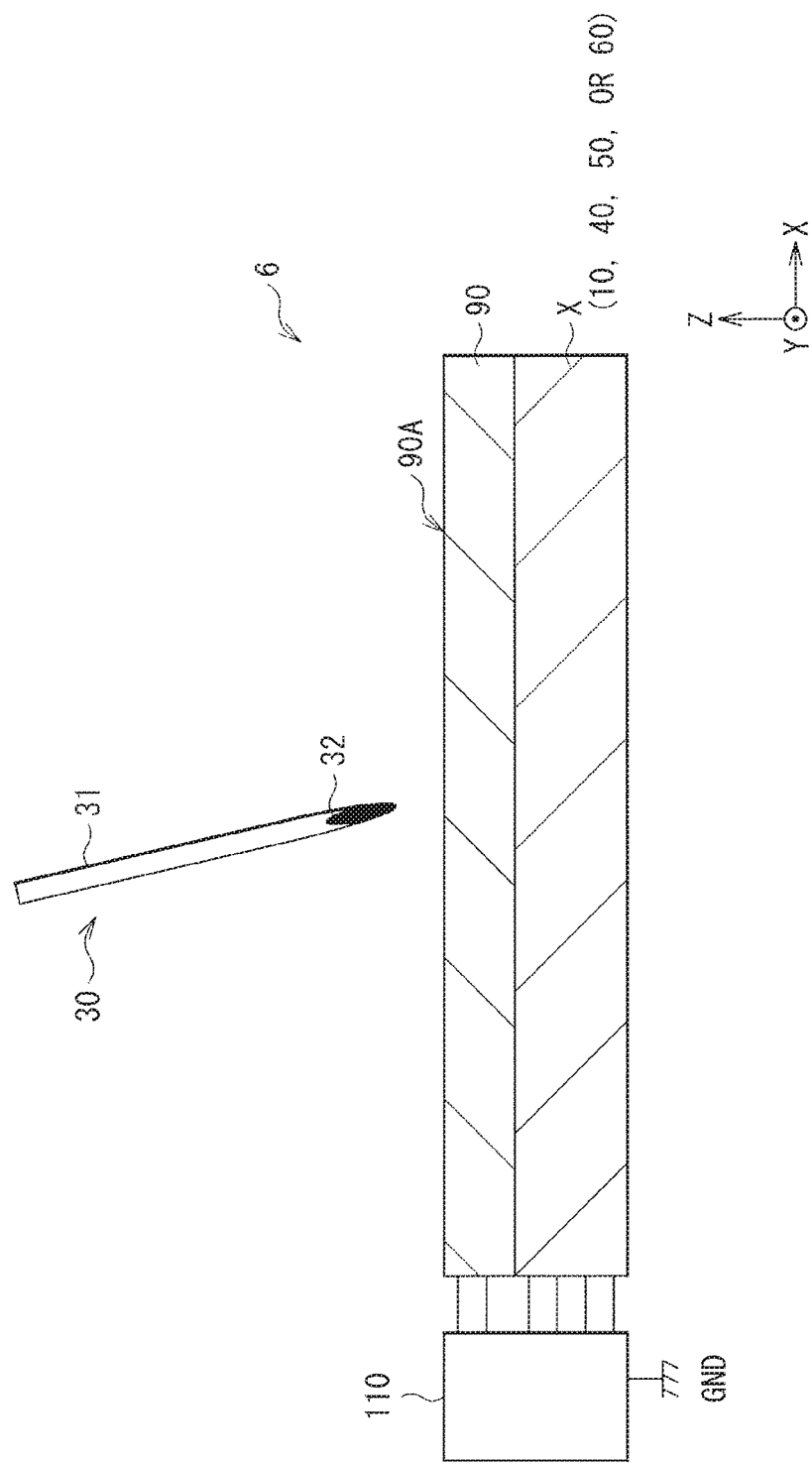
[FIG. 50]

[ FIG. 51 ]
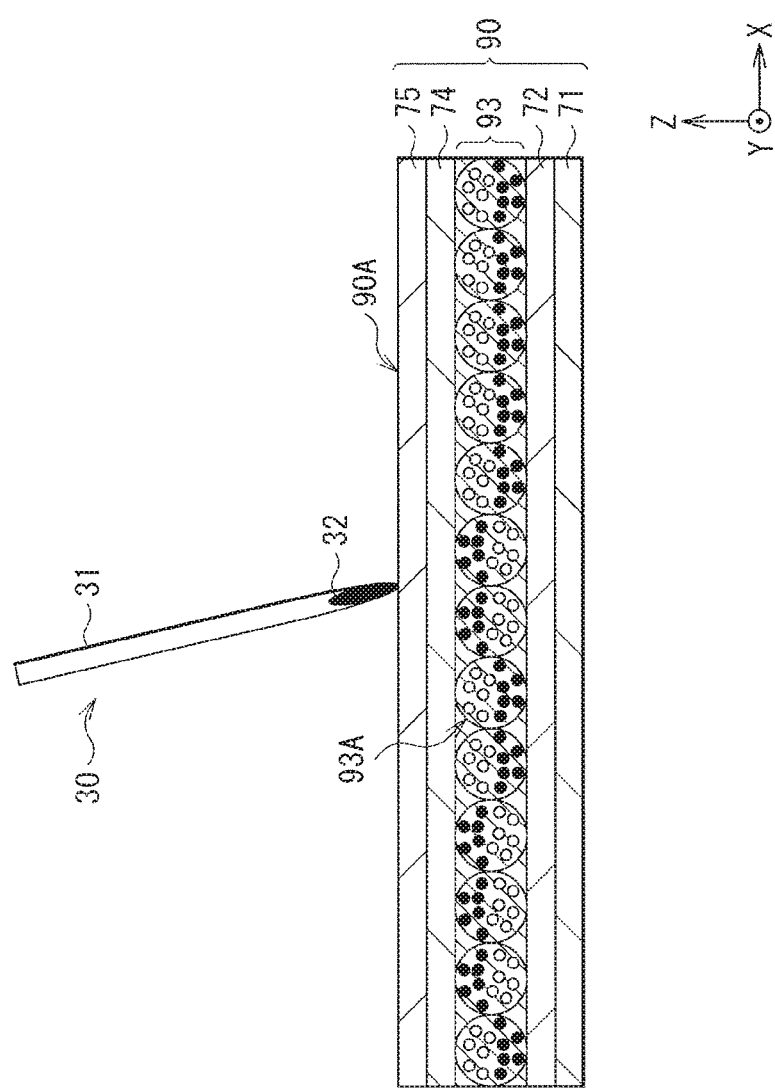

[ FIG. 52 ]
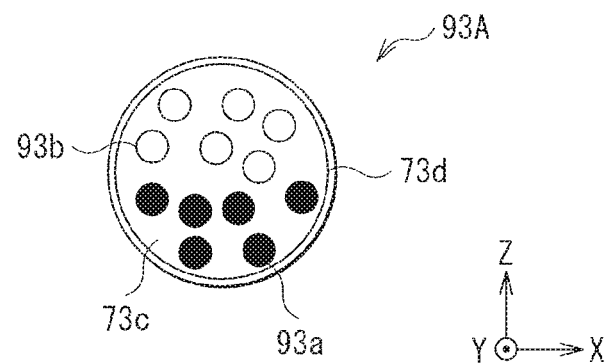

[ FIG. 53 ]
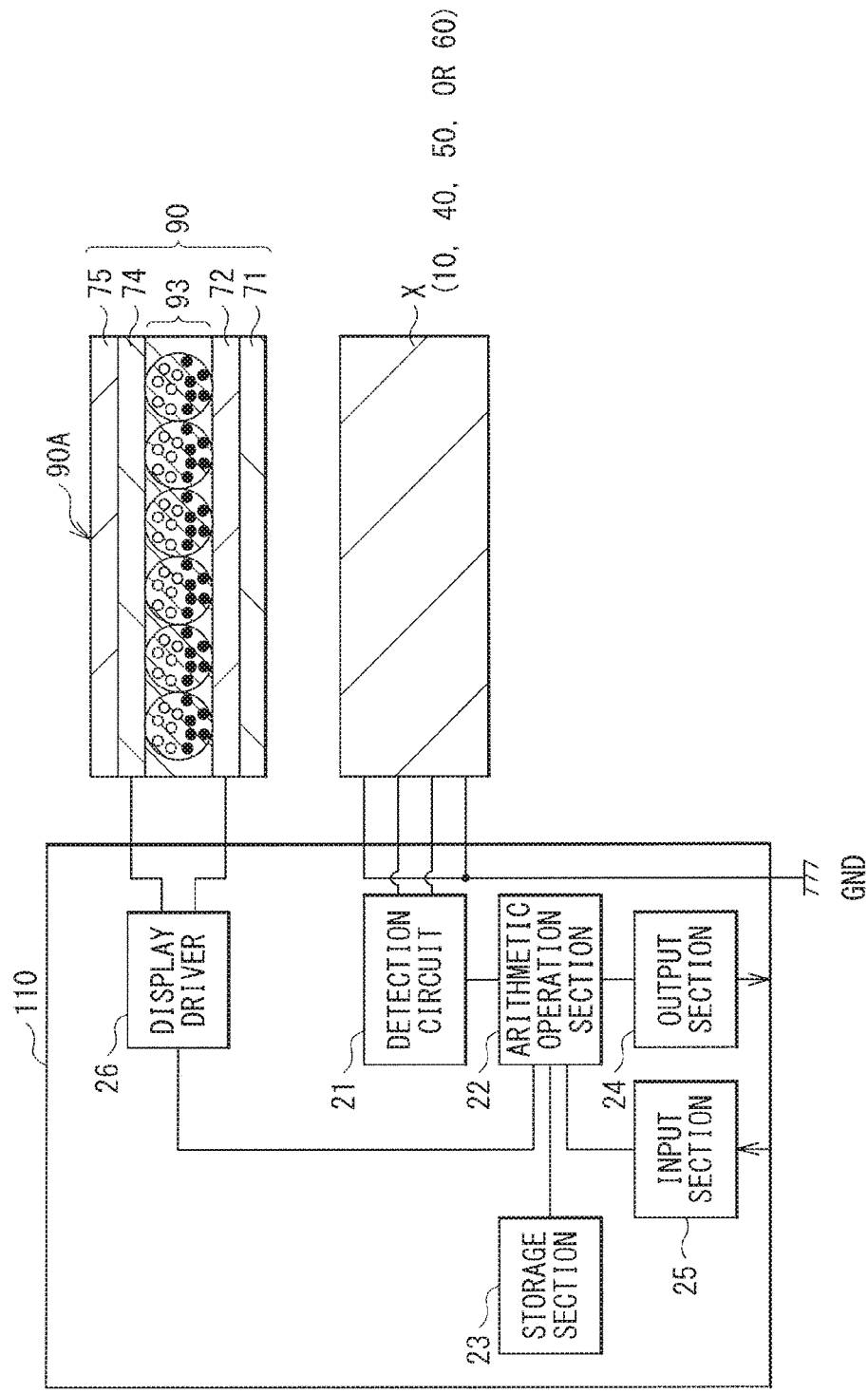

[ FIG. 54 ]
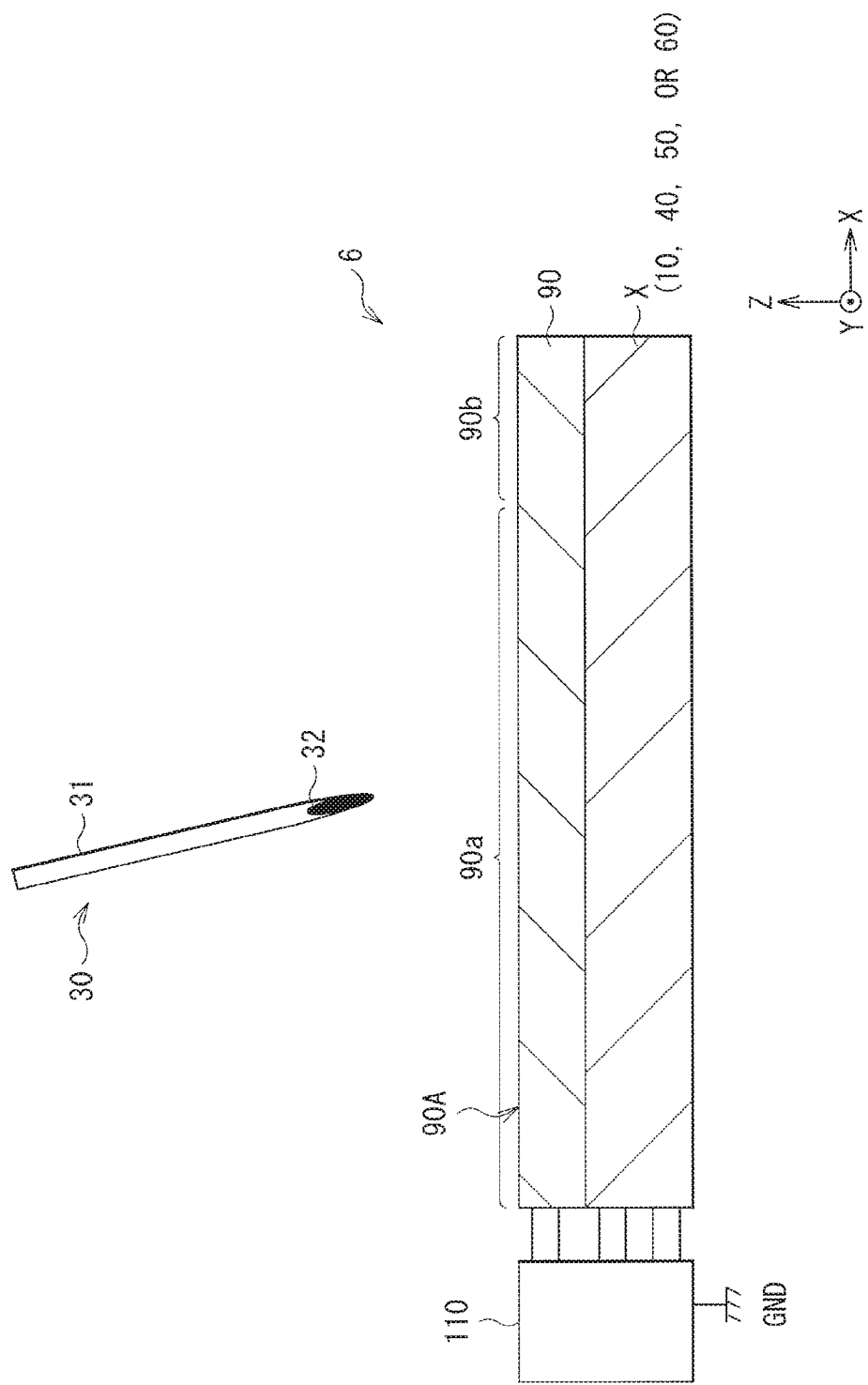

SENSOR PANEL, INPUT UNIT, AND DISPLAY UNIT

CROSS REFERENCE TO RELATED APPLICATIONS

This application is a U.S. National Phase of International Patent Application No. PCT/JP2015/061582 filed on Apr. 15, 2015, which claims priority benefit of Japanese Patent Application No. JP 2014-127424 filed in the Japan Patent Office on Jun. 20, 2014. Each of the above-referenced applications is hereby incorporated herein by reference in its entirety.

TECHNICAL FIELD

The present technology relates to a sensor panel, an input unit, and a display unit that make it possible to perform information input using magnetic force.

BACKGROUND ART

As a sensor unit for an electronic apparatus, for example, there is known a configuration that may include capacitors and make it possible to detect an operation position and pressing force of an operation element on an input operation surface (for example, see PTL 1 stated below). An example of the operation element may include a pen or a finger.

CITATION LIST

Patent Literature

[PTL 1] Japanese Unexamined Patent Application Publication No. 2011-170659

SUMMARY

Meanwhile, an input unit as described above may be disadvantageous in that a plurality of points are detected in the event that a finger or a palm touches an input operation surface at the time of pen-based input operation, resulting in a malfunction.

Accordingly, it is desirable to provide a sensor panel, an input unit, and a display unit that make it possible to suppress a malfunction caused by a touch of a finger or a palm.

A sensor panel according to an embodiment of the present technology includes a sensor section that detects magnetic force of a contacting surface or a region in the vicinity of the contacting surface on a basis of a change in capacitance and is allowed to output a signal depending on the change in capacitance along with information on a position where the change in capacitance has occurred.

An input unit according to an embodiment of the present technology includes: a sensor section; a driver that drives the sensor section and generates coordinate data based on an output of the sensor section; and a pen that generates a magnetic field from a tip of the pen. The sensor section detects magnetic force of a contacting surface or a region in the vicinity of the contacting surface on a basis of a change in capacitance and is allowed to output a signal depending on the change in capacitance along with information on a position where the change in capacitance has occurred.

A display unit according to an embodiment of the present technology includes: a sensor section; and a display section that changes display depending on at least a change in an electrical field of changes in a magnetic field and the electrical field. The display unit according to the embodiment of the present technology further includes: a first driver that drives the sensor section and generates coordinate data based on an output of the sensor section; a second driver that changes display by applying an electrical field to the display section; and a pen that generates a magnetic field from a tip of the pen. The sensor section detects magnetic force of a contacting surface or a region in the vicinity of the contacting surface on a basis of a change in capacitance and is allowed to output a signal depending on the change in capacitance along with information on a position where the change in capacitance has occurred.

In the sensor panel according to the embodiment of the present technology, the magnetic force of the contacting surface or the region in the vicinity of the contacting surface is detected on the basis of a change in capacitance, and a signal depending on the change in capacitance is allowed to be outputted along with information on a position where the change in the capacitance has occurred. For example, this makes it possible to generate coordinate data based on an output of the sensor panel and to display an image based on the generated coordinate data. In the input unit and the display unit according to the respective embodiments of the present technology, the magnetic force of the contacting surface or the region in the vicinity of the contacting surface is detected on the basis of a change in capacitance, and a signal depending on the change in capacitance is allowed to be outputted along with information on a position where the change in capacitance has occurred. This makes it possible to generate coordinate data based on an output of the sensor section and to display an image based on the generated coordinate data.

According to the sensor panel, the input unit, and the display unit of the respective embodiments of the present technology, the magnetic force of the contacting surface or the region in the vicinity of the contacting surface is detected on the basis of a change in capacitance, and a signal depending on the change in capacitance is allowed to be outputted along with information on a position where the change in the capacitance has occurred, which makes it possible to suppress a malfunction caused by a touch of a finger or a palm that does not almost cause a change in capacitance by magnetic force. It is to be noted that effects of the present technology are not limited to effects described here, and may be any of effects described in the description.

BRIEF DESCRIPTION OF DRAWINGS

FIG. 1 is a diagram illustrating an example of a cross-sectional configuration of an input unit according to a first embodiment of the present technology.

FIG. 2 is a diagram illustrating an example of action of the input unit illustrated in FIG. 1 when a pen tip touches a contacting surface.

FIG. 3 is a diagram illustrating an example of the amount of change in voltage in FIG. 2.

FIG. 4 is a diagram illustrating an example of action of the input unit illustrated in FIG. 1 when a pen tip touches a contacting surface.

FIG. 5 is a diagram illustrating an example of the amount of change in voltage in FIG. 4.

FIG. 6 is a diagram illustrating a modification example of a cross-sectional configuration of the input unit illustrated in FIG. 1.

FIG. 7 is a diagram illustrating an example of action of the input unit illustrated in FIG. 6 when a pen tip and a fingertip touch a contacting surface.

FIG. 8 is a diagram illustrating an example of the amount of change in voltage when a pen tip and a fingertip touch a contacting surface.

FIG. 9 is a diagram illustrating an example of a cross-sectional configuration in a modification example of the input unit illustrated in FIG. 1.

FIG. 10 is a diagram illustrating an example of action of the input unit illustrated in FIG. 9 when a pen tip touches a contacting surface.

FIG. 11 is a diagram illustrating a modification example of a cross-sectional configuration of the input unit illustrated in FIG. 6.

FIG. 12 is a diagram illustrating an example of action of the input unit illustrated in FIG. 11 when a pen tip touches a contacting surface.

FIG. 13 is a diagram illustrating a modification example of a cross-sectional configuration of the input unit illustrated in FIG. 1.

FIG. 14 is a diagram illustrating a modification example of a cross-sectional configuration of the input unit illustrated in FIG. 9.

FIG. 15 is a diagram illustrating an example of a cross-sectional configuration of an input unit according to a second embodiment of the present technology.

FIG. 16 is a diagram illustrating an example of action of the input unit illustrated in FIG. 15 when a pen tip and a fingertip touch a contacting surface.

FIG. 17 is a diagram illustrating a modification example of a cross-sectional configuration of the input unit illustrated in FIG. 15.

FIG. 18 is a diagram illustrating a modification example of a cross-sectional configuration of the input unit illustrated in FIG. 15.

FIG. 19 is a diagram illustrating a modification example of a cross-sectional configuration of the input unit illustrated in FIG. 17.

FIG. 20 is a diagram illustrating a modification example of a cross-sectional configuration of the input unit illustrated in FIG. 1.

FIG. 21 is a diagram illustrating a modification example of a cross-sectional configuration of the input unit illustrated in FIG. 6.

FIG. 22 is a diagram illustrating a modification example of a cross-sectional configuration of the input unit illustrated in FIG. 9.

FIG. 23 is a diagram illustrating a modification example of a cross-sectional configuration of the input unit illustrated in FIG. 11.

FIG. 24 is a diagram illustrating a modification example of a cross-sectional configuration of the input unit illustrated in FIG. 15.

FIG. 25 is a diagram illustrating an example of a cross-sectional configuration of an input unit according to a third embodiment of the present technology.

FIG. 26 is a diagram illustrating an example of action of the input unit illustrated in FIG. 25 when a pen tip touches a contacting surface.

FIG. 27 is a diagram illustrating an example of a cross-sectional configuration of an input unit according to a fourth embodiment of the present technology.

FIG. 28 is a diagram illustrating an example of action of the input unit illustrated in FIG. 27 when a pen tip touches a contacting surface.

FIG. 29 is a diagram illustrating a modification example of a simplified configuration of a pen.

FIG. 30 is a diagram illustrating a modification example of a simplified configuration of a pen.

FIG. 31 is a diagram illustrating a modification example of a simplified configuration of a pen.

FIG. 32 is a diagram illustrating a modification example of a simplified configuration of a pen.

FIG. 33 is a diagram illustrating a modification example of a cross-sectional configuration of a magnetic conductive layer.

FIG. 34 is a diagram illustrating an example of a cross-sectional configuration of a magnetic layer served as an alternative for a magnetic conductive layer.

FIG. 35A is a diagram illustrating a modification example of a cross-sectional configuration of a magnetic conductive layer.

FIG. 35B is a diagram illustrating a modification example of a cross-sectional configuration of a magnetic conductive layer.

FIG. 35C is a diagram illustrating a modification example of a cross-sectional configuration of a magnetic conductive layer.

FIG. 36 is a diagram illustrating a modification example of a planar configuration of a magnetic conductive layer.

FIG. 37 is a diagram illustrating a modification example of a planar configuration of a magnetic conductive layer.

FIG. 38 is a diagram illustrating a modification example of a planar configuration of a magnetic conductive layer.

FIG. 39 is a diagram illustrating a modification example of a planar configuration of a magnetic conductive layer.

FIG. 40 is a diagram illustrating a modification example of a planar configuration of a magnetic conductive layer.

FIG. 41 is a diagram illustrating an example of a cross-sectional configuration of a display unit according to a fifth embodiment of the present technology.

FIG. 42 is a diagram illustrating an example of a cross-sectional configuration of a display panel illustrated in FIG. 41.

FIG. 43 is a diagram illustrating an example of a perspective configuration of electrodes illustrated in FIG. 42.

FIG. 44 is a diagram illustrating an example of a perspective configuration of electrodes illustrated in FIG. 42.

FIG. 45 is a diagram illustrating an example of a cross-sectional configuration of a display pixel illustrated in FIG. 42.

FIG. 46 is a diagram illustrating an example of action of the display panel illustrated in FIG. 42 when a pen tip touches a contacting surface.

FIG. 47A is a diagram illustrating an example of action of the display panel illustrated in FIG. 42 when a pen tip comes close to or touches a contacting surface.

FIG. 47B is a diagram illustrating an example of action of the display panel illustrated in FIG. 42 when a pen tip comes close to or touches a contacting surface.

FIG. 47C is a diagram illustrating an example of action of the display panel illustrated in FIG. 42 when a pen tip comes close to or touches a contacting surface.

FIG. 47D is a diagram illustrating an example of action of the display panel illustrated in FIG. 42 when a pen tip comes close to or touches a contacting surface.

FIG. 47E is a diagram illustrating an example of action of the display panel illustrated in FIG. 42 when a pen tip comes close to or touches a contacting surface.

FIG. 48A is a diagram illustrating an example of action of the display panel illustrated in FIG. 42 when a pen tip comes close to or touches a contacting surface.

FIG. 48B is a diagram illustrating an example of action of the display panel illustrated in FIG. 42 when a pen tip comes close to or touches a contacting surface.

FIG. 48C is a diagram illustrating an example of action of the display panel illustrated in FIG. 42 when a pen tip comes close to or touches a contacting surface.

FIG. 48D is a diagram illustrating an example of action of the display panel illustrated in FIG. 42 when a pen tip comes close to or touches a contacting surface.

FIG. 48E is a diagram illustrating an example of action of the display panel illustrated in FIG. 42 when a pen tip comes close to or touches a contacting surface.

FIG. 49A is a diagram illustrating an example of action of the display panel illustrated in FIG. 42 when a pen tip comes close to or touches a contacting surface.

FIG. 49B is a diagram illustrating an example of action of the display panel illustrated in FIG. 42 when a pen tip comes close to or touches a contacting surface.

FIG. 49C is a diagram illustrating an example of action of the display panel illustrated in FIG. 42 when a pen tip comes close to or touches a contacting surface.

FIG. 49D is a diagram illustrating an example of action of the display panel illustrated in FIG. 42 when a pen tip comes close to or touches a contacting surface.

FIG. 49E is a diagram illustrating an example of action of the display panel illustrated in FIG. 42 when a pen tip comes close to or touches a contacting surface.

FIG. 50 is a diagram illustrating an example of a cross-sectional configuration of a display unit according to a sixth embodiment of the present technology.

FIG. 51 is a diagram illustrating an example of a cross-sectional configuration of a display panel illustrated in FIG. 50.

FIG. 52 is a diagram illustrating an example of a cross-sectional configuration of a display pixel illustrated in FIG. 51.

FIG. 53 is a diagram illustrating an example of function blocks of a driver illustrated in FIG. 50.

FIG. 54 is a diagram illustrating a modification example of a cross-sectional configuration of the display panel illustrated in FIG. 50.

MODES FOR CARRYING OUT THE INVENTION

Hereinafter, some embodiments of the present technology will be described in detail with reference to the drawings. It is to be noted that description will be given in the following order.

1. First Embodiment (Input unit of a decreased-capacitance type) . . . FIG. 1 to FIG. 5
An example where a magnetic conductive layer is provided on rear surface side of an electrode substrate
2. Modification Examples of First Embodiment . . . FIG. 6 to FIG. 13
Modification Example A: an example where spacers are provided between a conductive layer and an electrode substrate as well . . . FIG. 6 to FIG. 8
Modification Example B: an example where spacers to be provided between an electrode substrate and a magnetic conductive layer are omitted . . . FIG. 9 to FIG. 1
Modification Example C: an example where a rigid layer is provided . . . FIG. 13 and FIG. 14
3. Second Embodiment (Input unit of a decreased-capacitance type) . . . FIG. 15 and FIG. 16
An example where an electrode substrate and a magnetic conductive layer are stacked
4. Modification Examples of Second Embodiment . . . FIG. 17 to FIG. 19
Modification Example D: an example where an electrode is configured of a magnetic material . . . FIG. 17
Modification Example E: an example where a rigid layer is provided . . . FIG. 18 and FIG. 19
5. Modification Example in Common to First and Second Embodiments
Modification Example F: an example where a magnet layer is provided on rear surface side of a magnetic conductive layer . . . FIG. 20 to FIG. 24
6. Third Embodiment (Input unit of an increased-capacitance type) . . . FIG. 25 and FIG. 26
An example where a magnetic conductive layer is provided on top surface side of an electrode substrate
7. Fourth Embodiment (Input unit of an increased-capacitance type) . . . FIG. 27 and FIG. 28
An example where an electrode substrate and a magnetic conductive layer are stacked
8. Modification Examples in Common to First to Fourth Embodiments . . . FIG. 29 to FIG. 40
Modification Example G: an example where a pen is configured of an electromagnetic pen . . . FIG. 29 and FIG. 30
Modification Example H: an example where a pen is provided with an eraser . . . FIG. 31 and FIG. 32
Modification Example I: an example where a magnetic conductive layer is configured of a laminated body of a conductive layer and a magnetic layer . . . FIG. 33
Modification Example J: an example where a plurality of magnetic layers are provided instead of a magnetic conductive layer . . . FIG. 34
Modification Example K: an example where a magnetic conductive layer is magnetized . . . FIG. 35
Modification Example L: an example where a magnetic conductive layer is provided with a plurality of apertures . . . FIG. 36 to FIG. 40
9. Fifth Embodiment (Display unit)
An example where a display panel is provided that avoids the use of output from an input panel . . . FIG. 41 to FIG. 49
10. Sixth Embodiment (Display unit)
An example where a display panel is provided that uses output from an input panel . . . FIG. 50 to FIG. 53
11. Modification Example of Sixth Embodiment
An example where a pen-based input region and a finger-based input region are provided . . . FIG. 54

1. First Embodiment

[Configuration]

FIG. 1 illustrates an example of a cross-sectional configuration of an input unit 1 according to a first embodiment of the present technology. The input unit 1 is a unit that performs information input by use of a pen 30. The pen 30 generates a magnetic field from a tip thereof. The input unit 1 includes a sensor panel 10 having a contacting surface 10A, a driver 20 that drives the sensor panel 10 and generates coordinate data based on an output of the sensor panel 10, and a pen 30. The input unit 1 corresponds to a specific example of an "input unit" in the present technology. The contacting surface 10A corresponds to a specific example of a "contacting surface" in the present technology. The sensor panel 10 corresponds to a specific example of a "sensor panel" and a "sensor section" in the present technology. The driver 20 corresponds to a specific example of a "driver" in the present technology. The pen 30 corresponds to a specific example of a "pen" in the present technology.

(Pen 30)

As described above, the pen 30 generates a magnetic field from a tip thereof. For example, the pen 30 may use a magnetic field (line of magnetic force) that is generated from the tip of the pen 30 by moving the tip of the pen 30 closer to the contacting surface 10A or touching the contacting surface 10A with the tip of the pen 30 to input positional information on the tip of the pen 30 to the sensor panel 10. An example of the positional information on the tip of the pen 30 may include X-Y coordinate data where the contacting surface 10A acts as an X-Y plane. It is to be noted that an example of the positional information on the tip of the pen 30 may further include Z coordinate data where a normal line of the contacting surface 10A acts as a Z-axis.

The pen 30 may have, for example, a rod-like gripper 31 and a magnet 32. The magnet 32 may be fixed on a tip of the gripper 31. The gripper 31 is a part that a user of the display unit 1 takes hold of by hand when using the pen 30. The magnet 32 takes a rod-like shape that extends in the same direction as an extending direction of the gripper 31. One end of the magnet 32 in a longitudinal direction is a north pole, and the other end of the magnet 32 in a longitudinal direction is a south pole. Therefore, the magnet 32 allows a magnetic field (line of magnetic force) that is generated from the magnet 32 when the pen 30 is set up on the contacting surface 10A to reach a magnetic conductive layer 14 to be hereinafter described. A magnetic flux density of a pen tip may be preferably in the range of about 50 G to about 2000 G, and may be more preferably in the range of about 200 G to about 1000 G. The pen 30 may have a member for prevention of spreading of lines of magnetic force on the tip of the pen 30. Such a member may be provided to cover, for example, an outer circumference of a pen tip (entire side surfaces of an end on pen tip side of the magnet 32). Examples of the member for prevention of spreading of lines of magnetic force may include materials having high relative magnetic permeability (for example, permalloy and soft iron). Alternatively, the above-described member may be provided to cover the entire side surfaces of the magnet 32. In such a case, the above-described member acts as a yoke, thus allowing the magnetic flux density of the pen tip to be raised.

(Sensor Panel 10)

The sensor panel 10 detects a magnetic field (line of magnetic force) that is generated from the tip of the pen 30 on the basis of a change in capacitance. Specifically, the sensor panel 10 detects magnetic force of the contacting surface 10A or a region in the vicinity thereof on the basis of a change in capacitance. Further, the sensor panel 10 is allowed to output a signal depending on the change in capacitance along with information on a position where the change in capacitance has occurred. The sensor panel 10 may have, for example, an electrode substrate 11, a conductive layer 12, a protective layer 13, and a magnetic conductive layer 14 that is disposed on bottom surface side of the electrode substrate 11. The conductive layer 12 and the protective layer 13 may be disposed on top surface side of the electrode substrate 11. The magnetic conductive layer 14 may be disposed on bottom surface side of the electrode substrate 11. The conductive layer 12 is disposed in a void between the contacting surface 10A and the electrode substrate 11, and the magnetic conductive layer 14 is disposed at a location farther from the contacting surface 10A than the electrode substrate 11. In other words, the electrode substrate 11 is interposed between two layers having conductivity (the conductive layer 12 and the magnetic conductive layer 14) in a vertical direction. The conductive layer 12 corresponds to a specific example of a "conductive layer" in the present technology. The magnetic conductive layer 14 corresponds to a specific example of a "magnetic layer" in the present technology.

Each of the conductive layer 12 and the magnetic conductive layer 14 has a function as a shield layer ensuring that a change in capacitance to be formed between the sensor panel 10 and outside thereof does not have an influence on the inside of the sensor panel 10. The conductive layer 12 and the magnetic conductive layer 14 are each at a fixed potential, and may be, for example, at a ground potential. The conductive layer 12 may be made of, for example, a material in which, for example, a metal thin film such as aluminum, carbon, CNT, ITO, IZO, a nanometal wire, or a silver thin wire is formed on a film; a flexible non-magnetic metal plate; ITO glass; or any other materials. The magnetic conductive layer 14 may be, for example, sheet-shaped, and has flexibility. The magnetic conductive layer 14 is formed in a plane facing the contacting surface 10A, and is displaced locally in a thickness direction depending on a magnitude of magnetic force. The magnetic conductive layer 14 is made of a conductive magnetic metal, and may be made of a material such as SUS (for example, martensite series and ferrite series), iron, nickel, iron alloy, and nickel alloy. The protective layer 13 protects the conductive layer 12 from, for example, the pen 30, and may be made of, for example, a resin film. Spacers 15 may be formed by a UV curing treatment or a thermosetting treatment of a screen-printed resin layer.

Further, the sensor panel 10 may have, for example, a void 15A between the electrode substrate 11 and the magnetic conductive layer 14, and may have a plurality of spacers 15 that hold the void 15A. The void 15A is a space that secures a range of motion of the magnetic conductive layer 14 in a case where the magnetic conductive layer 14 is uplifted in a thickness direction. In addition to holding the void 15A, the spacers 15 hold down the magnetic conductive layer 14 partially to prevent the magnetic conductive layer 14 from being uplifted without depending on a magnetic field. Moreover, the sensor panel 10 may have, for example, a housing 16 that accommodates the electrode substrate 11 and other components. The void 15A corresponds to a specific example of a "void" in the present technology. The spacer 15 corresponds to a specific example of a "spacer" in the present technology.

FIG. 2 illustrates an example of action of the input unit 1 when the tip of the pen 30 comes close to or touches the contacting surface 10A. For example, the magnetic conductive layer 14 may be uplifted locally toward the contacting surface 10A by a magnetic field H (line of magnetic force) that is generated from the tip of the pen 30, as illustrated in FIG. 2. As a result, a distance between the electrode substrate 11 and the magnetic conductive layer 14 becomes shorter below a tip portion of the pen 30, leading to a local decrease in the capacitance of the sensor panel 10. The amount of uplift of the magnetic conductive layer 14 exerted by magnetic force generated from the tip of the pen 30 is the largest immediately below the tip portion of the pen 30, and becomes smaller with increasing distance from a location immediately below the tip portion of the pen 30.

The electrode substrate 11 may be configured by stacking, for example, an insulating layer 11A, a lower electrode 11B, an insulating layer 11C, an upper electrode 11D, and an insulating layer 11E in this order. The lower electrode 11B is configured of a plurality of electrodes (first electrodes) that extend in a plane facing the contacting surface 10A. The upper electrode 11D is configured of a plurality of electrodes (second electrodes) that extend in a plane facing the contacting surface 10A in a direction intersecting with each of the first electrodes.

The insulating layer 11A supports the lower electrode 11B, and prevents the lower electrode 11B and the magnetic conductive layer 14 from being short-circuited to each other. The insulating layer 11C supports the upper electrode 11D, and prevents the upper electrode 11D and the lower electrode 11B from being short-circuited to each other. The insulating layer 11E prevents the upper electrode 11D and the conductive layer 12 from being short-circuited to each other, and covers the upper electrode 11D. The insulating layer 11A may be made of, for example, a film material having flexibility, and may be specifically made of a resin film material having electrical insulation properties, such as PET, PEN, PC, PMMA, and polyimide. The insulating layer 11C may be made of, for example, the above-described resin film or a screen-printed resin layer. The insulating layer 11E may be made of, for example, the above-described resin film or a screen-printed resin layer. The lower electrode 11B and the upper electrode 11D may be made of, for example, wires of silver, copper, aluminum, molybdenum, or alloy including those materials that are made up by screen printing or photolithography.

(Driver 20)

As described above, the driver 20 drives the sensor panel 10 and generates coordinate data based on an output of the sensor panel 10. The driver 20 may have, for example, a detection circuit 21, an arithmetic operation section 22, a storage section 23, and an output section 24.

For example, the detection circuit 21 may read out a change in the capacitance of the sensor panel 10 by a change in an amount of a current flowing through the electrode substrate 11. The detection circuit 21 may have, for example, a switch element, a signal source, and a current-to-voltage conversion circuit. The switch element may make a switchover operation of a plurality of lower electrodes 11B and a plurality of upper electrodes 11D included in the electrode substrate 11. The signal source may supply an AC signal to the electrode substrate 11. The switch element may be, for example, a multiplexer. One of a plurality of terminals provided on one end of the multiplexer is connected to one end of each of the lower electrodes 11B and the upper electrodes 11D, and one terminal provided on the other end of the multiplexer is connected to the signal source and the current-to-voltage conversion circuit.

For example, the detection circuit 21 may select the plurality of lower electrodes 11B sequentially one after another, and may select the plurality of upper electrodes 11D sequentially one after another. With this operation, for example, the detection circuit 21 may apply AC signals to the plurality of lower electrodes 11B sequentially one after another, and may apply AC signals to the plurality of upper electrodes 11D sequentially one after another. At this time, for example, when the pen 30 comes close to or touches the contacting surface 10A, the capacitance of the sensor panel 10 varies locally (specifically, decreases), and such a change causes a change in the amount of a current flowing through the electrode substrate 11. For example, the detection circuit 21 may convert such a change in the amount of the current into a change in voltage, and outputs the change in voltage to the arithmetic operation section 22. In other words, the detection circuit 21 outputs a change in voltage depending on a magnitude of the amount of change in the capacitance along with the coordinate information to the arithmetic operation section 22.

FIG. 3 illustrates an example of the amount of change in capacitance when the tip of the pen 30 touches the contacting surface 10A. When the capacitance of the sensor panel 10 varies locally, the amount of change in voltage that is to be outputted from the current-to-voltage conversion circuit increases by the amount of change in the capacitance. FIG. 3 illustrates an example of the distribution of the amount of change in the capacitance when a vertical scale denotes an amount of change in capacitance ΔC and a horizontal scale denotes coordinates of the contacting surface 10A in an X-axis direction. For example, an amount of change in capacitance ΔC1 in the coordinates of the tip portion of the pen 30 is greater than thresholds TH1 and TH0, as illustrated in FIG. 3.

The arithmetic operation section 22 evaluates a change in the voltage to be outputted from the detection circuit 21 to thereby determine the presence or absence of a touch of the pen 30 on the contacting surface 10A and further determine a touching location of the pen 30 on the contacting surface 10A. For example, as illustrated in FIG. 3, in the case of ΔC1>TH1, the arithmetic operation section 22 determines that the tip of the pen 30 is in touch with the contacting surface 10A. For example, in the case of TH1>ΔC1>TH2, the arithmetic operation section 22 determines that the tip of the pen 30 is close to the contacting surface 10A. For example, when a maximum value of the amount of change in capacitance ΔC exceeds the threshold TH1, the arithmetic operation section 22 determines that the pen 30 is in touch with a location where the amount of change in capacitance ΔC is the greatest. For example, when the maximum value of the amount of change in capacitance ΔC is not greater than the threshold TH1, and is greater than the threshold TH2, the arithmetic operation section 22 determines that the pen 30 is close to a location where the amount of change in capacitance ΔC is the greatest.

The arithmetic operation section 22 evaluates a change in the voltage to be outputted from the detection circuit 21 to thereby determine a magnitude of pressing force of the pen 30 on the contacting surface 10A. For example, as illustrated in FIG. 3, in the case of ΔC1>TH0, the arithmetic operation section 22 determines that the tip of the pen 30 is pressed strongly against the contacting surface 10A. For example, in the case of TH0>ΔC1>TH1, the arithmetic operation section 22 determines that the tip of the pen 30 is in light touch with the contacting surface 10A.

For example, the arithmetic operation section 22 may store coordinate data generated on the basis of an output of the sensor panel 10 in the storage section 23. The arithmetic operation section 22 may store, for example, periodically derived coordinate data in the storage section 23 along with the coordinate data prestored in the storage section 23. Alternatively, the arithmetic operation section 22 may store the coordinate data generated on the basis of the output of the sensor panel 10 in the storage section 23, and may output such coordinate data to the output section 24. Further, for example, the arithmetic operation section 22 may output a plurality of coordinate data stored in the storage section 23 to the output section 24 collectively as drawing data. The output section 24 outputs the coordinate data or drawing data from the arithmetic operation section 22 to the outside.

[Operation]

Next, a description is provided on operation of the input unit 1. A user moves the tip of the pen 30 closer to the contacting surface 10A or touches the contacting surface 10A with the tip of the pen 30 (see FIG. 2). At this time, the magnetic conductive layer 14 is uplifted toward the contacting surface 10A side by magnetic force generated from the tip of the pen 30. As a result, a distance between the electrode substrate 11 and the magnetic conductive layer 14 becomes shorter below the tip portion of the pen 30, and the capacitance of the sensor panel 10 decreases locally. The amount of uplift of the magnetic conductive layer 14 exerted by the magnetic force generated from the tip of the pen 30 is the largest immediately below the tip portion of the pen 30, and becomes smaller with increasing distance from a location immediately below the tip portion of the pen 30.

At this time, a local change in the capacitance of the sensor panel 10 is detected by the detection circuit 21. As a result, for example, a change in the voltage depending on a magnitude of the amount of change in the capacitance may be outputted from the detection circuit 21 to the arithmetic operation section 22 along with the coordinate information. The arithmetic operation section 22 evaluates a change in the voltage outputted from the detection circuit 21 to thereby determine the presence or absence of a touch of the pen 30 on the contacting surface 10A and further determine the coordinates of the tip portion of the pen 30 on the contacting surface 10A. In such a manner, the positional information on the tip of the pen 30 is inputted to the input unit 1.

Further, for example, as illustrated in FIG. 3, while the user moves the tip of the pen 30 closer to the contacting surface 10A or touches the contacting surface 10A with the tip of the pen 30, the user touches the contacting surface 10A with a part of his palm. In such a case, the magnetic conductive layer 14 is uplifted locally toward the contacting surface 10A side by the magnetic force generated from the tip of the pen 30. In contrast, by a touch of the palm that does not cause the magnetic force to be generated, the magnetic conductive layer 14 is not totally uplifted toward the contacting surface 10A side, or is uplifted only slightly. As a result, a distance between the electrode substrate 11 and the magnetic conductive layer 14 becomes shorter below the tip portion of the pen 30, and the capacitance of the sensor panel 10 decreases locally. On the contrary, a distance between the electrode substrate 11 and the magnetic conductive layer 14 is not changed at all or is changed only slightly below the palm.

At this time, the capacitance of the sensor panel 10 varies locally below the tip portion of the pen 30; however, the capacitance of the sensor panel 10 does not vary at all or varies only slightly below the palm (see FIG. 4). Therefore, in this case, a touch of the tip portion of the pen 30 on the contacting surface 10A is detected, while a touch of the palm on the contacting surface 10A is not detected at all or ignored.

[Effects]

Next, a description is provided on effects of the input unit 1. In the present embodiment, the magnetic force of the contacting surface 10A or a region in the vicinity thereof is detected on the basis of a change in the capacitance, and the positional information on the tip of the pen 30 is thereby inputted to the input unit 1. This makes it possible to suppress a malfunction caused by a touch of a finger or a palm that does not almost cause a change in capacitance by magnetic force.

Further, in the present embodiment, at the time of input of the positional information on the tip of the pen 30, a change in capacitance by magnetic force is utilized, and the positional information on the tip of the pen 30 is therefore allowed to be inputted to the input unit 1 even if the contacting surface 10A is not depressed. Accordingly, even when the tip of the pen 30 is put on a location away from the contacting surface 10A, or the tip of the pen 30 lightly touches the contacting surface 10A, the positional information on the tip of the pen 30 is allowed to be inputted to the input unit 1.

Moreover, in the present embodiment, at the time of input of the positional information on the tip of the pen 30, a change in capacitance by magnetic force is utilized, which makes it possible to discriminate a state where the tip of the pen 30 is located on a position away from the contacting surface 10A or a state where the tip of the pen 30 is in touch with the contacting surface 10A. For example, this allows an external device to execute different operations in a case where the tip of the pen 30 is located on a position away from the contacting surface 10A and in a case where the tip of the pen 30 is in light touch with the contacting surface 10A.

2. Modification Examples of First Embodiment

Modification Example A

FIG. 6 illustrates a modification example of a cross-sectional configuration of the input unit 1 according to the above-described first embodiment. In the present modification example, the sensor panel 10 has a void 17A between the electrode substrate 11 and the conductive layer 12, and has a plurality of spacers 17 that hold the void 17A. Further, in the present modification example, the protective layer 13 configuring the contacting surface 10A and the conductive layer 12 have flexibility, and the protective layer 13 and the conductive layer 12 is deformed depending on deformation of the contacting surface 10A. The void 17A corresponds to a specific example of a "void" in the present technology. The spacer 17 corresponds to a specific example of a "spacer" in the present technology. In the present modification example, when, for example, the pen 30 or a finger 100 touches the contacting surface 10A and the contacting surface 10A is pressed, the contacting surface 10A is depressed locally, and the protective layer 13 and the conductive layer 12 are also flexed downward locally following a depression of the contacting surface 10A. The void 17A is a space that secures a range of motion of the protective layer 13 and the conductive layer 12 in a case where the protective layer 13 and the conductive layer 12 are flexed downward. In addition to holding the void 17A, the spacers 17 restrict spreading of flexion of the protective layer 13 and the conductive layer 12 to ensure that the downward flexion of the protective layer 13 and the conductive layer 12 takes place locally.

FIG. 7 illustrates an example of action of the input unit 1 according to the present modification example when the tip of the pen 30 and the tip of the finger 100 touch the contacting surface 10A. FIG. 8 illustrates an example of the amount of change in capacitance when the tip of the pen 30 and the tip of the finger 100 touch the contacting surface 10A. In FIG. 8, the tip of the pen 30 touches a location where the amount of change in capacitance $\Delta C$ is equal to $\Delta C1$ on the contacting surface 10A to form a depression, and the tip of the finger 100 touches a location where the amount of change in capacitance $\Delta C$ is equal to $\Delta C2$ on the contacting surface 10A to form a depression. In FIG. 8, the location where the amount of change in capacitance $\Delta C$ is equal to $\Delta C2$ is regarded as a location where an influence of a change in capacitance caused by a touch of the tip of the pen 30 on the contacting surface 10A is not exerted.

The arithmetic operation section 22 evaluates a change in voltage outputted from the detection circuit 21 to thereby determine the presence or absence of a touch of the pen 30 and the finger 100 on the contacting surface 10A, and further determine touching locations of the pen 30 and the finger 100 on the contacting surface 10A. For example, in the case of $\Delta C1 > TH1$, the arithmetic operation section 22 determines that the tip of the pen 30 is in touch with a location where the amount of change in capacitance $\Delta C$ is equal to $\Delta C1$ on the contacting surface 10A. For example, in the case of $TH1 > \Delta C1 > TH2$, the arithmetic operation section 22 determines that the tip of the pen 30 is close to a location where the amount of change in capacitance $\Delta C$ is equal to $\Delta C1$ on the contacting surface 10A. For example, when a maximum value of the amount of change in capacitance $\Delta C$ exceeds the threshold TH1, the arithmetic operation section 22 determines that the pen 30 is in touch with a location where the amount of change in capacitance $\Delta C$ is the greatest. For example, when the maximum value of the amount of change in capacitance $\Delta C$ is not greater than the threshold TH1, and is greater than the threshold TH2, the arithmetic operation section 22 determines that the pen 30 is close to a location where the amount of change in capacitance $\Delta C$ is the greatest.

For example, when the finger 100 is placed on a location where an influence of a change in capacitance caused by a touch of the tip of the pen 30 is not exerted and $TH2 > \Delta C2 > TH3$ is satisfied, the arithmetic operation section 22 determines that the tip of the finger 100 is in touch with a location where the amount of change in capacitance $\Delta C$ is equal to $\Delta C2$ on the contacting surface 10A. For example, when the finger 100 is placed on a location where an influence of a change in capacitance caused by a touch of the tip of the pen 30 is not exerted and $TH3 > \Delta C2 > TH4$ is satisfied, the arithmetic operation section 22 determines that the tip of the finger 100 is close to a location where the amount of change in capacitance $\Delta C$ is equal to $\Delta C2$ on the contacting surface 10A. For example, when the finger 100 is placed on a location where an influence of a change in capacitance caused by a touch of the tip of the pen 30 is not exerted and the maximum value of the amount of change in capacitance $\Delta C$ exceeds the threshold TH3, the arithmetic operation section 22 determines that the tip of the finger 100 is in touch with a location at a peak of the amount of change in capacitance $\Delta C$. For example, when the finger 100 is placed on a location where an influence of a change in capacitance caused by a touch of the tip of the pen 30 is not exerted and the maximum value of the amount of change in capacitance $\Delta C$ is not greater than the threshold TH3 and is greater than the threshold TH4, the arithmetic operation section 22 determines that the tip of the finger 100 is close to the location at the peak of the amount of change in capacitance $\Delta C$.

The arithmetic operation section 22 evaluates a change in voltage outputted from the detection circuit 21 to determine a magnitude of pressing force of the pen 30 on the contacting surface 10A. For example, as illustrated in FIG. 8, in the case of $\Delta C1 > TH0$, the arithmetic operation section 22 determines that the tip of the pen 30 is pressed strongly against the contacting surface 10A. For example, in the case of $TH0 > \Delta C1 > TH1$, the arithmetic operation section 22 determines that the tip of the pen 30 is in light touch with the contacting surface 10A.

For example, the arithmetic operation section 22 may store coordinate data generated on the basis of an output of the sensor panel 10 in the storage section 23. The arithmetic operation section 22 may store, for example, the periodically derived coordinate data of the pen 30 in the storage section 23 along with the coordinate data of the pen 30 that is prestored in the storage section 23. Alternatively, the arithmetic operation section 22 may store the coordinate data of the pen 30 that is generated on the basis of the output of the sensor panel 10 in the storage section 23, and may output such coordinate data to the output section 24. Further, for example, the arithmetic operation section 22 may output a plurality of coordinate data of the pen 30 that are stored in the storage section 23 to the output section 24 collectively as drawing data. For example, the arithmetic operation section 22 may output the coordinate data of the finger 100 that is generated on the basis of the output of the sensor panel 10 to the output section 24. The output section 24 outputs the coordinate data or drawing data from the arithmetic operation section 22 to the outside.

Next, a description is provided on operation of the input unit 1 according to the present modification example. A user moves the tip of the pen 30 closer to the contacting surface 10A or touches the contacting surface 10A with the tip of the pen 30. At this time, the magnetic conductive layer 14 is uplifted toward the contacting surface 10A side by magnetic force generated from the tip of the pen 30. As a result, a distance between the electrode substrate 11 and the magnetic conductive layer 14 becomes shorter below the tip portion of the pen 30, and the capacitance of the sensor panel 10 decreases locally. The amount of uplift of the magnetic conductive layer 14 exerted by the magnetic force generated from the tip of the pen 30 is the largest immediately below the tip portion of the pen 30, and becomes smaller with increasing distance from a location immediately below the tip portion of the pen 30. Further, when a user presses the tip of the pen 30 against the contacting surface 10A, the conductive layer 12 and the protective layer 13 is depressed. As a result, a distance between the electrode substrate 11 and the conductive layer 12 becomes shorter below the tip portion of the pen 30, and the capacitance of the sensor panel 10 further decreases.

Further, when a user presses the tip of the finger 100 against the contacting surface 10A, the conductive layer 12 and the protective layer 13 is depressed. As a result, a distance between the electrode substrate 11 and the conductive layer 12 becomes shorter below a tip portion of the finger 100, and the capacitance of the sensor panel 10 decreases locally. At this time, the strong magnetic field H (line of magnetic force) similar to a magnetic field generated from the tip of the pen 30 is not generated from the tip of the finger 100. Therefore, the magnetic conductive layer 14 is not uplifted toward the contacting surface 10A side below the tip portion of the finger 100. Accordingly, the amount of change in capacitance caused by the pen 30 is greater than the amount of change in capacitance caused by the finger 100 by the amount of change in the distance between the electrode substrate 11 and the magnetic conductive layer 14.

When a user is pressing the tip of the pen 30 and the tip of the finger 100 against the contacting surface 10A, a local change in the capacitance of the sensor panel 10 is detected by the detection circuit 21. As a result, for example, a change in voltage depending on a magnitude of the amount of change in capacitance may be outputted from the detection circuit 21 to the arithmetic operation section 22 along with the coordinate information. The arithmetic operation section 22 evaluates a change in voltage outputted from the detection circuit 21 to thereby determine the presence or absence of a touch of the pen 30 or the finger 100 on the contacting surface 10A and further determine the coordinates of the tip portion of the pen 30 or the finger 100 on the contacting surface 10A. In such a manner, the positional information on the tip of the pen 30 is inputted to the input unit 1.

Next, a description is provided on effects of the input unit 1 according to the present modification example. In the present modification example, as with the input unit 1 according to the above-described embodiment, the magnetic force of the contacting surface 10A or a region in the vicinity thereof is detected on the basis of a change in capacitance, and the positional information on the tip of the pen 30 is thereby inputted to the input unit 1. In the present modification example, this makes it possible to achieve effects similar to the effects achieved by the input unit 1 according to the above-described embodiment.

Moreover, in the present modification example, at the time of input of the positional information on the tip of the pen 30, a change in capacitance by magnetic force is utilized, which makes it possible to easily discriminate input of the positional information by use of the pen 30 and input of the positional information by use of the finger 100. For example, this allows an external device to execute different operations in a case where the positional information is inputted by use of the pen 30 and in a case where the positional information is inputted by use of the finger 100. Therefore, for example, in a case where a user operates the pen 30 with his palm put on the contacting surface 10A, it is possible to prevent the palm from being erroneously detected. Further, it is possible to discriminate a case where a user performs a finger-based operation and a case where a user performs a pen-based operation, which allows processing intended by the user to be performed on system side.

Modification Example B

FIG. 9 illustrates a modification example of a cross-sectional configuration of the input unit 1 illustrated in FIG. 1. FIG. 10 illustrates an example of action of the input unit 1 illustrated in FIG. 9 when the tip of the pen 30 touches the contacting surface 10A. FIG. 11 illustrates a modification example of a cross-sectional configuration of the input unit 1 illustrated in FIG. 6. FIG. 12 illustrates an example of action of the input unit 1 illustrated in FIG. 11 when the tip of the pen 30 touches the contacting surface 10A.

The input unit 1 according to the present modification example adopts a configuration where the spacers 15 are omitted in the input unit 1 according to the above-described first embodiment and the modification example thereof. In the present modification example, when the tip of the pen 30 touches the contacting surface 10A, the magnetic conductive layer 14 is uplifted with a portion below the tip of the pen 30 placed as an apex without being restricted by the spacers 15. Therefore, as compared with a case where the uplift of the magnetic conductive layer 14 is restricted by the spacers 15, it is possible to slightly increase the response speed of the magnetic conductive layer 14.

With the exception that each of the spacers 15 is omitted, the input unit 1 according to the present modification example uses a configuration similar to that of the input unit 1 according to the above-described embodiment. Therefore, in the present modification example, it is possible to achieve effects similar to the effects achieved by the input unit 1 according to the above-described embodiment.

Modification Example C

FIG. 13 illustrates a modification example of a cross-sectional configuration of the input unit 1 illustrated in FIG. 1. FIG. 14 illustrates a modification example of a cross-sectional configuration of the input unit 1 illustrated in FIG. 9.

The input unit 1 according to the present modification example adopts a configuration where a rigid layer 51 is provided between the electrode substrate 11 and the contacting surface 10A in the input unit 1 according to the above-described first embodiment and the modification examples thereof. For example, the rigid layer 51 may be disposed between the conductive layer 12 and the electrode substrate 11, and may be disposed at least in contact with the conductive layer 12. The rigid layer 51 is made of a material that is resistant to flexion by pressing force exerted by the pen 30 or the finger 100, and may be made of, for example, a material such as a resin substrate and a glass substrate. In other words, the rigid layer 51 prevents local flexion of the conductive layer 12 and the protective layer 13.

In the present modification example, as with the input unit 1 according to the above-described embodiment, the magnetic force of the contacting surface 10A or a region in the vicinity thereof is detected on the basis of a change in capacitance, and the positional information on the tip of the pen 30 is thereby inputted to the input unit 1. In the present modification example, this makes it possible to achieve effects similar to the effects achieved by the input unit 1 according to the above-described embodiment.

In the present modification example, at the time of input of the positional information on the tip of the pen 30, a change in capacitance by magnetic force is utilized, and local flexion of the contacting surface 10A is suppressed by the rigid layer 51. This ensures that a change in capacitance caused by local flexion of the contacting surface 10A is reduced, which makes it possible to easily discriminate input of the positional information by use of the pen 30 and input of the positional information by use of the finger 100. Therefore, for example, in a case where a user operates the pen 30 with his finger or his palm put on the contacting surface 10A, it is possible to sufficiently prevent the finger or the palm from being erroneously detected.

3. Second Embodiment

[Configuration]
FIG. 15 illustrates an example of a cross-sectional configuration of an input unit 2 according to a second embodiment of the present technology. FIG. 16 illustrates an example of action of the input unit 2 when the tip of the pen 30 and the tip of the finger 100 touch the contacting surface 10A. The input unit 2 is equivalent to an input unit where a sensor panel 40 is provided instead of the sensor panel 10 in the input unit 1 according to the above-described first embodiment. Accordingly, hereinafter, the sensor panel 40 is mainly detailed, and descriptions on the configurations in common to those of the input unit 1 according to the above-described first embodiment are omitted as appropriate. The input unit 2 corresponds to a specific example of an "input unit" in the present technology. The sensor panel 40 corresponds to a specific example of a "sensor panel" in the present technology.

The sensor panel 40 is equivalent to a sensor panel where the void 15A and each of the spacers 15 are omitted, and the electrode substrate 11 and the magnetic conductive layer 14 are stacked in the sensor panel 10 used in the input unit 1 according to the modification example A. In other words, each of the upper electrodes 11D, each of the lower electrodes 11B, and the magnetic conductive layer 14 are stacked with the insulating layers 11A and 11C in between. Each of the insulating layers 11A and 11C corresponds to a specific example of an "insulating layer" in the present technology.

In the present embodiment, the electrode substrate 11 has flexibility, and is deformed depending on deformation of the magnetic conductive layer 14. Therefore, in the present embodiment, for example, the magnetic conductive layer 14 is uplifted together with the electrode substrate 11 when the magnetic conductive layer 14 receives magnetic force from the pen 30, as illustrated in FIG. 16. For example, the magnetic conductive layer 14 may be fixed to the electrode substrate 11, and may be fixed to the electrode substrate 11 through, for example, an adhesive agent. It is to be noted that the magnetic conductive layer 14 may be only in contact with the electrode substrate 11, and may not be fixed to the electrode substrate 11.

In the sensor panel 40, the void 17A is a space that secures a range of motion of the protective layer 13 and the conductive layer 12 in a case where the protective layer 13 and the conductive layer 12 are flexed downward and secures a range of motion of the electrode substrate 11 in a case where the electrode substrate 11 is uplifted upward. Therefore, in the present embodiment, the height of the void 17A may be greater than the height of the void 17A in the above-described embodiment. In the present embodiment, in addition to holding the void 17A, the spacers 17 restrict spreading of flexion of the protective layer 13 and the conductive layer 12 to ensure that downward flexion of the protective layer 13 and the conductive layer 12 takes place locally. Further, the spacers 17 hold down the magnetic conductive layer 14 partially through the electrode substrate 11 to prevent the magnetic conductive layer 14 from being uplifted without depending on a magnetic field.

[Operation]

Next, a description is provided on operation of the input unit 2 according to the present embodiment. A user moves the tip of the pen 30 closer to the contacting surface 10A or touches the contacting surface 10A with the tip of the pen 30. At this time, the magnetic conductive layer 14 is uplifted toward the contacting surface 10A side together with the electrode substrate 11 by magnetic force generated from the tip of the pen 30. As a result, a distance from the electrode substrate 11 and the magnetic conductive layer 14 to the conductive layer 12 becomes shorter below the tip portion of the pen 30, and the capacitance of the sensor panel 40 decreases locally. The amount of uplift of the magnetic conductive layer 14 exerted by the magnetic force generated from the tip of the pen 30 is the largest immediately below the tip portion of the pen 30, and becomes smaller with increasing distance from a location immediately below the tip portion of the pen 30. Further, when a user presses the tip of the pen 30 against the contacting surface 10A, the conductive layer 12 and the protective layer 13 are depressed. As a result, a distance between the electrode substrate 11 and the conductive layer 12 becomes further shorter below the tip portion of the pen 30, and the capacitance of the sensor panel 40 further decreases.

Further, when a user presses the tip of the finger 100 against the contacting surface 10A, the conductive layer 12 and the protective layer 13 are depressed. As a result, a distance between the electrode substrate 11 and the conductive layer 12 becomes shorter below the tip portion of the finger 100, and the capacitance of the sensor panel 40 decreases locally. At this time, the strong magnetic field H (line of magnetic force) similar to a magnetic field generated from the tip of the pen 30 is not generated from the tip of the finger 100. Therefore, the magnetic conductive layer 14 and the electrode substrate 11 are not uplifted toward the contacting surface 10A side below the tip portion of the finger 100. Accordingly, the amount of change in capacitance caused by the pen 30 is greater than the amount of change in capacitance caused by the finger 100 by the amount of uplift of the magnetic conductive layer 14 and the electrode substrate 11.

When a user is pressing the tip of the pen 30 and the tip of the finger 100 against the contacting surface 10A, a local change in the capacitance of the sensor panel 40 is detected by the detection circuit 21. As a result, for example, a change in the voltage depending on a magnitude of the amount of change in capacitance may be outputted from the detection circuit 21 to the arithmetic operation section 22 along with the coordinate information. The arithmetic operation section 22 evaluates a change in voltage outputted from the detection circuit 21 to thereby determine the presence or absence of a touch of the pen 30 or the finger 100 on the contacting surface 10A and further determine the coordinates of the tip portion of the pen 30 or the finger 100 on the contacting surface 10A. In such a manner, the positional information on the tip of the pen 30 is inputted to the input unit 2.

[Effects]

Next, a description is provided on effects of the input unit 2 according to the present embodiment. In the present embodiment, as with the input unit 1 according to the above-described embodiment, the magnetic force of the contacting surface 10A or a region in the vicinity thereof is detected on the basis of a change in capacitance, and the positional information on the tip of the pen 30 is thereby inputted to the input unit 1. Therefore, in the present embodiment, this makes it possible to achieve effects similar to the effects achieved by the input unit 1 according to the above-described embodiment.

4. Modification Examples of Second Embodiment

Modification Example D

FIG. 17 illustrates a modification example of a cross-sectional configuration of the input unit 2 according to the above-described second embodiment. In the present modification example, the sensor panel 40 is provided with a conductive layer 18 instead of the magnetic conductive layer 14. The conductive layer 18 may be made of, for example, a material in which, for example, a metal thin film such as aluminum, carbon, CNT, ITO, IZO, a nanometal wire, or a silver thin wire is formed on a film; a flexible non-magnetic metal plate; ITO glass; or any other materials. The conductive layer 18 is fixed to the electrode substrate 11, and may be fixed to the electrode substrate 11 through, for example, an adhesive agent. Further, in the sensor panel 40, each of the lower electrodes 11B and each of the upper electrodes 11D are made of a conductive magnetic metal (that is, magnetic electrodes), and may be made of a material such as SUS (for example, martensite series and ferrite series), iron, nickel, iron alloy, and nickel alloy. Therefore, in the present modification example, each of the lower electrodes 11B and each of the upper electrodes 11D are displaced locally in a thickness direction depending on a magnitude of magnetic force.

Next, a description is provided on operation of the input unit 2 according to the present modification example. A user moves the tip of the pen 30 closer to the contacting surface 10A or touches the contacting surface 10A with the tip of the pen 30. At this time, part of the lower electrodes 11B and part of the upper electrodes 11D are uplifted toward the contacting surface 10A side together with the electrode substrate 11 and the conductive layer 18 by magnetic force generated from the tip of the pen 30. As a result, a distance from the electrode substrate 11 and the conductive layer 18 to the conductive layer 12 becomes shorter below the tip portion of the pen 30, and the capacitance of the sensor panel 40 decreases locally. The amount of uplift of the electrode substrate 11 and the conductive layer 18 exerted by the magnetic force generated from the tip of the pen 30 is the largest immediately below the tip portion of the pen 30, and becomes smaller with increasing distance from a location immediately below the tip portion of the pen 30. Further, when a user presses the tip of the pen 30 against the contacting surface 10A, the conductive layer 12 and the protective layer 13 are depressed. As a result, a distance from the electrode substrate 11 and the conductive layer 18 to the conductive layer 12 becomes further shorter below the tip portion of the pen 30, and the capacitance of the sensor panel 40 further decreases.

Further, when a user presses the tip of the finger 100 against the contacting surface 10A, the conductive layer 12 and the protective layer 13 are depressed. As a result, a distance between the electrode substrate 11 and the conductive layer 12 becomes shorter below the tip portion of the finger 100, and the capacitance of the sensor panel 40 decreases locally. At this time, the strong magnetic field H (line of magnetic force) similar to a magnetic field generated from the tip of the pen 30 is not generated from the tip of the finger 100. Therefore, the electrode substrate 11 and the conductive layer 18 are not uplifted toward the contacting surface 10A side below the tip portion of the finger 100. Accordingly, the amount of change in capacitance caused by the pen 30 is greater than the amount of change in capacitance caused by the finger 100 by the amount of uplift of the electrode substrate 11 and the conductive layer 18.

When a user is pressing the tip of the pen 30 and the tip of the finger 100 against the contacting surface 10A, a local change in the capacitance of the sensor panel 40 is detected by the detection circuit 21. As a result, for example, a change in voltage depending on a magnitude of the amount of change in capacitance may be outputted from the detection circuit 21 to the arithmetic operation section 22 along with the coordinate information. The arithmetic operation section 22 evaluates a change in voltage outputted from the detection circuit 21 to thereby determine the presence or absence of a touch of the pen 30 or the finger 100 on the contacting surface 10A and further determine the coordinates of the tip portion of the pen 30 or the finger 100 on the contacting surface 10A. In such a manner, the positional information on the tip of the pen 30 is inputted to the input unit 2.

[Effects]

Next, a description is provided on effects of the input unit 2 according to the present modification example. In the present modification example, as with the input unit 1 according to the above-described first embodiment, the magnetic force of the contacting surface 10A or a region in the vicinity thereof is detected on the basis of a change in capacitance, and the positional information on the tip of the pen 30 is thereby inputted to the input unit 1. In the present modification example, this makes it possible to achieve effects similar to the effects achieved by the input unit 2 according to the above-described embodiment.

Further, in the present modification example, each of the lower electrodes 11B and each of the upper electrodes 11D are made of the conductive magnetic metal (that is, magnetic electrodes). Here, a distance from the contacting surface 10A to each lower electrode 11B and each upper electrode 11D is shorter than a distance between the contacting surface 10A and the conductive layer 18. In the present modification example, layers made of the magnetic metal are disposed at a location closer to the contacting surface 10A in such a manner. Therefore, it becomes easy to exert magnetic force of the pen 30 on the layers made of the magnetic metal. This makes it possible to reduce a size of the magnet 32 on the pen 30, and to input the positional information on the pen 30 even when the pen 30 is located at a position relatively away from the contacting surface 10A.

Modification Example E

FIG. 18 illustrates a modification example of a cross-sectional configuration of the input unit 2 illustrated in FIG. 15. FIG. 19 illustrates a modification example of a cross-sectional configuration of the input unit 2 illustrated in FIG. 17.

The input unit 2 according to the present modification example adopts a configuration where the rigid layer 51 is provided between the electrode substrate 11 and the contacting surface 10A in the input unit 2 according to the above-described second embodiment and the modification examples thereof. For example, the rigid layer 51 may be disposed between the conductive layer 12 and the electrode substrate 11, and may be disposed at least in contact with an undersurface of the conductive layer 12. The rigid layer 51 is made of a material that is resistant to flexion by pressing force exerted by the pen 30 or the finger 100, and may be made of, for example, a material such as a resin substrate and a glass substrate. In other words, the rigid layer 51 prevents local flexion of the conductive layer 12 and the protective layer 13.

In the present modification example, as with the input unit 1 according to the above-described embodiment, the magnetic force of the contacting surface 10A or a region in the vicinity thereof is detected on the basis of a change in capacitance, and the positional information on the tip of the pen 30 is thereby inputted to the input unit 2. In the present modification example, this makes it possible to achieve effects similar to the effects achieved by the input unit 2 according to the above-described embodiment.

Further, in the present modification example, at the time of input of the positional information on the tip of the pen 30, a change in capacitance by magnetic force is utilized, and local flexion of the contacting surface 10A is suppressed by the rigid layer 51. This ensures that a change in capacitance caused by local flexion of the contacting surface 10A is reduced, which makes it possible to easily discriminate input of the positional information by use of the pen 30 and input of the positional information by use of the finger 100. Therefore, for example, in a case where a user operates the pen 30 with his finger or his palm put on the contacting surface 10A, it is possible to sufficiently prevent the finger or the palm from being erroneously detected.

5. Modification Example in Common to First and Second Embodiments

Next, a description is provided on a modification example in common to the first and second embodiments.

Modification Example F

FIG. 20 illustrates a modification example of a cross-sectional configuration of the input unit 1 illustrated in FIG. 1. FIG. 21 illustrates a modification example of a cross-sectional configuration of the input unit 1 illustrated in FIG. 6. FIG. 22 illustrates a modification example of a cross-sectional configuration of the input unit 1 illustrated in FIG. 9. FIG. 23 illustrates a modification example of a cross-sectional configuration of the input unit 1 illustrated in FIG. 11. FIG. 24 illustrates a modification example of a cross-sectional configuration of the input unit 2 illustrated in FIG. 15.

Each of the input units 1 and 2 according to the present modification example adopts a configuration where a magnet layer 19 is further provided at a location farther from the contacting surface 10A than the magnetic conductive layer 14 in the input units 1 and 2 according to the above-described first and second embodiments and modification examples thereof. The magnet layer 19 is disposed on rear surface side of the magnetic conductive layer 14. The magnet layer 19 generates magnetic force that promptly returns the magnetic conductive layer 14 to its original position in a case where magnetic force of the pen 30 exerted on the uplifted magnetic conductive layer 14 is weakened on the grounds that the pen 30 gets far away from the contacting surface 10A or for any other reason. The magnet layer 19 may be made of, for example, a sheet-shaped magnet. Alternatively, the magnet layer 19 may be configured in such a manner that a plurality of magnets are two-dimensionally arrayed.

In the present modification example, the magnet layer 19 is disposed on the rear surface side of the magnetic conductive layer 14, which makes it possible to increase response speed when the magnetic conductive layer 14 returns to the original position.

6. Third Embodiment

[Configuration]

FIG. 25 illustrates an example of a cross-sectional configuration of an input unit 3 according to a third embodiment of the present technology. In the present embodiment, as with the input units 1 and 2, the input unit 3 is a unit that performs information input by use of the pen 30. The pen 30 generates a magnetic field from a tip thereof. The input unit 3 includes a sensor panel 50 having the contacting surface 10A, the driver 20 that drives the sensor panel 50 and generates coordinate data based on an output of the sensor panel 50, and the pen 30. Hereinafter, descriptions on the configurations in common to those of the input units 1 and 2 according to the above-described embodiments are omitted as appropriate. The input unit 3 corresponds to a specific example of an "input unit" in the present technology. The sensor panel 50 corresponds to a specific example of a "sensor panel" and a "sensor section" in the present technology.

(Sensor Panel 50)

The sensor panel 50 detects a magnetic field (line of magnetic force) that is generated from the tip of the pen 30 on the basis of a change in capacitance. Specifically, the sensor panel 50 detects magnetic force of the contacting surface 10A or a region in the vicinity thereof on the basis of a change in capacitance. Further, the sensor panel 50 is allowed to output a signal depending on the change in the capacitance along with information on a position where the change in capacitance has occurred. The sensor panel 50 may have, for example, the electrode substrate 11, the magnetic conductive layer 14, the rigid layer 51, the protective layer 13, and a conductive layer 52. The magnetic conductive layer 14, the rigid layer 51, and the protective layer 13 may be are disposed on top surface side of the electrode substrate 11. The conductive layer 52 may be disposed on bottom surface side of the electrode substrate 11. The magnetic conductive layer 14 is disposed in a void between the contacting surface 10A and the electrode substrate 11, and is disposed at a location closer to the contacting surface 10A than the electrode substrate 11. The conductive layer 52 is disposed at a location farther from the contacting surface 10A than the electrode substrate 11. In other words, the electrode substrate 11 is interposed between two layers having conductivity (the magnetic conductive layer 14 and the conductive layer 52) in a vertical direction. The magnetic conductive layer 14 corresponds to a specific example of a "magnetic layer" in the present technology. The rigid layer 51 corresponds to a specific example of a "rigid layer" in the present technology.

The rigid layer 51 is disposed between the contacting surface 10A and the magnetic conductive layer 14. For example, the rigid layer 51 may be disposed between the protective layer 13 and the magnetic conductive layer 14, and may be disposed at least in contact with an undersurface of the protective layer 13. The rigid layer 51 is made of a material that is resistant to flexion by pressing force exerted by the pen 30 or the finger 100, and may be made of, for example, a material such as a resin substrate and a glass substrate. In other words, the rigid layer 51 prevents local flexion of the protective layer 13.

Each of the magnetic conductive layer 14 and the conductive layer 52 has a function as a shield layer ensuring that a change in capacitance to be formed between the sensor panel 10 and outside thereof does not have an influence on the inside of the sensor panel 50. The magnetic conductive layer 14 and the conductive layer 52 are each at a fixed potential, and may be, for example, at a ground potential. The conductive layer 52 may be made of, for example, a material in which, for example, a metal thin film such as aluminum, carbon, CNT, ITO, IZO, a nanometal wire, or a silver thin wire is formed on a film; a flexible non-magnetic metal plate; ITO glass; or any other materials.

Further, the sensor panel 50 may have, for example, a void 53A between the electrode substrate 11 and the magnetic conductive layer 14, and may have a plurality of spacers 53 that hold the void 53A. Additionally, the sensor panel 50 may have, for example, a void 54A between the magnetic conductive layer 14 and the rigid layer 51, and may have a plurality of spacers 54 that hold the void 54A. One of the spacers 54 is disposed directly above each of the spacers 53. The spacers 53 may be formed in a manner such as a UV curing treatment or a thermosetting treatment of a screen-printed resin layer on the electrode substrate 11. The spacers 54 may be formed by a UV curing treatment or a thermosetting treatment of a screen-printed resin layer on the rigid layer 51.

The void 53A is a space that facilitates to uplift the magnetic conductive layer 14 in a thickness direction. The void 54A is a space that secures a range of motion of the magnetic conductive layer 14 in a case where the magnetic conductive layer 14 is uplifted in a thickness direction. In addition to holding the voids 53A and 54A, the spacers 53 and 54 hold down the magnetic conductive layer 14 partially to prevent the magnetic conductive layer 14 from being uplifted without depending on a magnetic field. Moreover, the sensor panel 50 may have, for example, the housing 16 that accommodates the electrode substrate 11 and other components.

FIG. 26 illustrates an example of action of the input unit 3 when the tip of the pen 30 comes close to or touches the contacting surface 10A. For example, the magnetic conductive layer 14 may be uplifted locally toward the contacting surface 10A side by the magnetic field H (line of magnetic force) that is generated from the tip of the pen 30, as illustrated in FIG. 26. As a result, a distance between the electrode substrate 11 and the magnetic conductive layer 14 becomes shorter below the tip portion of the pen 30, leading to a local decrease in the capacitance of the sensor panel 50. The amount of uplift of the magnetic conductive layer 14 exerted by magnetic force generated from the tip of the pen 30 is the largest immediately below the tip portion of the pen 30, and becomes smaller with increasing distance from a location immediately below the tip portion of the pen 30.

(Driver 20)

As described above, the driver 20 drives the sensor panel 50 and generates coordinate data based on an output of the sensor panel 50. As with the above-described embodiments, the driver 20 may have, for example, the detection circuit 21, the arithmetic operation section 22, the storage section 23, and the output section 24.

[Operation]

Next, a description is provided on operation of the input unit 3. A user moves the tip of the pen 30 closer to the contacting surface 10A or touches the contacting surface 10A with the tip of the pen 30. At this time, the magnetic conductive layer 14 is uplifted locally toward the contacting surface 10A side by magnetic force generated from the tip of the pen 30. As a result, a distance between the electrode substrate 11 and the magnetic conductive layer 14 becomes longer below the tip portion of the pen 30, and the capacitance of the sensor panel 50 increases locally. The amount of uplift of the magnetic conductive layer 14 exerted by the magnetic force generated from the tip of the pen 30 is the largest immediately below the tip portion of the pen 30, and becomes smaller with increasing distance from a location immediately below the tip portion of the pen 30.

At this time, a local change in the capacitance of the sensor panel 50 is detected by the detection circuit 21. As a result, for example, a change in the voltage depending on a magnitude of the amount of change in the capacitance may be outputted from the detection circuit 21 to the arithmetic operation section 22 along with the coordinate information. The arithmetic operation section 22 evaluates a change in the voltage outputted from the detection circuit 21 to thereby determine the presence or absence of a touch of the pen 30 on the contacting surface 10A and further determine the coordinates of the tip portion of the pen 30 on the contacting surface 10A. In such a manner, the positional information on the tip of the pen 30 is inputted to the input unit 3.

[Effects]

Next, a description is provided on effects of the input unit 3. In the present embodiment, as with the input unit 1 according to the above-described embodiment, the magnetic force of the contacting surface 10A or a region in the vicinity thereof is detected on the basis of a change in capacitance, and the positional information on the tip of the pen 30 is thereby inputted to the input unit 3. Therefore, in the present embodiment, this makes it possible to achieve effects similar to the effects achieved by the input unit 1 according to the above-described embodiment.

Further, in the present embodiment, at the time of input of the positional information on the tip of the pen 30, a change in capacitance by magnetic force is utilized, and local flexion of the contacting surface 10A is suppressed by the rigid layer 51. This ensures that a change in capacitance caused by local flexion of the contacting surface 10A is reduced, which makes it possible to easily discriminate input of the positional information by use of the pen 30 and input of the positional information by use of a finger. Therefore, for example, in a case where a user operates the pen 30 with his finger or his palm put on the contacting surface 10A, it is possible to sufficiently prevent the finger or the palm from being erroneously detected.

Moreover, in the present embodiment, the magnetic conductive layer 14 is disposed at a location closer to the contacting surface 10A than the electrode substrate 11. Here, a distance between the contacting surface 10A and the magnetic conductive layer 14 is shorter than a distance between the contacting surface 10A and the conductive layer 52. In such a manner, in the present embodiment, layers made of the magnetic metal are disposed at a location closer to the contacting surface 10A. Therefore, it becomes easy to exert magnetic force of the pen 30 on the layers made of the magnetic metal. This makes it possible to reduce a size of the magnet 32 on the pen 30, and to input the positional information on the pen 30 even when the pen 30 is located at a position relatively away from the contacting surface 10A.

7. Fourth Embodiment

[Configuration]

FIG. 27 illustrates an example of a cross-sectional configuration of an input unit 4 according to a fourth embodiment of the present technology. FIG. 28 illustrates an example of action of the input unit 4 when the tip of the pen 30 and the tip of the finger 100 touch the contacting surface 10A. The input unit 4 is equivalent to an input unit where a sensor panel 60 is provided instead of the sensor panel 50 in the input unit 3 according to the above-described embodiment. Accordingly, hereinafter the sensor panel 60 is mainly detailed, and descriptions on the configurations in common to those of the input unit 3 according to the above-described embodiment are omitted as appropriate. The input unit 4 corresponds to a specific example of an "input unit" in the present technology. The sensor panel 60 corresponds to a specific example of a "sensor panel" in the present technology.

The sensor panel 60 is equivalent to a sensor panel where the void 53A and each of the spacers 53 are omitted, and the electrode substrate 11 and the magnetic conductive layer 14 are stacked in the sensor panel 50 used in the input unit 3 according to the above-described embodiment. In other words, each of the upper electrodes 11D, each of the lower electrodes 11B, and the magnetic conductive layer 14 are stacked with the insulating layers 11C and 11E in between. Each of the insulating layers 11C and 11E corresponds to a specific example of an "insulating layer" in the present technology. In the present embodiment, the electrode substrate 11 has flexibility, and is deformed depending on deformation of the magnetic conductive layer 14. Therefore, in the present embodiment, for example, the magnetic conductive layer 14 is uplifted together with the electrode substrate 11 when the magnetic conductive layer 14 receives magnetic force from the pen 30, as illustrated in FIG. 28. The magnetic conductive layer 14 is fixed to the electrode substrate 11, and may be fixed to the electrode substrate 11 through, for example, an adhesive agent. It is to be noted that the conductive layer 52 is only in contact with the electrode substrate 11, and is not be fixed to the electrode substrate 11. Therefore, when the magnetic conductive layer 14 receives the magnetic force from the pen 30 to be displaced, a void is generated locally between the conductive layer 52 and the magnetic conductive layer 14.

In the sensor panel 60, the void 54A is a space that secures a range of motion of the protective layer 13 and the conductive layer 12 in a case where the protective layer 13 and the conductive layer 12 are flexed downward, and secures a range of motion of the electrode substrate 11 in a case where the electrode substrate 11 is uplifted upward. Therefore, in the present embodiment, the height of the void 17A may be greater than the height of the void 17A in the above-described embodiment. In the present embodiment, in addition to holding the void 17A, the spacers 17 restrict spreading of flexion of the protective layer 13 and the conductive layer 12 to ensure that the downward flexion of the protective layer 13 and the conductive layer 12 takes place locally. Further, the spacers 17 hold down the magnetic conductive layer 14 partially through the electrode substrate 11 to prevent the magnetic conductive layer 14 from being uplifted without depending on a magnetic field.

[Effects]

Next, a description is provided on effects of the input unit 4. In the present embodiment, as with the input unit 1 according to the above-described embodiment, the magnetic force of the contacting surface 10A or a region in the vicinity thereof is detected on the basis of a change in the capacitance, and the positional information on the tip of the pen 30 is thereby inputted to the input unit 4. Therefore, in the present embodiment, this makes it possible to achieve effects similar to the effects achieved by the input unit 1 according to the above-described embodiment.

Further, in the present embodiment, as with the input unit 3 according to the above-described embodiment, at the time of input of the positional information on the tip of the pen 30, a change in capacitance by magnetic force is utilized, and local flexion of the contacting surface 10A is suppressed by the rigid layer 51. In the present embodiment, this makes it possible to achieve effects similar to the effects achieved by the input unit 3 according to the above-described embodiment.

8. Modification Examples in Common to First to Fourth Embodiments

Next, descriptions are provided on modification examples in common to the first to fourth embodiments.

Modification Example G

In the first to fourth embodiments and respective modification examples thereof, the pen 30 has the magnet 32 on a front end thereof. However, in the first to fourth embodiments and respective modification examples thereof, for example, the pen 30 may have a coil 33 on the front end thereof, and may have a battery 34 to supply a DC current to the coil 33, as illustrated in FIG. 29. In such a case, the coil 33 serves an electromagnet with the help of supply of a DC current to the coil 33. Therefore, magnetic force generated by the electromagnet is detected in any of the sensor panels 10, 40, 50, and 60, thus allowing the positional information on the tip of the pen 30 to be inputted to any of the input units 1, 2, 3, and 4.

In the first to fourth embodiments and respective modification examples thereof, the pen 30 has the magnet 32 on the front end thereof. However, in the first to fourth embodiments and respective modification examples thereof, for example, the pen 30 may have the coil 33 on the front end thereof, and any of the sensor panels 10, 40, 50, and 60 may have a coil 133 that performs electromagnetic induction of the coil 33, as illustrated in FIG. 30. In such a case, the coil 33 serves an electromagnet with the help of the electromagnetic induction. Therefore, magnetic force generated by the electromagnet is detected in any of the sensor panels 10, 40, 50, and 60, thus allowing the positional information on the tip of the pen 30 to be inputted to any of the input units 1, 2, 3, and 4.

Modification Example H

In the first to fourth embodiments and respective modification examples thereof, the pen 30 has the magnet 32 only on the front end thereof. However, in the first to fourth embodiments and respective modification examples thereof, for example, as illustrated in FIG. 31, the pen 30 may have the magnets 32 not only on the front end thereof, but also on a back end thereof. At this time, the magnetic pole orientation of the magnet 32 provided on the back end is the same as the magnetic pole orientation of the magnet 32 provided on the front end. In other words, the magnetic pole on back-end side of the pen 30 in the magnet 32 provided on the back end is reverse to the magnetic pole on front-end side of the pen 30 in the magnet 32 provided on the front end. Therefore, for example, after the magnetic conductive layer 14 is uplifted using the front end of the pen 30, it is possible to forcibly return an uplifted portion of the magnetic conductive layer 14 to its original position by using the back end of the pen 30.

In the first to fourth embodiments and respective modification examples thereof, the pen 30 has the magnet 32 fixed on the front end thereof. However, in the first to fourth embodiments and respective modification examples thereof, for example, as illustrated in FIG. 32, the magnet 32 may be supported on the front end of the pen 30 in a rotatable manner. In such a case, for example, after the magnetic conductive layer 14 is uplifted using the pen 30, the magnet 32 may be rotated to vertically invert the magnetic pole orientation of the magnet 32. Subsequently, it is possible to forcibly return an uplifted portion of the magnetic conductive layer 14 to the original position by using the pen 30 once again.

It is to be noted that, in the first to fourth embodiments and respective modification examples thereof, a member (for example, a member made of a soft magnetic material) that shields a magnetic field (line of magnetic force) that is generated from the magnet 32 may be provided around the magnet 32. For example, a cap made of a soft magnetic material may be attached to the front end of the pen 30, or the pen 30 may be of a knock type, and a front-end housing portion of the pen 30 may be configured of a soft magnetic material.

Modification Example I

In the first to fourth embodiments and respective modification examples thereof, a case where the magnetic conductive layer 14 is a sheet-shaped member that is made of a conductive magnetic metal is described as an example. However, in the first to fourth embodiments and respective modification examples thereof, for example, the magnetic conductive layer 14 may be a laminated body including a magnetic layer 14B that is provided on the surface of a conductive layer 14A, as illustrated in FIG. 33. The magnetic layer 14B may be configured of, for example, iron (III) oxide, chromium iron oxide, cobalt iron oxide, or ferrite iron oxide.

Modification Example J

In the first to fourth embodiments and respective modification examples thereof, for example, the magnetic layer 14B may be used instead of the magnetic conductive layer 14, as illustrated in FIG. 34. At this time, the magnetic layer 14B may be at a floating potential. Even in a case where the magnetic layer 14B is at a floating potential, it is possible to detect the magnetic force of the contacting surface 10A or a region in the vicinity thereof on the basis of a change in capacitance.

Modification Example K

In the first to fourth embodiments and respective modification examples thereof, the magnetic conductive layer 14 may be configured of a magnetized magnetic material, or may be configured of a soft magnetic material. In such a case, on the grounds that the magnetic conductive layer 14 is magnetized gradually or for any other reason, it is possible to prevent a change over time in the characteristics of the magnetic conductive layer 14.

When the magnetic conductive layer 14 is configured of a magnetized magnetic material, the magnetic conductive layer 14 may take a magnetization pattern, for example, as illustrated in FIG. 35A, FIG. 35B, or FIG. 35C. In FIG. 35A, only one surface of the magnetic conductive layer 14 takes a magnetization pattern alternately magnetized with north poles and south poles. In FIG. 35B, both surfaces of the magnetic conductive layer 14 take magnetization patterns alternately magnetized with north poles and south poles. It is to be noted that, in FIG. 35B, a magnetization pattern on one surface of the magnetic conductive layer 14 is a pattern where north poles and south poles on the other surface of the magnetic conductive layer 14 are inverted. In FIG. 35C, one surface of the magnetic conductive layer 14 takes a magnetization pattern entirely magnetized with the north pole, and the other surface of the magnetic conductive layer 14 takes a magnetization pattern entirely magnetized with the south pole. It is to be noted that when the pen 30 as illustrated in FIG. 31 or FIG. 32 is used, the magnetic conductive layer 14 may preferably take a magnetization pattern illustrated in FIG. 35C. This is because a user does not have to be aware of the magnetization pattern for use of the pen 30.

Modification Example L

In the first to fourth embodiments and respective modification examples thereof, a case where the magnetic conductive layer 14 or the magnetic layer 14B is a sheet-like member made of a magnetic metal material is described as an example. However, in the first to fourth embodiments and respective modification examples thereof, for example, the entire magnetic conductive layer 14 or the entire magnetic layer 14B may take a mesh form in which many microscopic apertures are formed, as illustrated in FIG. 36. It is to be noted that FIG. 36 illustrates a state in which a plurality of spacers 15, 16, 53, or 54 are arrayed in a matrix pattern. Further, in FIG. 36, a region surrounded by the spacers 15, 16, 53, or 54 is referred to as a "unit sensor region 14$a$" refers to. FIG. 36 illustrates a state the entire magnetic conductive layer 14 or the entire magnetic layer 14B takes the mesh form irrespective of positions of the spacers 15, 16, 53, or 54, or a position of the unit sensor region 14$a$.

Further, in the first to fourth embodiments and respective modification examples thereof, for example, the magnetic conductive layer 14 or the magnetic layer 14B may be a sheet-like member having apertures 14$b$ in a region excluding a central portion of the unit sensor region 14$a$ and the positions of the spacers 15, 16, 53, or 54, as illustrated in FIG. 37. Moreover, in the first to fourth embodiments and respective modification examples thereof, for example, the magnetic conductive layer 14 or the magnetic layer 14B may be a sheet-like member having the apertures 14$b$ at the positions of the spacers 15, 16, 53, or 54, as illustrated in FIG. 38. Additionally, in the first to fourth embodiments and respective modification examples thereof, for example, the magnetic conductive layer 14 or the magnetic layer 14B may be a sheet-like member having meshes in a region other than the positions of the spacers 15, 16, 53, or 54, as illustrated in FIG. 39. Further, in the first to fourth embodiments and respective modification examples thereof, for example, the magnetic conductive layer 14 or the magnetic layer 14B may be a sheet-like member having meshes in a region other than the central portion of the unit sensor region 14$a$, as illustrated in FIG. 40.

In the present modification example, the magnetic conductive layer 14 or the magnetic layer 14B has a plurality of apertures in an entirety or a part of a region thereof. Therefore, as compared with a case where the entire magnetic conductive layer 14 or the entire magnetic layer 14B is a sheet-like member without, for example, apertures, a weight of the magnetic conductive layer 14 or the magnetic layer 14B is reduced, and the magnetic conductive layer 14 or the magnetic layer 14B is easily uplifted when the magnetic conductive layer 14 or the magnetic layer 14B receives magnetic force. This makes it possible to further increase response speed in the information input.

9. Fifth Embodiment

[Configuration]
FIG. 41 illustrates an example of a cross-sectional configuration of a display unit 5 according to a fifth embodiment of the present technology. In the present embodiment, the display unit 5 includes one of the sensor panels 10, 40, 50, and 60 according to the first to fourth embodiments and respective modification examples thereof (hereinafter simply referred to as a "sensor panel X"), a display panel 70, and a driver 80. The display panel is provided in contact with a top surface of the sensor panel X. The driver 80 drives the sensor panel X and the display panel 70. The sensor panel X detects magnetic force of a contacting surface 70A or a region in the vicinity thereof on the basis of a change in capacitance, and is allowed to output a signal depending on the change in capacitance along with information on a position where the change in capacitance has occurred. The display unit 5 corresponds to a specific example of a "display unit" in the present technology. The sensor panel X corresponds to a specific example of a "sensor section" in the present technology. The driver 80 corresponds to a specific example of a "first driver" and a "second driver" in the present technology. It is to be noted that, hereinafter, the contents overlapping with those mentioned previously in the above paragraphs are omitted as appropriate.

(Display Panel 70)
The display panel 70 changes display depending on changes in a magnetic field and an electric field. FIG. 42 illustrates an example of a cross-sectional configuration of the display panel 70. The display panel 70 has flexibility. The display panel 70 may have, for example, a lower substrate 71, a lower electrode 72, a display layer 73, an upper electrode 74, and an upper substrate 75. The lower substrate 71 and the upper substrate 75 support the lower electrode 72, the display layer 73, and the upper electrode 74, and are separately disposed to face each other. The display layer 73 changes display depending on changes in the magnetic field and electric field, and is disposed in a void between the lower substrate 71 and the upper substrate 75. The upper electrode 74 and the lower electrode 72 each apply an electric field to the display layer 73, and are disposed to face each other with the display layer 73 in between. The lower electrode 72 is disposed closer to the lower substrate 71, and the upper electrode 74 is disposed closer to the upper substrate 75.

The lower substrate 71 and the upper electrode 75 may be made of, for example, a plastic material. Examples of the plastic material may include polyimide, polyethylene terephthalate (PET), polyethylene naphthalate (PEN), polymethylmethacrylate (PMMA), polycarbonate (PC), and polyether sulfone (PES).

The lower electrode 72 may be made of a simple substance of a metal element, such as aluminum (Al), chromium (Cr), gold (Au), platinum (Pt), nickel (Ni), copper (Cu), tungsten (W), or silver (Ag). Alternatively, the lower electrode 72 may be made of, for example, an alloy (for example, stainless steel (SUS)) containing one or more of the simple substances of the metal elements exemplified above. Alternatively, the lower electrode 72 may be made of, for example, a light-transmissive conductive material (transparent electrode material). Examples of the transparent electrode material may include indium oxide-tin oxide (ITO), indium oxide-zinc oxide (IZO), antimony oxide-tin oxide (ATO), fluorine-doped tin oxide (FTO), and aluminum-doped zinc oxide (AZO). The lower electrode 72 may have, for example, optical transparency, and may be made of a material, such as a nanometal wire, a carbon nanotube (CNT), or a metal thin line. The upper electrode 74 may be made of, for example, any of the above-described materials exemplified as the materials for the lower electrode 72.

One of the lower substrate 71 and the upper substrate 75T, or both have optical transparency. Further, one of the lower electrode 72 and the upper electrode 74, or both have optical transparency. One of the lower electrode 72 and the lower substrate 71, or both may have light absorption performance, which achieves enhanced contrast. Additionally, one of the lower electrode 72 and the lower substrate 71, or both may be made of a light-reflective material, which achieves enhanced luminance.

FIG. 43 and FIG. 44 illustrate examples of perspective configuration of the lower electrode 72 and the upper electrode 74. For example, the lower electrode 72 may include a plurality of partial electrodes 72A extending in a first direction (an X direction in the figure), as illustrated in FIG. 43. Further, for example, the upper electrode 74 may include a plurality of partial electrodes 74A extending in a second direction (a Y direction in the figure) that intersects with (for example, is orthogonal to) the first direction, as illustrated in FIG. 43. In this case, the driver 20 may perform, for example, simple matrix driving on the lower electrode 72 and the upper electrode 74 to change an entirety or a part of the display of the display layer 73. At this time, a portion where the partial electrode 72A and the partial electrode 74A face each other of the display layer 73 serves as a pixel at the time of the simple matrix driving. The pixel at the time of the simple matrix driving may be consistent with a display pixel 73A to be hereinafter described, or may correspond to a plurality of display pixels 73A.

For example, the lower electrode 72 may include a plurality of partial electrodes 72B arrayed two-dimensionally in a plane, as illustrated in FIG. 44. Further, for example, the upper electrode 74 may be a sheet-like electrode extending over an entire region facing a contacting surface 70A that is a top surface of the display panel 70, as illustrated in FIG. 44. In this case, the driver 20 may perform, for example, active matrix driving on the plurality of partial electrodes 72B to change an entirety or a part of the display of the display layer 73. At this time, a portion facing the partial electrode 72B of the display layer 73 serves as a pixel at the time of the active matrix driving. A single pixel at the time of the active matrix driving may be assigned to a single display pixel 73A to be hereinafter described, or may be assigned to a plurality of display pixels 73A. Alternatively, a plurality of pixels at the time of the active matrix driving may be assigned to a single display pixel 73A.

It is to be noted that the lower electrode 72 and the upper electrode 74 may be sheet-like electrodes extending over an entire region facing the contacting surface 70A. In this case, for example, the driver 20 may apply a voltage to the lower electrode 72 and the upper electrode 74 to change an entirety of the display of the display layer 73 at a time.

FIG. 45 illustrates an example of a cross-sectional configuration of the display pixel 73A that is a minimum unit of the display layer 73. The display layer 73 has the plurality of display pixels 73A arrayed two-dimensionally in a region facing the contacting surface 70A. The display pixels 73A each have a dispersion medium 73c, a plurality of first elements 73a, and a plurality of second elements 73b. The first elements 73a and the second elements 73b are provided in the dispersion medium 73c. Further, the display pixel 73A has a microcapsule 73d that encapsulates the dispersion medium 73c, the plurality of first elements 73a, and the plurality of second elements 73b.

The first element 73a is a magnetic substance. Examples of the magnetic substance may include triiron tetroxide, diiron trioxide, and various ferrite materials. Alternatively, for example, the magnetic substance may be a metal such as iron, manganese, nickel, cobalt, or chromium, or may be an alloy containing cobalt, nickel, manganese and any other element. When the first element 73a is made of any of the materials exemplified above, the first element 73a is a particle of a color for dark display (specifically, black or a tinge of a color close to black). The first element 73a is a particle having properties of the magnetic substance (that is, a magnetic particle). A particle size of the magnetic particle may be, for example, in the range of 0.1 μm to 20 μm both inclusive. The first element 73a may include, for example, a magnetic substance (that is, a magnetic particle). Alternatively, the first element 73a may be, for example, a material prepared by mixing the magnetic particle into a resin.

The second element 73b is a non-magnetic substance. The non-magnetic substance is metal oxide such as titanium oxide, zinc oxide, zirconium oxide, barium titanate, or potassium titanate. Alternatively, for example, the non-magnetic substance may be inorganic salt such as barium sulfate or calcium carbonate, or may be an organic compound such as polyvinyl naphthalene. When the second element 73b is made of any of the materials exemplified above, the second element 73b is a particle of a color for bright display (specifically, white or a tinge of a color close to white). The second element 73b is a particle having properties of the non-magnetic substance (که, a non-magnetic particle). A particle size of the non-magnetic particle may be, for example, in the range of 0.1 μm to 1 μm both inclusive. The second element 73b may include, for example, a non-magnetic substance (that is, a non-magnetic particle). Alternatively, the second element 73b may be, for example, a material prepared by mixing the non-magnetic particle into a resin.

One of the first element 73a and the second element 73b, or both are electrically charged. Specifically, one of the above magnetic particle and the above non-magnetic particle, or both are electrically modified. Hereinafter, a description is provided on an example of a method of manufacturing an electrically modified magnetic particle. It is to be noted that an electrically modified non-magnetic particle is also allowed to be manufactured in a method similar to the method described below.

First, 42.624 grams of sodium hydroxide and 0.369 grams of sodium silicate were dissolved in 43 grams of water to obtain a solution A. Next, while the solution A is stirred, 5 grams of black magnetic particles (triiron tetroxide) was added to the solution A, and the solution A was subjected to stirring (for 15 minutes) followed by ultrasonic stirring (at a temperature of 30° C. to 35° C. for 15 minutes). Subsequently, the solution A underwent heating (at a temperature of 90° C.), and thereafter, 15 $cm^2$ (=ml) of sulfuric acid at a rate of 0.22 mol/$cm^3$ and 7.5 $cm^3$ of a water solution in which 6.5 mg of sodium silicate and 1.3 mg of sodium hydroxide were dissolved were dropped into the solution A for two hours. Then, the solution A was subjected to cooling (at room temperature) followed by addition of 1.8 $cm^3$ of sulfuric acid at a rate of 1 mol/$cm^3$ to the solution A. Thereafter, the solution A was subjected to centrifugal separation (at 3700 rpm for 30 minutes) followed by decantation. Next, after redispersion of the solution A in ethanol, the solution A alternately underwent the centrifugal separation (at 3500 rpm for 30 minutes) and decantation twice. Afterward, a mixed solution of 5 $cm^3$ of ethanol and 0.5 $cm^3$ of water was added to the solution A, which was subjected to ultrasonic stirring (for one hour), thereby obtaining a dispersion solution with silane-coated black magnetic particles.

Next, 3 $cm^3$ of water, 30 $cm^3$ of ethanol, and 4 g of N-[3-(trimethoxysilyl) propyl]-N'-(4-vinylbenzyl) ethylenediamine hydrochroride (a 40% methanol solution) were mixed, and such a mixed solution was stirred (for seven minutes), then a total volume of the above-described dispersion solution was put into the mixed solution. Subsequently, the mixed solution was subjected to stirring (for 10 minutes) followed by centrifugal separation (at 3500 rpm for 30 minutes). Next, a cleaning work for the mixed solution was repeated twice. In the cleaning work, decantation was carried out, and then centrifugal separation (at 3500 rpm for 30 minutes) was carried out after redispersion of the mixed solution in ethanol. Then, such a processed solution was subjected to decantation followed by drying (for six hours) in a reduced-pressure environment (at room temperature), and additional drying (for two hours) in a reduced-pressure environment (at a temperature of 70° C.), thereby obtaining a solid material.

Next, a solution B was prepared by adding 50 $cm^3$ of toluene to the above-described solid material, and thereafter, the solution B underwent stirring (for 12 hours) by use of a rolling mill. Subsequently, after the solution B was put into a three-mouth flask, 1.7 g of acrylic acid 2-ethylhexyl was put into the flask, and then stirring (for 20 minutes) was carried out under a nitrogen stream. Then, a solution B was subjected to stirring (at a temperature of 50° C. for 20 minutes), and the solution C in which 0.01 g of AIBN is dissolved in 3 $cm^3$ of toluene was added to the solution B, which was heated (at a temperature of 65° C.). Next, the solution B was subjected to stirring (for one hour) followed by cooling (at room temperature), and then such a solution B was put into a bottle together with ethyl acetate, and the contents of the bottle was subjected to centrifugal separation (at 3500 rpm for 30 minutes). Subsequently, a cleaning work for the solution B was repeated three times. In the cleaning work, decantation was carried out, and then centrifugal separation (at 3500 rpm for 30 minutes) was carried out after redispersion of the contents of the bottle in ethyl acetate. Then, such a processed solution was subjected to drying (for 12 hours) in a reduced-pressure environment (at room temperature), and additional drying (for two hours) in a reduced-pressure environment (at a temperature of 70° C.), thereby obtaining black electrophoretic particles constituted of black magnetic particles.

The microcapsule 73d may be constituted of, for example, a composite film of gum arabic and gelatin, a urethane resin, or a urea resin. The dispersion medium 73c may be constituted of, for example, water, alcohol, ester, ketone, aliphatic straight-chain hydrocarbon, alicyclic hydrocarbon, aromatic hydrocarbon, halogenated hydrocarbon, or carboxylate. A surface-active agent may be added to the dispersion medium 73c.

(Driver 80)

The driver 80 includes the driver 20 according to any of the above-described embodiments. Specifically, the driver 80 drives the sensor panel X, and generates coordinate data based on an output of the sensor panel X. Further, the driver 80 drives the display panel 70. The driver 80 applies an electrical field to the display panel 70 to change the display of the display panel 70. Specifically, the driver 80 applies an electric field to the display layer 73 to erase the display of the display panel 70.

[Action]

FIG. 46 illustrates an example of action of the display layer 73 when the magnetic field H is applied. As described above, the first element 73a is a magnetic substance, and the second element 73b is a non-magnetic substance. Therefore, magnetic force moving from the lower electrode 72 toward the upper electrode 74 is exerted on the first element 73a by the magnetic field H incoming from the pen 30. As a result, the first element 73a is displaced toward the upper electrode 74 side (or the upper substrate 75 side) to touch or come close to the upper electrode 74. In contrast, the second element 73b is not displaced in particular by the magnetic field H incoming from the pen 30; however, the second element 73b is pushed out toward the lower electrode 72 side (or the lower substrate 71 side) by the closely-spaced first elements 73a in the vicinity of the upper electrode 74. In other words, when the pen 30 touches the contacting surface 70A, the display layer 73 is turned to a dark display state (for example, a black display state) in a contacting portion of the pen 30.

Each of FIG. 47A, FIG. 47B, FIG. 47C, FIG. 47D, FIG. 47E, FIG. 48A, FIG. 48B, FIG. 48C, FIG. 48D, FIG. 48E, FIG. 49A, FIG. 49B, FIG. 49C, FIG. 49D, and FIG. 49E illustrates an example of action of the display layer 73 when electrical field E is applied. Each of FIG. 47A to FIG. 47E illustrates an example of action of the display layer 73 when the first element 73a is positively charged, and the second element 73b is negatively charged. Each of FIG. 48A to FIG. 48E illustrates an example of action of the display layer 73 when the first element 73a is positively charged, and the second element 73b is not charged. Each of FIG. 49A to FIG. 49E illustrates an example of action of the display layer 73 when the first element 73a is not charged, and the second element 73b is negatively charged.

When the first element 73a is positively charged, and the second element 73b is negatively charged, the driver 20 applies, to the upper electrode 74 and the lower electrode 72, a voltage in which a potential of the upper electrode 74 is higher than a potential of the lower electrode 72. For example, the driver 20 may apply a positive voltage to the upper electrode 74, and may apply, to the lower electrode 72, a negative voltage, a ground voltage (zero volts), or a positive voltage with a value relatively smaller than the positive voltage to be applied to the upper electrode 74, as illustrated in FIG. 47A, FIG. 47C, and FIG. 47D. Further, for example, the driver 20 may apply a ground voltage (zero volts) to the upper electrode 74, and may apply a negative voltage to the lower electrode 72, as illustrated in FIG. 47B. Additionally, for example, the driver 20 may apply a negative voltage to the upper electrode 74, and may apply, to the lower electrode 72, a negative voltage with a value greater than the negative voltage to be applied to the upper electrode 74, as illustrated in FIG. 47E. Thus, the electrical field E moving from the upper electrode 74 toward the lower electrode 72 is generated inside the display layer 73. Therefore, the electrical field E incoming from the lower electrode 72 and the upper electrode 74 causes coulomb force moving from the upper electrode 74 toward the lower electrode 72 to be exerted on the first element 73a, and causes coulomb force moving from the lower electrode 72 toward the upper electrode 74 to be exerted on the second element 73b. As a result, the first element 73a is displaced toward the lower electrode 72 side (or the lower substrate 71 side) to touch or come close to the lower electrode 72, and the second element 73b is displaced toward the upper electrode 74 side (or the upper substrate 75 side) to touch or come close to the upper electrode 74. In other words, when the above-described voltages are applied to the upper electrode 74 and the lower electrode 72, the display layer 73 is turned to a bright display state (for example, a white display state) in a pixel unit at the time of matrix driving.

Further, even when the first element 73a is positively charged, and the second element 73b is not charged, the driver 20 applies, to the upper electrode 74 and the lower electrode 72, a voltage in which a potential of the upper electrode 74 is higher than a potential of the lower electrode 72. For example, the driver 20 may apply a positive voltage to the upper electrode 74, and may apply, to the lower electrode 72a, negative voltage, a ground voltage (zero volts), or a positive voltage with a value relatively smaller than the positive voltage to be applied to the upper electrode 74, as illustrated in FIG. 48A, FIG. 48C, and FIG. 48D. Further, for example, the driver 20 may apply a ground voltage (zero volts) to the upper electrode 74, and may apply a negative voltage to the lower electrode 72, as illustrated in FIG. 48B. Additionally, for example, the driver 20 may apply a negative voltage to the upper electrode 74, and may apply, to the lower electrode 72, a negative voltage with a value greater than the negative voltage to be applied to the upper electrode 74, as illustrated in FIG. 48E. Thus, the electrical field E moving from the upper electrode 74 toward the lower electrode 72 is generated inside the display layer 73. Therefore, the electrical field E incoming from the lower electrode 72 and the upper electrode 74 causes coulomb force moving from the upper electrode 74 toward the lower electrode 72 to be exerted on the first element 73a. In contrast, the second element 73b is not displaced in particular by the electrical field E incoming from the upper electrode 74 and the lower electrode 72; however, the second element 73b is pushed out toward the upper electrode 74 by the closely-spaced first elements 73a in the vicinity of the upper electrode 74. In other words, when the above-described voltages are applied to the upper electrode 74 and the lower electrode 72, the display layer 73 is turned to a bright display state (for example, a white display state) in a pixel unit at the time of matrix driving.

Moreover, even when the first element 73a is not charged, and the second element 73b is negatively charged, the driver 20 applies, to the upper electrode 74 and the lower electrode 72, a voltage in which a potential of the upper electrode 74 is higher than a potential of the lower electrode 72. For example, the driver 20 may apply a positive voltage to the upper electrode 74, and may apply, to the lower electrode 72, a negative voltage, a ground voltage (zero volts), or a positive voltage with a value relatively smaller than the positive voltage to be applied to the upper electrode 74, as illustrated in FIG. 49A, FIG. 49C, and FIG. 49D. Further, for example, the driver 20 may apply a ground voltage (zero volts) to the upper electrode 74, and may apply a negative voltage to the lower electrode 72, as illustrated in FIG. 49B. Additionally, for example, the driver 20 may apply a negative voltage to the upper electrode 74, and may apply, to the lower electrode 72, a negative voltage with a value greater than the negative voltage to be applied to the upper electrode 74, as illustrated in FIG. 49E. Thus, the electrical field E moving from the upper electrode 74 toward the lower electrode 72 is generated inside the display layer 73. Therefore, the electrical field E incoming from the lower electrode 72 and the upper electrode 74 causes coulomb force moving from the lower electrode 72 toward the upper electrode 74 to be exerted on the second element 73b. In contrast, the first element 73a is not displaced in particular by the electrical field E incoming from the upper electrode 74 and the lower electrode 72; however, the first element 73a is pushed out toward the lower electrode 72 by the closely-spaced second elements 73b in the vicinity of the upper electrode 74. In other words, when the above-described voltages are applied to the upper electrode 74 and the lower electrode 72, the display layer 73 is turned to a bright display state (for example, a white display state) in a pixel unit at the time of matrix driving.

In summarizing the above descriptions, the display layer 73 is allowed to change the display (perform drawing) in each microcapsule 73d (in each display pixel 73A) through displacing the first element 73a by the magnetic field H incoming from the pen 30. Further, the display layer 73 is allowed to change the display on the entire contacting surface 70A or in a pixel unit at the time of the matrix driving through displacing charged one of the first element 73a and the second element 73b by the electrical field E incoming from the lower electrode 72 and the upper electrode 74.

[Effects]

Next, a description is provided on effects of the display unit 5. In the display unit 5, the display of the display layer 73 is changed by the electrical field E incoming from the upper electrode 74 and the lower electrode 72. Therefore, in erasing the display of the display layer 73, it is possible to utilize the electrical field E incoming from the upper electrode 74 and the lower electrode 72. For example, inputting the electrical field E to the entire display layer 73 may makes it possible to erase an entity of the contacting surface 70A at a time. In addition, erasure of the contacting surface 70A is performed using the electrical field E, which makes it harder to generate any residual non-erased portion as compared with a case of erasure by use of the magnetic field.

Further, in the display unit 5, the display of the display layer 73 is changed by the magnetic field H incoming from the pen 30. Therefore, in performing the drawing on the contacting surface 70A, it is possible to utilize the magnetic field H incoming from the pen 30. Here, when the magnetic field H is applied from the pen 30, fast response to the drawing on the contacting surface 70A is achievable. In such a manner, in the display unit 5, when the magnetic field H is utilized in the drawing, and the electrical field E is utilized in the erasure, it is possible to achieve the display unit that combines fast drawing and collective erasure, and makes it harder to generate any residual non-erased portion.

Moreover, in the display unit 5, when at least one of the upper electrode 74 and the lower electrode 72 is configured of a plurality of partial electrodes (12A and 14A), a portion where the upper electrode 74 and the lower electrode 72 face each other of the display layer 73 serves as a pixel at the time of the matrix driving. Therefore, when a potential difference between the upper electrode 74 and the lower electrode 72 is greater than a potential difference of the above-described threshold in a predetermined pixel at the time of the matrix driving, it is possible to erase only a predetermined region within the contacting surface 70A. Further, when a potential difference between the upper electrode 74 and the lower electrode 72 is greater than a potential difference of the above-described threshold in all the pixels at the time of the matrix driving, it is possible to erase an entirety of the contacting surface 70A. In other words, in the display unit 5, at least one of the upper electrode 74 and the lower electrode 72 is configured of the plurality of partial electrodes (12A and 14A), which makes it possible to partially erase the contacting surface 70A and to erase an entirety of the contacting surface 70A at a time. Therefore, in this case, it is possible to achieve the display unit that combines fast drawing, collective erasure, and partial erasure, and makes it harder to generate any residual non-erased portion.

Additionally, in the display unit 5, coordinate data of the pen 30 or the finger 100, or drawing data of the pen 30 is generated in the sensor panel X. At this time, in generating the coordinate data of the pen 30 or the finger 100, or the drawing data of the pen 30, the presence of the display panel 70 is not impeditive. This is because the sensor panel X detects positional coordinates of the tip of the pen 30 or the tip of the finger 100 in an electrically shielded state utilizing a change in capacitance that is formed, for example, between the electrode substrate 11 and the magnetic conductive layer 14 and between the electrode substrate 11 and the conductive layer 12.

Further, in the display unit 5, generation of the above-described drawing data and display of such drawing data on the display panel 70 are in synchronization with each other. However, both the generation of the above-described drawing data and display of such drawing data on the display panel 70 are carried out, for example, by a touch of the tip of the pen 30 or the tip of the finger 100 on the contacting surface 70A, and therefore data is not exchanged between the sensor panel X and the display panel 70. Consequently, this eliminates the necessity of providing a circuit for the above synchronization separately, and thus a circuit configuration of the display unit 5 is more simplified accordingly.

10. Sixth Embodiment

[Configuration]
FIG. 50 illustrates an example of a cross-sectional configuration of a display unit 6 according to a sixth embodiment of the present technology. The display unit 6 is equivalent to a display unit where a display panel 90 is provided instead of the display panel 70, and a driver 110 is provided instead of the driver 80 in the display unit 6 according to the above-described embodiment. Therefore, hereinafter, the display panel 90 and the driver 110 are mainly detailed, and the contents overlapping with those mentioned previously in the above paragraphs are omitted as appropriate.

FIG. 51 illustrates an example of a cross-sectional configuration of the display panel 90. The display panel 90 is equivalent to a display panel where a display layer 93 is provided instead of the display layer 73 in the display panel 70 according to the above-described embodiment. That is, the display panel 90 has the display layer 93. The display layer 93 changes display depending on a change in an electrical field. The display layer 93 is equivalent to a display layer where display pixels 93A are provided instead of the display pixels 73A in the display layer 73 according to the above-described embodiment. FIG. 52 illustrates an example of a cross-sectional configuration of the display pixel 93A. The display pixel 93A is equivalent to a display pixel where a first element 93a is provided instead of the first element 73a, and a second element 93b is provided instead of the second element 73b in the display pixel 73A according to the above-described embodiment.

The first element 93a and the second element 93b are non-magnetic substances. The first element 93a is a particle of a color for dark display (specifically, black or a tinge of a color close to black). A particle size of the first element 93a may be, for example, in the range of 0.1 μm to 1 μm both inclusive. The second element 93b may be constituted of metal oxide such as titanium oxide, zinc oxide, zirconium oxide, barium titanate, or potassium titanate. Alternatively, for example, the second element 93b may be constituted of inorganic salt such as barium sulfate or calcium carbonate, or may be constituted of an organic compound such as polyvinyl naphthalene. When the second element 93b is constituted of any of the materials exemplified above, the second element 93b is a particle of a color for bright display (specifically, white or a tinge of a color close to white). A particle size of the second element 93b may be, for example, in the range of 0.1 μm to 1 μm both inclusive.

One of the first element 93a and the second element 93b or both are electrically charged. For example, one of surfaces of the first element 93a and the second element 93b or both may be modified, and may be electrically modified.

FIG. 53 illustrates an example of function blocks of the driver 110. The driver 110 includes the driver 20 according to any of the above-described embodiments. Specifically, the driver 110 drives the sensor panel X, and generates coordinate data based on an output of the sensor panel X. Further, the driver 110 drives the display panel 90. The driver 110 applies an electrical field to the display panel 90 to change the display of the display panel 90. Specifically, the driver 110 applies an electrical field to the display layer 93 to append display based on the coordinate data or the drawing data generated by the arithmetic operation section 22 to the display of the display panel 90.

The driver 110 has circuits corresponding to the driver 20 (the detection circuit 21, the arithmetic operation section 22, the storage section 23, and the output section 24), and further has an input section 25 and a display driver 26. The input section 25 accepts input of data to be displayed on the display panel 90. When the data is accepted by the input section 25, the arithmetic operation section 22 stores the accepted data in the storage section 23. The display driver 26 may apply an electrical field to the display layer 93 to display, for example, data related to UI (User Interface) that is stored in the storage section 23 or data stored via the input section 25 on the display panel 90.

When the drawing data of the pen 30 is generated based on an output of the sensor panel X, and display based on data of some kind is performed on the display panel 90, the arithmetic operation section 22 appends the drawing data of the pen 30 to the data displayed on the display panel 90. Further, the arithmetic operation section 22 instructs the display driver 26 to perform display based on new data generated by such appending operation, and stores the new data generated by the appending operation in the storage section 23. The display driver 26 carries out display based on the new data generated by the appending operation in accordance with the instruction from the arithmetic operation section 22. As a result, the drawing data of the pen 30 is appended to the display of the display panel 90 in real time.

When the coordinates of the pen 30 are generated based on an output of the sensor panel X, the arithmetic operation section 22 determines to detect that the coordinates of the pen 30 are changed over time in the air away from the contacting surface 10A. In this case, for example, when some pages in the data divided into a plurality of pages are displayed on the display panel 90, the arithmetic operation section 22 instructs the display driver 26 to switch display to the next page. The display driver 26 carries out the display of the next page in accordance with the instruction from the arithmetic operation section 22. In such a manner, it is also possible to turn a page by moving the pen 30 in the air.

[Effects]

Next, a description is provided on effects of the display unit 6. The display unit 6 is allowed to append the drawing data of the pen 30 to the display of the display panel 90 in real time, and the new data generated by the appending operation is stored in the storage section 23. This allows a user not only to perform the appending operation on the display panel 90, but also to store the appended data in the storage section 23.

11. Modification Example of Sixth Embodiment

FIG. 54 illustrates a modification example of a cross-sectional configuration of the display unit 6. For example, as illustrated in FIG. 54, a contacting surface 90A of the display panel 90 may be divided into a pen input region 90a and a finger input region 90b. In the pen input region 90a, information is inputted with the pen 30, and in the finger input region 90b, information is inputted with a finger. In such a case, for example, in a case where a user operates the pen 30 with his finger or his palm put on the pen input region 90a, it is possible to prevent the finger or the palm from being erroneously detected.

Further, in the above-described sixth embodiment and the modification example thereof, a commonly-used display may be provided instead of the display panel 90. Examples of the commonly-used display may include a liquid crystal display, an organic EL display, and an electronic paper display. In this case, the driver 110 may drive the commonly-used display that is provided instead of the display panel 90 to append display based on the coordinate data or the drawing data generated by the arithmetic operation section 22 to the display of the commonly-used display.

Although the present technology has been described by giving the embodiments and the modification examples as mentioned above, the present technology is not limited to the above-mentioned embodiments and modification examples and may be modified in a variety of ways. Note that the effects described in the description are merely examples, and effects achieved by the technology are not limited thereto. The technology may have effects other than the effects described in the description.

For example, in the above-described embodiments and the modification example thereof, one or more magnetic sensors may be provided. The magnetic sensor detects a magnetic field of any of the contacting surfaces 10A, 70A, and 80A and a region in the vicinity thereof Further, for example, the present technology may be configured as follows.

(1) A sensor panel, including:
a sensor section that detects magnetic force of a contacting surface or a region in the vicinity of the contacting surface on a basis of a change in capacitance and is allowed to output a signal depending on the change in capacitance along with information on a position where the change in capacitance has occurred.

(2) The sensor panel according to (1), wherein
the sensor section has
a plurality of first electrodes extending in a plane facing the contacting surface,
a plurality of second electrodes extending in a plane facing the contacting surface and in a direction intersecting with each of the first electrodes, and
a magnetic layer that is formed in a plane facing the contacting surface, and is displaced locally in a thickness direction depending on a magnitude of magnetic force.

(3) The sensor panel according to (2), wherein the sensor section includes a conductive layer, and detects a change in capacitance between the conductive layer and both the first electrodes and the second electrodes.

(4) The sensor panel according to (1), wherein
the sensor section has
a plurality of first magnetic electrodes that extend in a plane facing the contacting surface, and are displaced locally in a thickness direction depending on a magnitude of magnetic force, and
a plurality of second magnetic electrodes that extend in a plane facing the contacting surface and in a direction intersecting with each of the first electrodes, and are displaced locally in the thickness direction depending on a magnitude of magnetic force.

(5) The sensor panel according to (2), wherein the sensor section includes a conductive layer, and is integrated by stacking the magnetic layer and the conductive layer.

(6) The sensor panel according to (2), wherein the magnetic layer has a conductive layer.

(7) The sensor panel according to any one of (2) to (6), wherein the magnetic layer has a plurality of apertures in an entirety or a part of a region of the magnetic layer.

(8) The sensor panel according to any one of (2) to (7), wherein the magnetic layer is configured of a magnetized magnetic substance, or is configured of a soft magnetic substance.

(9) The sensor panel according to any one of (2), (7), and (8), wherein the sensor section has a void between the magnetic layer and both the first electrodes and the second electrodes.

(10) The sensor panel according to (9), wherein the sensor section has a spacer that holds the void.

(11) The sensor panel according to any one of (2), (7), and (8), wherein the magnetic layer, the first electrodes, and the second electrodes are stacked with an insulating layer in between.

(12) The sensor panel according to (2), (7), (8), (9), (10), and (11), wherein the magnetic layer is disposed at a location farther from the contacting surface than the first electrodes and the second electrodes.

(13) The sensor panel according to (12), wherein the sensor section has a conductive layer in a void between the contacting surface and both the first electrodes and the second electrodes.
(14) The sensor panel according to (13), wherein the contacting surface has flexibility, and the conductive layer is deformed depending on deformation of the contacting surface.
(15) The sensor panel according to (13) or (14), wherein the magnetic layer has conductivity.
(16) The sensor panel according to any one of (13) to (15), wherein the sensor section has a spacer that holds a void between the conductive layer and both the first electrodes and the second electrodes.
(17) The sensor panel according to (12) or (13), wherein the sensor section has a rigid layer in a void between the contacting surface and both the first electrodes and the second electrodes.
(18) The sensor panel according to any one of (12) to (16), wherein the sensor section has a magnet layer at a location farther from the contacting surface than the magnetic layer.
(19) The sensor panel according to any one of (2), (7), (8), (9), (10), and (11), wherein the magnetic layer is disposed at a location closer to the contacting surface than the first electrodes and the second electrodes.
(20) The sensor panel according to (19), wherein the magnetic layer has conductivity.
(21) The sensor panel according to (19) or (20), wherein the sensor section has a rigid layer in a void between the contacting surface and the magnetic layer.
(22) An input unit, including:
    a sensor section that detects magnetic force of a contacting surface or a region in the vicinity of the contacting surface on a basis of a change in capacitance and is allowed to output a signal depending on the change in capacitance along with information on a position where the change in capacitance has occurred;
    a driver that drives the sensor section and generates coordinate data based on an output of the sensor section; and
    a pen that generates a magnetic field from a tip of the pen.
(23) A display unit, including:
    a sensor section that detects magnetic force of a contacting surface or a region in the vicinity of the contacting surface on a basis of a change in capacitance and is allowed to output a signal depending on the change in capacitance along with information on a position where the change in capacitance has occurred;
    a display section that changes display depending on a change in at least an electrical field of a magnetic field and the electrical field;
    a first driver that drives the sensor section and generates coordinate data based on an output of the sensor section;
    a second driver that applies an electrical field to the display section to change display;
    and a pen that generates a magnetic field from a tip of the pen.
(24) The display unit according to (23), wherein
    the display section has a display layer that changes display depending on changes in the magnetic field and the electrical field, and
    the second driver erases display of the display section by applying an electrical field to the display layer.
(25) The display unit according to (23), wherein
    the display section has a display layer that changes display depending on a change in the electrical field, and
    the second driver applies an electrical field to the display layer to append display based on the coordinate data generated by the first driver to display of the display section.

This application claims the priority on the basis of Japanese Patent Application No. 2014-127424 filed on Jun. 20, 2014 in Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A sensor panel, comprising:
    a sensor section configured to:
        detect a first magnetic force of one of a contacting surface of the sensor panel or a region in a vicinity of the contacting surface based on a change in a capacitance of the sensor panel; and
        output a signal and information based on the detected first magnetic force, wherein
            the signal corresponds to the change in the capacitance,
            the change in the capacitance is greater than or equal to a threshold, wherein
            the information comprises a position of the change in the capacitance,
            the sensor section comprises—
                a plurality of first electrodes and a plurality of second electrodes;
                a plurality of insulating layers stacked alternatively between the plurality of first electrodes and the plurality of second electrodes; and
                a magnetic layer in a plane that faces the contacting surface,
            a portion of the magnetic layer is displaceable in a thickness direction of the magnetic layer based on a magnitude of the first magnetic force in the sensor section,
        the plurality of first electrodes is a plurality of first magnetic electrodes that extends in the plane,
        the plurality of second electrodes is a plurality of second magnetic electrodes that extends in the plane,
        each of the plurality of second magnetic electrodes intersects each of the plurality of first magnetic electrodes,
        a portion of the plurality of first magnetic electrodes is displaceable in a thickness direction of the plurality of first magnetic electrodes,
        a portion of the plurality of second magnetic electrodes is displaceable in a thickness direction of the plurality of second magnetic electrodes, and
        the portion of the plurality of first magnetic electrodes and the portion of the plurality of second magnetic electrodes are displaceable based on the magnitude of the first magnetic force in the sensor section.
2. The sensor panel according to claim 1, wherein
    the plurality of first electrodes extends in a first direction associated with the plane,
    the plurality of second electrodes extends in a second direction associated with the plane,
    the first direction is perpendicular to the second direction, and
    each of the plurality of second electrodes intersects each of the plurality of first electrodes.

3. The sensor panel according to claim 2, wherein
the sensor section further includes a conductive layer and an electrode substrate below the conductive layer,
the sensor section is further configured to detect the change in the capacitance between the conductive layer and the electrode substrate, and
the electrode substrate includes the plurality of first electrodes and the plurality of second electrodes.

4. The sensor panel according to claim 3, wherein the conductive layer is above the magnetic layer in the sensor section.

5. The sensor panel according to claim 1, wherein the magnetic layer includes a conductive layer.

6. The sensor panel according to claim 2, wherein the magnetic layer includes a plurality of apertures in one of an entirety of the magnetic layer or a part of a region of the magnetic layer.

7. The sensor panel according to claim 2, wherein the magnetic layer includes one of a magnetized magnetic substance or a soft magnetic substance.

8. The sensor panel according to claim 2, wherein
the sensor section further includes an electrode substrate and a void between the magnetic layer and the electrode substrate, and
the electrode substrate includes the plurality of first electrodes and the plurality of second electrodes.

9. The sensor panel according to claim 8, wherein the sensor section further includes a spacer that holds the void.

10. The sensor panel according to claim 2, wherein
the portion of the magnetic layer is at a first location in the sensor section, and
the first location of the magnetic layer is farther from the contacting surface than each of the plurality of first electrodes and the plurality of second electrodes.

11. The sensor panel according to claim 10, wherein
the sensor section further includes a first void, an electrode substrate, and a conductive layer in the first void,
the first void is between the contacting surface and the electrode substrate, and
the electrode substrate includes the plurality of first electrodes and the plurality of second electrodes.

12. The sensor panel according to claim 11, wherein
the contacting surface is flexible, and
the conductive layer is deformable based on deformation of the contacting surface.

13. The sensor panel according to claim 11, wherein the magnetic layer is conductive.

14. The sensor panel according to claim 11, wherein
the sensor section further includes a spacer and a second void,
the second void is different from the first void, and
the spacer holds the second void between the conductive layer and the electrode substrate.

15. The sensor panel according to claim 10, wherein
the sensor section further includes an electrode substrate, a void, and a rigid layer in the void,
the void is between the contacting surface and the electrode substrate, and
the electrode substrate includes the plurality of first electrodes and the plurality of second electrodes.

16. The sensor panel according to claim 10, wherein
the sensor section further includes a magnet layer at a second location in the sensor section,
the second location is different from the first location, and
the second location of the magnet layer farther from the contacting surface than the magnetic layer.

17. The sensor panel according to claim 2, wherein
the magnetic layer is at a specific location in the sensor section, and
the specific location of the sensor section is closer to the contacting surface than the plurality of first electrodes and the plurality of second electrodes.

18. The sensor panel according to claim 17, wherein the magnetic layer is conductive.

19. The sensor panel according to claim 17, wherein
the sensor section further includes a void and a rigid layer in the void, and
the void is between the contacting surface and the magnetic layer.

20. The sensor panel according to claim 1, wherein
the sensor section further includes an electrode substrate,
the magnetic layer is on a bottom surface side of the electrode substrate,
the portion of the magnetic layer is displaceable towards the contacting surface, and
a distance between the electrode substrate and the magnetic layer is based on displacement of the portion of the magnetic layer towards the contacting surface.

21. The sensor panel according to claim 1, wherein
the magnetic layer is displaceable towards the contacting surface;
the sensor section further includes a magnet layer at a specific location in the sensor section,
the specific location of magnet layer is farther from the contacting surface than the magnetic layer,
the magnet layer is configured to:
generate a second magnetic force; and
return the magnetic layer, which has displaced towards the contacting surface, to an original position of the magnetic layer, and
the magnetic layer is returned to the original position of the magnetic layer based on the generated second magnetic force.

22. An input unit, comprising:
a sensor section configured to:
detect a magnetic force of one of a contacting surface of the sensor section or a region in a vicinity of the contacting surface based on a change in a capacitance of the sensor section; and
output a signal and information based on the detected magnetic force, wherein
the signal corresponds to the change in the capacitance,
the information comprises a position of the change in the capacitance,
the sensor section comprises:
a plurality of first electrodes and a plurality of second electrodes;
a plurality of insulating layers stacked alternatively between the plurality of first electrodes and the plurality of second electrodes; and
a magnetic layer in a plane that faces the contacting surface,
a portion of the magnetic layer is displaceable in a thickness direction of the magnetic layer based on a magnitude of the magnetic force in the sensor section,
the plurality of first electrodes is a plurality of first magnetic electrodes that extends in the plane,
the plurality of second electrodes is a plurality of second magnetic electrodes that extends in the plane, each of the plurality of second magnetic electrodes intersects each of the plurality of first magnetic electrodes,
a portion of the plurality of first magnetic electrodes is displaceable in a thickness direction of the plurality of first magnetic electrodes,
a portion of the plurality of second magnetic electrodes is displaceable in a thickness direction of the plurality of second magnetic electrodes, and
the portion of the plurality of first magnetic electrodes and the portion of the plurality of second magnetic electrodes are displaceable based on the magnitude of the magnetic force in the sensor section;
a driver configured to:
drive the sensor section;
determine a touch position on the sensor section, wherein
the touch position corresponds to the position of the change in the capacitance, and
the change in the capacitance is greater than or equal to a threshold; and
generate coordinate data based on the signal, the information, and the determination of the touch position on the sensor section; and
a pen configured to generate a magnetic field from a tip of the pen, wherein the magnetic field corresponds to the magnetic force.

23. A display unit, comprising:
a sensor section configured to:
detect a magnetic force of one of a contacting surface of the sensor section or a region in a vicinity of the contacting surface based on a change in a capacitance of the sensor section; and
output a signal and information based on the detected magnetic force, wherein
the signal corresponds to the change in the capacitance,
the information comprises a position of the change in the capacitance,
the sensor section comprises:
a plurality of first electrodes and a plurality of second electrodes;
a plurality of insulating layers stacked alternatively between the plurality of first electrodes and the plurality of second electrodes; and
a magnetic layer in a plane that faces the contacting surface,
a portion of the magnetic layer is displaceable in a thickness direction of the magnetic layer based on a magnitude of the magnetic force in the sensor section,
the plurality of first electrodes is a plurality of first magnetic electrodes that extends in the plane,
the plurality of second electrodes is a plurality of second magnetic electrodes that extends in the plane,
each of the plurality of second magnetic electrodes intersects each of the plurality of first magnetic electrodes,
a portion of the plurality of first magnetic electrodes is displaceable in a thickness direction of the plurality of first magnetic electrodes,
a portion of the plurality of second magnetic electrodes is displaceable in a thickness direction of the plurality of second magnetic electrodes, and
the portion of the plurality of first magnetic electrodes and the portion of the plurality of second magnetic electrodes are displaceable based on the magnitude of the magnetic force in the sensor section;
a display section configured to:
change a display based on a change in at least one of a magnetic field or an electrical field;
a first driver configured to:
drive the sensor section;
determine a touch position on the sensor section, wherein
the touch position corresponds to the position of the change in the capacitance, and
the change in the capacitance is greater than or equal to a threshold; and
generate coordinate data based on the signal, the information, and the determination of the touch position on the sensor section;
a second driver configured to apply the electrical field to the display section; and
a pen configured to generate the magnetic field from a tip of the pen, wherein the magnetic field corresponds to the magnetic force.

24. The display unit according to claim 23, wherein
the display section is configured to change the display based on the change in the magnetic field and the electrical field, and
the second driver is further configured to erase the display of the display section based on the electrical field.

25. The display unit according to claim 23, wherein the display section is configured to change the display based on the change in the electrical field, and
the second driver is further configured to append the display based on the coordinate data generated by the first driver.

* * * * *